US011910784B2

(12) United States Patent
Shmigelsky et al.

(10) Patent No.: US 11,910,784 B2
(45) Date of Patent: Feb. 27, 2024

(54) ANIMAL VISUAL IDENTIFICATION, TRACKING, MONITORING AND ASSESSMENT SYSTEMS AND METHODS THEREOF

(71) Applicant: One Cup Productions Ltd., Vancouver (CA)

(72) Inventors: Jeffrey Shmigelsky, Vancouver (CA); Mocha Shmigelsky, Vancouver (CA); Madison Lovett, Vancouver (CA); Philip Cho, Vancouver (CA)

(73) Assignee: One Cup Productions Ltd.

( * ) Notice: Subject to any disclaimer, the term of this patent is extended or adjusted under 35 U.S.C. 154(b) by 0 days.

(21) Appl. No.: 18/134,462

(22) Filed: Apr. 13, 2023

(65) Prior Publication Data
US 2023/0337636 A1 Oct. 26, 2023

Related U.S. Application Data

(63) Continuation of application No. PCT/CA2021/051446, filed on Oct. 14, 2021.
(Continued)

(51) Int. Cl.
*A01K 29/00* (2006.01)
*G06V 10/25* (2022.01)
(Continued)

(52) U.S. Cl.
CPC ............ *A01K 29/005* (2013.01); *G06V 10/25* (2022.01); *G06V 10/82* (2022.01); *G06V 40/10* (2022.01)

(58) Field of Classification Search
CPC ...... A01K 29/005; G06V 10/25; G06V 10/82; G06V 40/10
See application file for complete search history.

(56) References Cited

U.S. PATENT DOCUMENTS 5,576,949 A 11/1996 Scofield et al.
6,375,612 B1 4/2002 Guichon et al.
(Continued)

FOREIGN PATENT DOCUMENTS

CA 2925275 A1 11/2014
EP 1212939 A1 6/2002
(Continued)

OTHER PUBLICATIONS

International Search Report and Written Opinion dated Jan. 18, 2022 in International Patent Application No. PCT/CA2021/051446 (10 pages).
(Continued)

*Primary Examiner* — Santiago Garcia
(74) *Attorney, Agent, or Firm* — BERESKIN & PARR LLP/S.E.N.C.R.L. s.r.l; Tonino Rosario Orsi

(57) ABSTRACT

An animal management system has one or more imaging devices, and a computing device coupled to the one or more image devices for receiving one or more images captured by the one or more imaging devices, processing at least one image using an artificial intelligence (AI) pipeline for: (i) detecting and locating in the image one or more animals, (ii) for each detected animal: (a) generating at least one section of the detected animal, (b) determining a plurality of key points in each section, (c) generating an embedding for each section based on the plurality of key points in the section, and (d) combining the embeddings for generating an identification of the detected animal with a confidence score. Key points and bounding boxes may also have associated confidence scores.

30 Claims, 44 Drawing Sheets

Related U.S. Application Data

(60) Provisional application No. 63/091,697, filed on Oct. 14, 2020.

(51) Int. Cl.
*G06V 10/82* (2022.01)
*G06V 40/10* (2022.01)

(56) References Cited

U.S. PATENT DOCUMENTS

| | | | |
|---|---|---|---|
| 6,377,353 | B1 | 4/2002 | Ellis |
| 6,549,289 | B1 | 4/2003 | Ellis |
| 6,569,092 | B1 | 5/2003 | Guichon et al. |
| 6,974,373 | B2 | 12/2005 | Kriesel |
| 7,039,220 | B2 | 5/2006 | Kriesel |
| 7,128,024 | B2 | 10/2006 | Doyle, II |
| 7,214,128 | B2 | 5/2007 | Kriesel |
| 7,399,220 | B2 | 7/2008 | Kriesel et al. |
| 7,817,824 | B2 | 10/2010 | Liang et al. |
| 8,514,236 | B2 | 8/2013 | Kobla et al. |
| 8,677,941 | B2 | 3/2014 | Yanai et al. |
| 8,755,570 | B2 | 6/2014 | Gomas et al. |
| 8,971,586 | B2 | 3/2015 | Gomas et al. |
| 9,521,829 | B2 | 12/2016 | McGlone et al. |
| 9,565,837 | B2 | 2/2017 | Bench et al. |
| 9,597,017 | B2 | 3/2017 | Axelsson et al. |
| 10,440,936 | B2 | 10/2019 | Yajima et al. |
| 10,614,310 | B2 | 4/2020 | Polak et al. |
| 10,639,014 | B2 | 5/2020 | Biondi |
| 10,701,905 | B2 | 7/2020 | Klein et al. |
| 11,568,530 | B2 | 1/2023 | Robertson et al. |
| 2010/0289879 | A1 | 11/2010 | Sinzinger et al. |
| 2011/0054338 | A1 | 3/2011 | Linker et al. |
| 2012/0089340 | A1* | 4/2012 | Huisma ............... G01G 19/4146 702/19 |
| 2013/0064432 | A1 | 3/2013 | Banhazi et al. |
| 2014/0029808 | A1* | 1/2014 | Lee ........................ G06V 40/10 382/110 |
| 2016/0073614 | A1 | 3/2016 | Lampe et al. |
| 2016/0363692 | A1 | 12/2016 | Arpin et al. |
| 2017/0196203 | A1* | 7/2017 | Huisma .................. G08C 17/02 |
| 2018/0049669 | A1 | 2/2018 | Vu et al. |
| 2018/0352144 | A1* | 12/2018 | Miao ....................... H04N 23/67 |
| 2019/0073553 | A1* | 3/2019 | Yao ........................ G06F 18/214 |
| 2019/0336041 | A1* | 11/2019 | Geissler ............. A61B 5/02055 |
| 2020/0120899 | A1 | 4/2020 | Labrecque et al. |
| 2020/0143157 | A1* | 5/2020 | Borchersen ............ A01K 11/00 |
| 2020/0196568 | A1 | 6/2020 | Robertson et al. |
| 2020/0202511 | A1 | 6/2020 | Robertson et al. |
| 2020/0225076 | A1* | 7/2020 | Fournier ................ G01G 17/08 |
| 2020/0242333 | A1 | 7/2020 | Schroff et al. |
| 2020/0387755 | A1* | 12/2020 | Hagen ................ G06V 10/7747 |
| 2021/0042527 | A1 | 2/2021 | Ton-That |
| 2021/0068404 | A1 | 3/2021 | Marruchella et al. |
| 2021/0259235 | A1* | 8/2021 | Candelore .............. G06V 40/10 |
| 2021/0357630 | A1* | 11/2021 | Shaevitz .............. G06V 10/764 |
| 2022/0061260 | A1* | 3/2022 | Gross ................... A01K 1/0023 |
| 2022/0104463 | A1* | 4/2022 | Spears ................. A01K 29/005 |
| 2023/0019190 | A1 | 1/2023 | Shamsuddin et al. |
| 2023/0023164 | A1* | 1/2023 | Parameswaran ... G06V 10/7753 |
| 2023/0320328 | A1* | 10/2023 | Nakamura ........... A01K 29/005 382/103 |

FOREIGN PATENT DOCUMENTS

| | | |
|---|---|---|
| EP | 3336783 A1 | 6/2018 |
| WO | 2013/170129 A9 | 11/2013 |
| WO | 2014/118788 A2 | 8/2014 |
| WO | 2016/192853 A1 | 12/2016 |
| WO | 2017/001538 A1 | 1/2017 |
| WO | 2017/030448 A1 | 2/2017 |
| WO | 2018/026838 A1 | 2/2018 |
| WO | 2019/090310 A1 | 5/2019 |
| WO | 2019/138329 A1 | 7/2019 |
| WO | 2020/003310 A1 | 1/2020 |
| WO | 2020/076225 A1 | 4/2020 |
| WO | 2021/030178 A1 | 2/2021 |

OTHER PUBLICATIONS

Awad et al. "Bag-of-Visual-Words for Cattle Identification from Muzzle Print Images", Appl. Sci. Sep. 2019, 4914.
Bergamini et al. (2018). "Multi-views Embedding for Cattle Re-identification". 184-191. 10.1109/SITIS.2018.00036.
Hu et al., "Cow identification based on fusion of deep parts features", Biosystems Engineering 192 (2020) 245-256.
Kim et al. "Vision-based Cattle Detection and Localization System in an RGB Color Space. Detection and localization system for cattle shed management", INTELLI 2013: The Second International Conference on Intelligent Systems and Applications, pp. 173-175, 2013.
Norouzzadeh et al. "Automatically identifying, counting, and describing wild animals in camera-trap images with deep learning" PNAS, vol. 115. No. 25, 2018.
Rivas et al. "Detection of Cattle Using Drones and Convolutional Neural Networks". Sensors. 2018; 18(7):2048.
Schroff et al. (2015). "Facenet: A unified embedding for face recognition and clustering". In Proceedings of the IEEE conference on computer vision and pattern recognition (pp. 815-823).
Yao et al. (May 2019). "Cow face detection and recognition based on automatic feature extraction algorithm". In Proceedings of the ACM turing celebration conference-china (pp. 1-5).
Yousif et al. "Animal Scanner: Software for classifying humans, animals, and empty frames in camera trap images". Ecology and Evolution 9.4 (2019): 1578-1589.
Zhang et al. "Joint Face Detection and Alignment Using Multi-task Cascaded Convolutional Networks", in IEEE Signal Processing Letters, vol. 23, No. 10, pp. 1499-1503, Oct. 2016.
Te-Food, "Face recognition for cattle?" https://medium.com/te-food/face-recognition-for-cattles-b12ad70dd114, Dec. 15, 2017.
Andrew et al. "Automatic individual holstein friesian cattle identification via selective local coat pattern matching in RGB-D imagery" University of Bristol (2016) pp. 484-488.
Koeleman "Artificial intelligence for better lameness control" Dairy Global (2017) pp. 1-3 <https://www.dairyglobal.net/industry-and-markets/smart-farming/artificial-intelligence-for-better-lameness-control/>.
Li et al. "Automatic individual identification of Holstein dairy cows using tailhead images" Computer and Electronics in Agriculture 142 (2017) pp. 622-631.
Carpentier et al. "Automatic cough detection for bovine respiratory disease in a calf house" Biosystems Engineering (2018) vol. 173, pp. 45-56.
Radio New Zealand "Facial recognition tech to be used on sheep for strategic farming" 2019) pp. 1-3 <https://www.rnz.co.nz/news/country/401492/facial-recognition-tech-to-be-used-on-sheep-for-strategic-farming>.
Sheep Central "NZ researchers are developing a sheep facial recognition system" 2019) pp. 1-3 <https://www.sheepcentral.com/sheep-can-recognise-faces-but-how-well-do-you-know-your-ewes/>.
Van Zyl "Unique Animal Identification using Deep Transfer Learning For Data Fusion in Siamese Networks" University of the Witwatersrand (2020) pp. 1-6.
Anderson et al. "Towards Machine Recognition of Facial Expressions of Pain in Horses" 2021) pp. 1-18.
Erdem "Animal recognition with Siamese Networks and Mean Embeddings" 2021) pp. 1-10 <https://erdem.pl/2021/02/animal-recognition-with-siamese-networks-and-mean-embeddings>.
Kang et al. "A Review: Development of Computer Vision-Based Lameness Detection for Dairy Cows and Discussion of the Practical Applications" National Library of Medicine (2021) pp. 1-23 <https://www.ncbi.nlm.nih.gov/pmc/articles/PMC7866151/>.
Li et al. "hSMAL: Detailed Horse Shape and Pose Reconstruction for Motion Pattern Recognition" 2021) pp. 1-6.

(56) References Cited

OTHER PUBLICATIONS

Notification of Material Filed by a Third Party, dated Aug. 24, 2023 in Australian Application No. 2021359652 (11 pages).

* cited by examiner

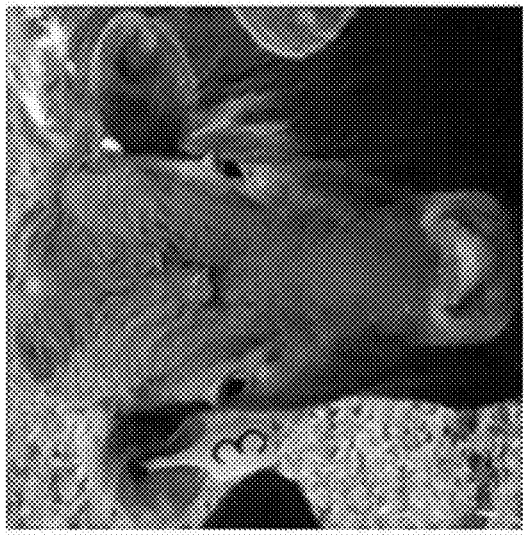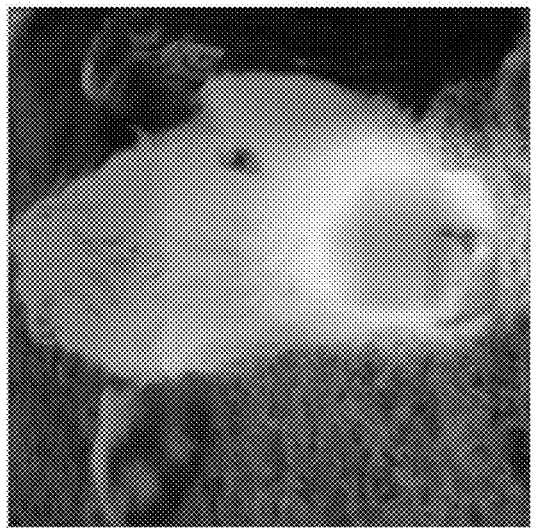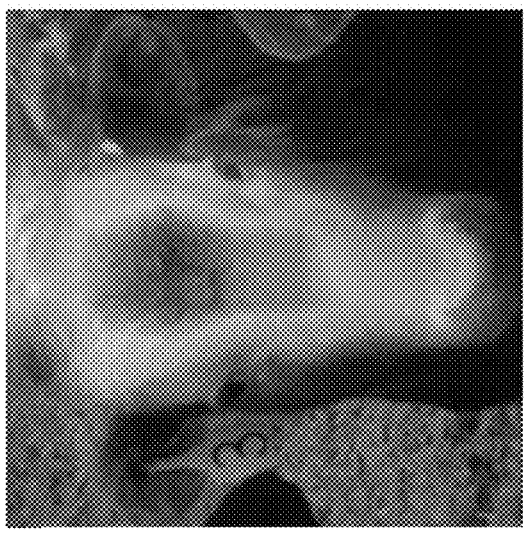
FIG. 35D
FIG. 35E

FIG. 40H

ANIMAL VISUAL IDENTIFICATION, TRACKING, MONITORING AND ASSESSMENT SYSTEMS AND METHODS THEREOF

CROSS-REFERENCE TO RELATED APPLICATION

The present application is a continuation of International patent application no. PCT/CA2021/051446 filed Oct. 14, 2021, which claims the benefit of priority of U.S. provisional patent application No. 63/091,697 filed Oct. 14, 2020, and the contents of both of which are incorporated herein by reference in their entirety.

FIELD

Various embodiments are described herein that generally relate to at least one of animal identification and assessment systems and methods, and in particular to animal identification and assessment systems and methods using computer vision and Artificial Intelligence (AI) technologies.

BACKGROUND

Animal management has important economic and ecological values. For example, the worldwide population of cattle ranges from 1 billion to 1.5 billion. Encompassing over 250 breeds, the cattle industry is a massive component of the worldwide economy. Approximately 1.3 billion people depend on cattle for their livelihood.

Canada is home to 12 million cattle scattered across 65,000 ranches and farms. The average ranch size is about 200 animals. Up to five institutions may handle an animal in its lifetime—ranches, community pastures, auctions, feedlots, and processing plants. Cattle contribute $18 billion CDN to the economy.

Cattle are found in over 170 countries. Among these countries, Canada is roughly 1% of the worldwide market. The USA and Europe are at 20 to 25 times the size of Canada. China, Brazil, and India also have a significant share of the global market. In some countries, cattle outnumber people.

Sheep ranks the second in livestock population with a total number over 1 billion. Hogs and pigs represent a market of 780 million livestock.

Thus, there is a great need for efficient systems and methods for tracking and managing livestock. Moreover, scientists, ecological researchers and activists, and governments also require efficient wildlife management systems and methods for tracking wildlife such as bear, elk, wolves, endangered animal species, and the like.

However, cattle ranchers and operators are still largely relying on the traditional, manual methods such as paperwork for livestock tracking. Such manual methods cannot easily scale up and may pose significant burden (if not impossible) to ranchers and operators for tracking and managing livestock of large numbers.

Tags are often used in livestock tracking and management. For example, drop tags may be attached to animals. An operator may visually read the drop tags and record drop tag information in hand-written form, or manually input the drop tag information into a computer-based database.

Radio-frequency identification (RFID) tags may also be attached to animals for animal tracking and management. However, RFID Tags usually have a short sensing range, e.g., a range of 1 to 2 feet.

Moreover, tags are usually easy to lose. For example, with cold winters and animals brushing against trees, typically 50% of tags may be lost over the animals' lifetime. Lost tags make it challenging to track cattle and fulfill government regulatory obligations.

In wildlife management, it is generally difficult to attach tags to wild animals and prevent attached tags from loss.

Animal management may also involve animal assessment such as animal weight tracking and animal disease prediction and monitoring. In the cattle industry, inaccuracy caused by approximated weighting leads to suboptimal food planning, medication, and cattle sales. Unknown weight may lead to lost revenue and additional expenses.

In wildlife management, it is often required to obtain animal weights for evaluating their life style, animal behavior, habitat, and/or the like.

Conventional methods of evaluating animals often require capturing and locking animals into position by using, e.g., head gates or similar equipment. However, such physical immobilization of animals in hands-on assessment and evaluation is time-consuming and stressful for the animals.

Animal disease prediction and monitoring is also important. For example, without diagnosis and treatment, a producer can lose many cattle to disease since many diseases, such as bovine respiratory disorder (BRD), for example, or dangerous conditions such as lameness, may be fatal and treatment thereof may require a veterinarian's intervention.

Therefore, there is a need of systems and methods for performing at least one of efficiently identifying, tracking, and managing animals.

SUMMARY OF VARIOUS EMBODIMENTS

In a broad aspect, in accordance with the teachings herein, there is provided at least one embodiment of an animal management system comprising: one or more imaging devices; a computing device coupled to the one or more image devices for receiving one or more images captured by the one or more imaging devices; processing each image using an artificial intelligence (AI) pipeline having one or more AI models for detecting and locating in the image one or more animals; and for each detected animal: processing the image of the detected animal to generate one or more sections using bounding boxes; determining a plurality of key points in each section; generating embeddings for each section of the image; and combining the embeddings for generating an identification or classification of the detected animal with a confidence score.

In at least one embodiment, a given animal is detected and located in the image by processing the image using a single-pass bounding box algorithm or a two stage network to detect the given animal and define a bounding box that indicates a location of the detected given animal in the image.

In at least one embodiment, the single-pass bounding box algorithm is implemented using a single-shot detector (SSD) algorithm or a DetectNet_V2 model and the two stage network is implemented using FasterRCNN.

In at least one embodiment, the one or more sections comprise a front-side head section, a left-side head section, a right-side head section, a top body section, a left-side body section, a right-side body section, a rear-side section, a drop tag section, a tail section, an udder section, a teat section, one or more knee sections, one or more hoof sections, a scrotum section, and/or one or more leg sections.

In at least one embodiment, each section is defined by a bounding box having a confidence score indicating an accuracy of the bounding box.

In at least one embodiment, the one or more AI models includes a bounding box prediction AI model comprising a DetectNet_V2 model to define the bounding box for the one or more sections.

In at least one embodiment, the key points correspond to features of one or more sections of the detected animal including one or more eyes, one or more ears, a nose, a mouth, a top of head, a bottom of head, a jaw, a hip, a lip, a neck, one or more joints or any combination thereof.

In at least one embodiment, the key points are determined using a MMPose model, a DeepPoseKit toolkit or an integrated pose model.

In at least one embodiment, the generated identification of the detected animal is a face identification, and the one or more sections are one or more of a front-side head section, a left-side head section and a right-side head section.

In at least one embodiment, defining the bounding box for each of the front-side head section, the left-side head section and the right-side head section includes one or more of cropping the head, scaling the head, and adding a margin if the bounding box is not square.

In at least one embodiment, the one or more AI models comprise a Face ID model to process the front-side head section, the left-side head section and/or the right-side head section to determine an identification for the animal.

In at least one embodiment, determining the plurality of key points in each section comprises determining M key points for the front-side head section, N key points for the left-side head section and P key points for the right-side head section where M, N and P are integers and greater than zero.

In at least one embodiment, processing each image for each detected animal further includes normalizing each of the one or more sections, based on the determined key points, by re-projecting each of the one or more sections to a common projection mapping.

In at least one embodiment, the one or more AI models comprises a Triplet Loss Siamese Network for generating the embeddings for each section.

In at least one embodiment, the Triplet Loss Siamese Network is trained using a triplet loss method for each section that it is provided with.

In at least one embodiment, training the Siamese Network using the triplet loss method comprises training the Siamese Network for each of the one or more sections.

In at least one embodiment, the triplet loss method includes training the Siamese Network using tuples of anchor, positive and negative pre-processed images.

In at least one embodiment, the pre-processed images are generated by normalizing and aligning the one or more sections by matching the determined plurality of key points for the one or more section to a key point template.

In at least one embodiment, the pre-processed images are generated by blocking portions of the section corresponding to a drop tag of the detected animal when the one or more sections include a front head section, a right side head section and/or a left side head section where the drop tag is visible.

In at least one embodiment, the number of dimensions of each embedding is selected from a range of 128 to 1024.

In at least one embodiment, the number of dimensions of each embedding is 512.

In at least one embodiment, the one or more sections comprise a drop tag section that is processed by a drop tag ID model to produce a ground truth identification; and wherein the computing device is further configured for comparing the generated identification with ground trust identification for verification.

In at least one embodiment, at least one of the one or more AI models are re-trained when the confidence level from the generated facial identifications trends lower than a threshold accuracy rate.

In at least one embodiment, the computing device provides an indication of the identification of one or more detected animals and corresponding confidence scores to a user device.

In at least one embodiment, the identification of one or more detected animals and corresponding confidence scores are stored in a database.

In at least one embodiment, the one or more imaging devices comprise at least one drone with camera, a surveillance camera, a video camera, a cellphone, a smartphone equipped with a camera or a combination thereof.

In at least one embodiment, the system may further comprise one or more LIDAR sensors and the computing device is configured to generate a 3D point cloud for the detected animal by combining data acquired by the LIDAR sensor for the one or more sections.

In at least one embodiment, the computing device is further configured to generate one or more animal assessments for a characteristic of the detected animal and the determined key points in one or more sections of the detected animal where the determined key points have a location that is physically related to the characteristic being assessed.

In at least one embodiment, the one or more sections include at least a first section corresponding to an ear feature of the detected animal, and the computing device is configured to: (a) assign key points for the at least first section; (b) determine a first angle between links corresponding to the key points assigned for the at least first section; (c) compare the first angle with a first threshold angle; and (d) assign a first stress assessment score corresponding to a difference between the first angle and the first threshold angle.

In at least one embodiment, the one or more sections include at least a second section corresponding to a tail feature of the detected animal, and the computing device is configured to: (a) assign key points for the second section; (b) determine a second angle corresponding to the key points assigned for the second section; (c) compare the second angle with a second threshold angle; and assign a second stress assessment score corresponding to a difference between the second angle and the second threshold angle.

In at least one embodiment, the one or more sections include at least a third section corresponding to a leg feature of the detected animal and the computing device is configured to: (a) assign key points for the third section; (b) determine a third angle between links corresponding to the key points assigned for the third section; (c) compare the third angle with a third threshold angle; and (d) determine an activity and optionally a corresponding activity statistic for the detected animal if the third angle exceeds the third threshold angle.

In at least one embodiment, the detected animal is a cow and the one or more animal assessments include a prediction for Bovine Respiratory Disease prediction.

In at least one embodiment, the generated identification of the detected animal is based on a tail identification, and the one or more sections includes a tail section.

In at least one embodiment, the generated identification of the detected animal is based a scrotum identification, and the one or more sections includes a scrotum section.

In at least one embodiment, the generated identification of the detected animal is based on a hide identification, and the one or more sections are one or more of a top body section, a left-side body section and a right-side body section.

In at least one embodiment, the one or more AI models for detecting and locating in the image one or more animals is further configured to classify the detected animals as one or more of a cow, a horse, a sheep, a bison, an elk, a goat, a swine, a llama, a camel, a cat and/or a dog.

In at least one embodiment, the key points are generated with a corresponding confidence score.

In at least one embodiment, links between adjacent key angles are formed and angles between adjacent links are determined to form key angles with a confidence score.

In at least one embodiment, the computing device is configured to generate a bounding box for a given detected animal in the image and a confidence score for the bounding box.

In at least one embodiment, the computing device is configured to annotate the image with the bounding box for the detected animal, the sections for the detected animal and/or the key points for the detected animal.

In at least one embodiment, the computing device is configured to annotate the image with confidence levels obtained for the bounding box, the sections and/or the key points for the detected animal.

In at least one embodiment, the detected animal is a cow and the AI pipeline comprises a classification layer having a BRD AI model that is trained to detect cows that have a likelihood of developing BRD, wherein the BRD AI model is adapted to receive at least one head section and key points thereof for the detected animal as inputs and generates a binary classification result to indicate whether the cow has BRD or not.

In at least one embodiment, the AI pipeline comprises a classification layer having a stress AI model that is trained to determine a level of stress that the detected animal is incurring, wherein the stress AI model is adapted to receive at least one head section and/or a tail section and key points of these sections and generates an ordinal output result for the level of stress being incurred by the detected animal.

In at least one embodiment, the AI pipeline comprises a classification layer having a lameness AI model that is trained to determine a level of lameness that the detected animal is incurring, wherein the lameness AI model is adapted to receive at least one leg section and key points thereof and generates an ordinal output result for the level of lameness being incurred by the detected animal.

In at least one embodiment, the AI pipeline comprises a classification layer having an activity AI model that is trained to determine when the detected animal is engaging in an activity, wherein the activity AI model is adapted to receive at least one leg section and key points thereof and generates an output result indicating whether the detected animal is engaging in the activity.

In at least one embodiment, the activity comprises standing, lying down or walking.

In another aspect, in accordance with the teachings herein, there is provided at least one embodiment of an animal management system comprising: one or more imaging devices; a computing device coupled to the one or more image devices for receiving one or more images captured by the one or more imaging devices; processing each image using an artificial intelligence (AI) pipeline having one or more AI models for detecting, locating and classifying in the image one or more animals; for at least one detected animal: generating one or more sections for the detected animal using an AI model selected based on the classification of the detected animal; determining a plurality of key points in each section; normalizing each of the one or more sections, based on the determined key points, by re-projecting each of the one or more sections to a common projection mapping; generating embeddings for each normalized section of the image; and combining the embeddings for generating an identification of the detected animal with a confidence score.

In at least one embodiment, each section is defined by a bounding box.

In at least one embodiment, each section is labeled with the identification of the detected animal.

In another aspect, in accordance with the teachings herein, there is provided at least one embodiment of an animal identification system for identifying an animal in an image, wherein the system comprises a memory configured to store one or more AI models; and a computing device coupled to the memory and configured to: receive at least one section of an animal, the section being defined by a bounding box determined from the image; receive key points assigned to the at least one section, the key points corresponding to one or more features of the animal; generate embeddings for the at least one section of the image; and combine the embeddings to generate an identification of the animal with a confidence score using the one or more AI models.

In at least one embodiment, the one or more AI models to generate the embeddings includes a Siamese Network.

In at least one embodiment, the Siamese Network is trained using a triplet loss method.

In at least one embodiment, the one or more AI models to generate the identification includes a classification network.

In at least one embodiment, the computing device is further configured to process the image by matching the key points to a key point template to normalize and align the key points to the key point template prior to generating the embeddings.

In at least one embodiment, the computing device is further configured to mask portions of the image section image corresponding to a drop-tag of the animal when the image section is a front head, left head or right head section that includes the drop-tag.

In another aspect, in accordance with the teachings herein, there is provided at least one embodiment of a method for animal management comprising: receiving, at a computing device, one or more images captured by one or more imaging devices; processing one or more images using an artificial intelligence (AI) pipeline having one or more AI models for detecting and locating in the image one or more animals; and for at least one detected animal: processing the image of the detected animal into one or more sections using bounding boxes; determining a plurality of key points in each section; generating embeddings for each section of the image; and combining the embeddings for generating an identification or classification of the detected animal with a confidence score.

In at least one embodiment, wherein the one or more sections comprise a drop tag section that is processed by a drop tag ID model to produce a ground truth identification; and wherein the computing device is further configured for comparing the generated identification with ground trust identification for verification.

In at least one embodiment, at least one of the one or more AI models are re-trained when the confidence level from the generated facial identifications trends lower than a threshold accuracy rate.

In at least one embodiment, the method further comprises providing an indication of the identification of one or more detected animals and corresponding confidence scores to a user device.

In at least one embodiment, the one or more imaging devices comprises a LIDAR sensor and the method comprises generating a 3D point cloud for the detected animal by combining data acquired by the LIDAR sensor for the one or more sections.

In at least one embodiment, the method comprises generating one or more animal assessments for a characteristic of the detected animal and the determined key points in one or more sections of the detected animal where the determined key points have a location that is physically related to the characteristic being assessed.

In at least one embodiment, the one or more sections include at least a first section corresponding to an ear feature of the detected animal, and the method further comprises: (a) assigning key points for the at least first section; (b) determining a first angle between links corresponding to the key points assigned for the at least first section; (c) comparing the first angle with a first threshold angle; and (d) assigning a first stress assessment score corresponding to a difference between the first angle and the first threshold angle.

In at least one embodiment, the one or more sections include at least a second section corresponding to a tail feature of the detected animal, and the method comprises: (a) assigning key points for the second section; (b) determining a second angle corresponding to the key points assigned for the second section; (c) comparing the second angle with a second threshold angle; and (d) assigning a second stress assessment score corresponding to a difference between the second angle and the second threshold angle.

In at least one embodiment, the one or more sections include at least a third section corresponding to a leg feature of the detected animal and the method comprises: (a) assigning key points for the third section; (b) determining a third angle between links corresponding to the key points assigned for the third section; (c) comparing the third angle with a third threshold angle; and (d) determining an activity and optionally a corresponding activity statistic for the detected animal if the third angle exceeds the third threshold angle.

In at least one embodiment, the method comprises generating a bounding box for a given detected animal in the image and a confidence score for the bounding box.

In at least one embodiment, the method comprises annotating the image with the bounding box for the detected animal, the sections for the detected animal and/or the key points for the detected animal.

In at least one embodiment, the method comprises annotating the image with confidence levels obtained for the bounding box, the sections and/or the key points for the detected animal.

In another aspect, in accordance with the teachings herein, there is provided at least one embodiment of a method for animal management comprising: receiving, at a computing device, one or more images captured by one or more imaging devices; processing at least one image using an artificial intelligence (AI) pipeline having one or more AI models for: detecting, locating and classifying in the image one or more animals; for at least one detected animal: generating one or more sections for the detected animal using an AI model selected based on the classification of the detected animal; determining a plurality of key points in each section; normalizing each of the one or more sections, based on the determined key points, by re-projecting each of the one or more sections to a common projection mapping; generating embeddings for each normalized section of the image; and combining the embeddings for generating an identification of the detected animal with a confidence score.

In at least one embodiment, each section is defined by a bounding box.

In at least one embodiment, each section is labeled with the identification of the detected animal.

In another aspect, in accordance with the teachings herein, there is provided at least one embodiment of a method of animal identification for identifying an animal in an image, wherein the method comprises: receiving at least one section of an animal, the section being defined by a bounding box determined from the image; receiving key points assigned to the at least one section, the key points corresponding to one or more features of the animal; generating embeddings for the at least one section of the image using the one or more AI models; and combining the embeddings to generate an identification of the animal with a confidence score using the one or more AI models.

In at least one embodiment, the one or more AI models to generate the embeddings includes a Siamese Network.

In at least one embodiment, the Siamese Network is trained using a triplet loss method.

In at least one embodiment, the one or more AI models to generate the identification includes a classification network.

In at least one embodiment, the method further comprises processing the image by matching the key points to a key point template to normalize and align the key points to the key point template prior to generating the embeddings.

In at least one embodiment, the method further comprises masking portions of the image section image corresponding to a drop-tag of the animal when the image section is a front head, left head or right head section that includes the drop-tag.

In another aspect, in accordance with the teachings herein, there is provided at least one embodiment of a method for animal management comprising: identifying a visually observable animal behavioral trait of interest receiving, at a computing device, one or more images captured by one or more imaging devices; processing each image using an artificial intelligence (AI) pipeline having one or more AI models for: detecting, locating and classifying in the image one or more animals; and for at least one detected animal: processing the image of the detected animal to generate one or more sections based on classification of the detected animal; determining a plurality of key points in each section; normalizing each of the one or more sections, based on the determined key points, by re-projecting each of the one or more sections to a common projection mapping; generating embeddings for each normalized section of the image; combining the embeddings for generating an identification of the detected animal with a confidence score; and determining if the detected animal displays the visually observable trait.

In at least one embodiment, the visually observable animal behavioral trait is a symptom associated with a medical condition.

In at least one embodiment, the animal is a cow and the medical condition is lameness or BRD.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 35A to 35E show examples of facial identification and heat map generation performed on different breeds of cattle by at least one embodiment of the animal identification and assessment systems described herein.

FIG. 40H shows an example embodiment of a GUI that may be used by at least one embodiment of an animal identification and assessment system described herein to allow a user to view a list of the animals and associated data at a site and select one of the animals to view more in-depth data therefor.

Figure 1A:
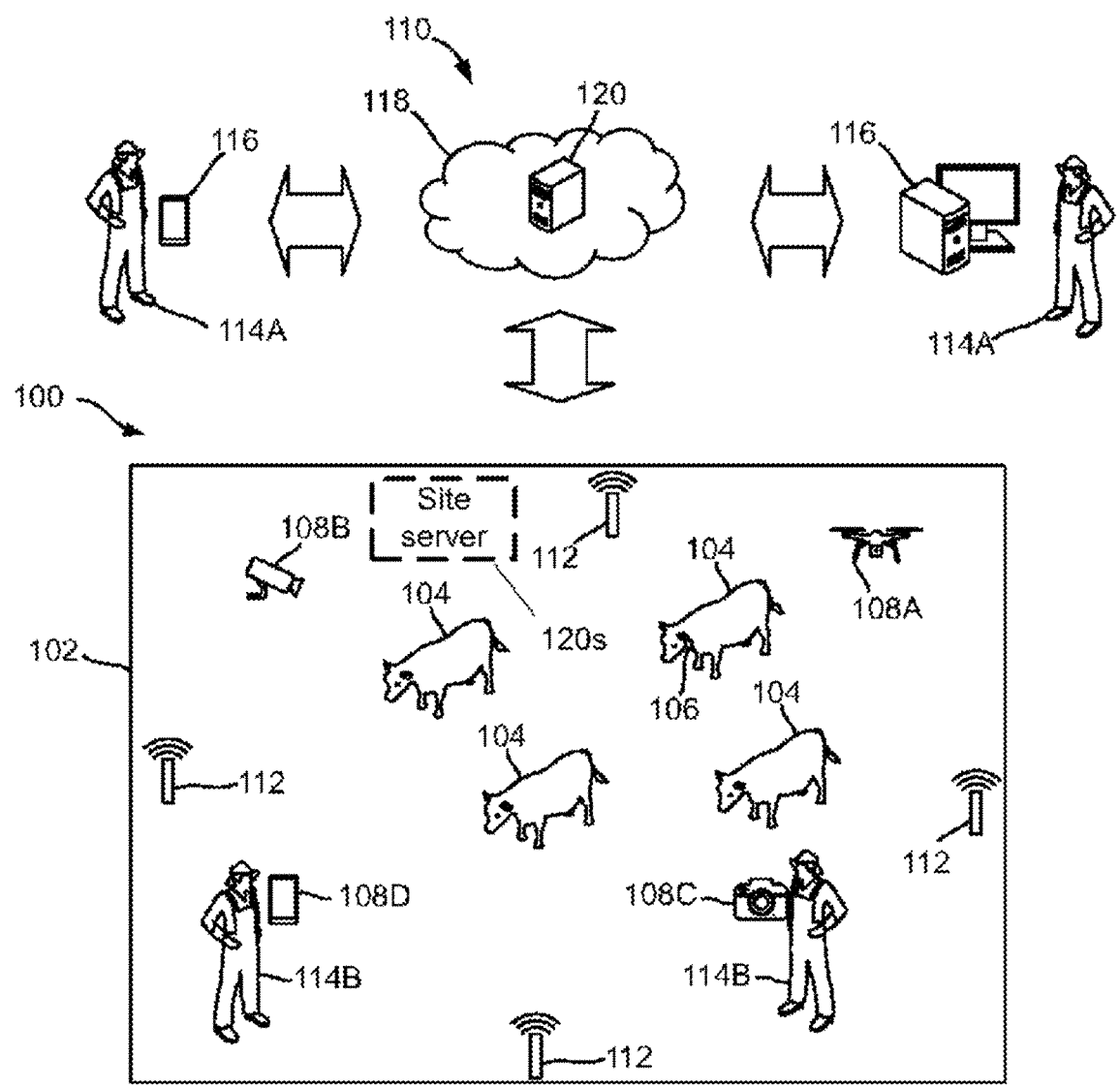
FIG. 1A is a schematic diagram showing an application of an animal identification and assessment system, according to at least one example embodiment of this disclosure.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element, depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

At least a portion of the example embodiments of the systems or methods described in accordance with the teachings herein may be implemented as a combination of hardware or software. For example, a portion of the embodiments described herein may be implemented, at least in part, by using one or more computer programs, executing on one or more programmable devices comprising at least one processing element, and at least one data storage element (including volatile and non-volatile memory). These devices may also have at least one input device (e.g., a touchscreen, and the like) and at least one output device (e.g., a display screen, a printer, a wireless radio, and the like) depending on the nature of the device.

It should also be noted that some elements that are used to implement at least part of the embodiments described herein may be implemented via software that is written in a high-level procedural language such as object-oriented programming. The program code may be written in JAVA, PYTHON, C, C++, Javascript or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage medium (e.g., a computer readable medium such as, but not limited to, ROM, flash memory, magnetic disk, optical disc) or a device that is readable by a programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, DVD, tapes, chips, and magnetic, optical and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

Embodiments disclosed herein generally relate to a computer-vision based Artificial Intelligence (AI) system and method for identifying, tracking, and managing animals. The AI system uses a plurality of AI models arranged according to an AI pipeline structure so that the system disclosed herein may uniquely and consistently identify animals at a site such as a ranch or feedlot.

In a first aspect, at least one embodiment of the systems and methods disclosed herein may simultaneously monitor one or more animals in a herd for tracking and managing various aspects of the tracked animals such as, but not limited to, their health, activity, and/or nutrition, for example.

In a second aspect, the at least one embodiment of the systems and methods disclosed herein may continuously operate and/or proactively notify personnel at the site, such as ranch handlers for example, of any tracked animals who may require human intervention.

Depending on the imaging devices or cameras used, the system disclosed herein may identify an animal from various distances. For example, in at least one embodiment of the system disclosed herein, an animal may be identified from up to 10 meters (m) away from an imaging device (for example, about 1 m, 2 m, 3 m, 4 m, 5 m, 6 m, 7 m, 8 m, 9 m or 10 m away) when the animal is still, and once identified, tracked up to 20 m, 30 m, 40 m or 50 m away from the imaging device with a visual lock. In at least one embodiment, where high-performance cameras such as optical-zoom cameras are used, for example, the system disclosed herein may identify animals from further distances. In one example, the system may include 25× optical-zoom cameras that are used to identify animals with sufficient confidence (described further below) from more than 60 meters, more than 70 meters, more than 80 meters, more than 90 meters, or more than 100 metres away In another aspect, as will be described in more detail below, at least one embodiment of the system disclosed herein may identify animals in an image wherein the image may be obtained by an image acquisition device that is positioned from one or more angles relative to the animals.

In another aspect, at least one embodiment of the system described herein may allow one or more operators at a site to communicate with a server of the system via their handheld devices, such as smartphones or tablets, for example, and view identified animals, and optionally data about the identified animals, based on images of the animals that may be captured from one or more angles relative to the animals.

In another aspect, at least one embodiment of the system disclosed herein may be used to perform animal identification over-time, using one or more physical features of an animal.

For example, at least one embodiment of the system disclosed herein may process images of animals taken from any angles relative to the animals and identify animals in the images by (i) detecting the animals in an image, (ii) processing the image of a detected animal to generate a plurality of sections, and (iii) applying key points to the sections. The key points and sections may then be weighted and combined using an AI model to make a final prediction of the animal's identity and also generate the level of confidence that the final prediction is accurate.

In at least one embodiment, the sections may comprise various combinations of a front-side head section, a left-side head section, a right-side head section, a top body section, a left-side body section, a right-side body section, a rear-side section, four leg sections, and/or a drop-tag section, since some of these sections may be optional in certain embodiments.

In at least one embodiment, the animal's stride may also be tracked over time to make a prediction of its gait.

In another aspect, at least one embodiment of a system is disclosed herein, where animals may be automatically identified and tracked, thereby greatly simplifying transporting cattle and farm-to-table traceability.

In another aspect, in at least one embodiment, a system is disclosed herein which can also perform one or more assessments on identified animals. In such embodiments, by continuously or periodically assessing the conditions of the animals, the system disclosed herein may provide various benefits to users, such as ranch operators, for one or more of the following conditions.

(1) Lameness detection: On a ranch, cattle may not be seen for weeks or can hide injury instinctively. In another aspect, at least one embodiment of the system disclosed herein may be used to detect lameness and notify users to take necessary actions on any animals with detected lameness (2) Bovine Respiratory Disease (BRD) detection: Bovine Respiratory Disease or BRD can infect 20% of cattle in feedlots and can be responsible for up to 80% of animal deaths. In another aspect, at least one embodiment of the system disclosed herein may be used to predict BRD and notify users to take necessary actions on any animals that are predicted to have BRD.

(3) Pain and stress management: Pain management can lead to healthier and happier animals, such as cattle. In another aspect, at least one embodiment of the system disclosed herein may be used to assess pain and stress of one or more animals and notify users to take necessary actions when the pain and/or stress measured for a given animal is excessive, which may be determined by comparing the measured pain and/or stress to a pain threshold and/or a stress threshold.

In another aspect, in at least one embodiment of the system disclosed herein the system may train the AI models that are used continuously or periodically during operation or periodically when the system is not being operated for performing various processes on images/videos containing animals. For example, at least one embodiment of the system disclosed herein may be trained in lameness detection by using positive and negative images or videos of lame cattle, where positive images/videos show healthy animals displaying normal gait or stride, and negative images/videos show unhealthy animals, that are experiencing various levels of lameness (as discussed later In another aspect, in at least one embodiment, the system disclosed herein may process an animal image to generate bounding boxes for various sections of the animal and optionally mask some sections thereof as needed.

In at least one embodiment, the processing may involve applying one or more AI models that generate the bounding box for a section of the animal along with a confidence score indicating the accuracy of the bounding box location. In such embodiments, masking may not be needed. Alternatively, in at least one embodiment, segmentation may be used on the animal image to generate the bounding boxes.

In another aspect, in at least one embodiment disclosed herein, the system may be configured to apply key points to at least one animal section in an image of an animal for forming portions of the animal's face and/or skeleton. The key points maybe determined using one or more AI models. The key points may be used in various applications including, but not limited to, performing identification, determining gait, determining stride, and/or determining lameness.

In another aspect, at least one embodiment of the system disclosed herein may be trained with images and/or videos to learn certain characteristics of animals over time. For example, the collected temporal data may be used for learning how to accurately determine when an animal is coughing, or determining an animal's breathing rate.

System Overview

Turning now to FIG. 1A, an animal identification and assessment system, according to at least one embodiment of this disclosure, is shown and is generally identified using reference numeral 100. The animal identification and assessment system 100 is generally associated with a site 102 that includes animals. The site 102 may be an outdoor site, an indoor site, or a site with indoor and outdoor spaces. Furthermore, the site may be an enclosed site, such as a barn, a pen, or a fenced lot, and/or the like, or the site may be open, such as a wild life park or a natural animal habitat. Examples of the site 102 may be a livestock ranch, a ranch facility, an animal habitat, and/or the like. The site 102 generally comprises a plurality of animals 104 such as livestock (e.g., cows, horses, pigs, sheep, chickens, and/or the like) and/or wild animals (e.g., bison, wolves, elk, bears, goats, elephants, birds, and/or the like). In at least one embodiment, one or more animals 104 may be also associated with an identification (ID) tag 106, such as a visible ID tag attached therewith.

The system 100 comprises one or more imaging devices 108 that are deployed or deployable at the site 102 and are adapted to communicate with a server 120 via a communication network. For example, the imaging devices 108 may communicate with a computer cloud 110 directly or via suitable intermediate communication nodes 112 such as access points, switches, gateways, routers, and/or the like that are deployed at the site 102 or at a site remote to the site 102. In an alternative embodiment, the imaging devices 108 may communicate with a site server 120s that is located at site 102, or remote to the site 102. The site server 120s may then communicate with the server 120, which may be located at the site 102 or remote to the site 102. One or more first users 114A may operate suitable client computing-devices 116 to communicate with the computer cloud 110 for monitoring the animals 104 at the site 102.

Figure 1B:
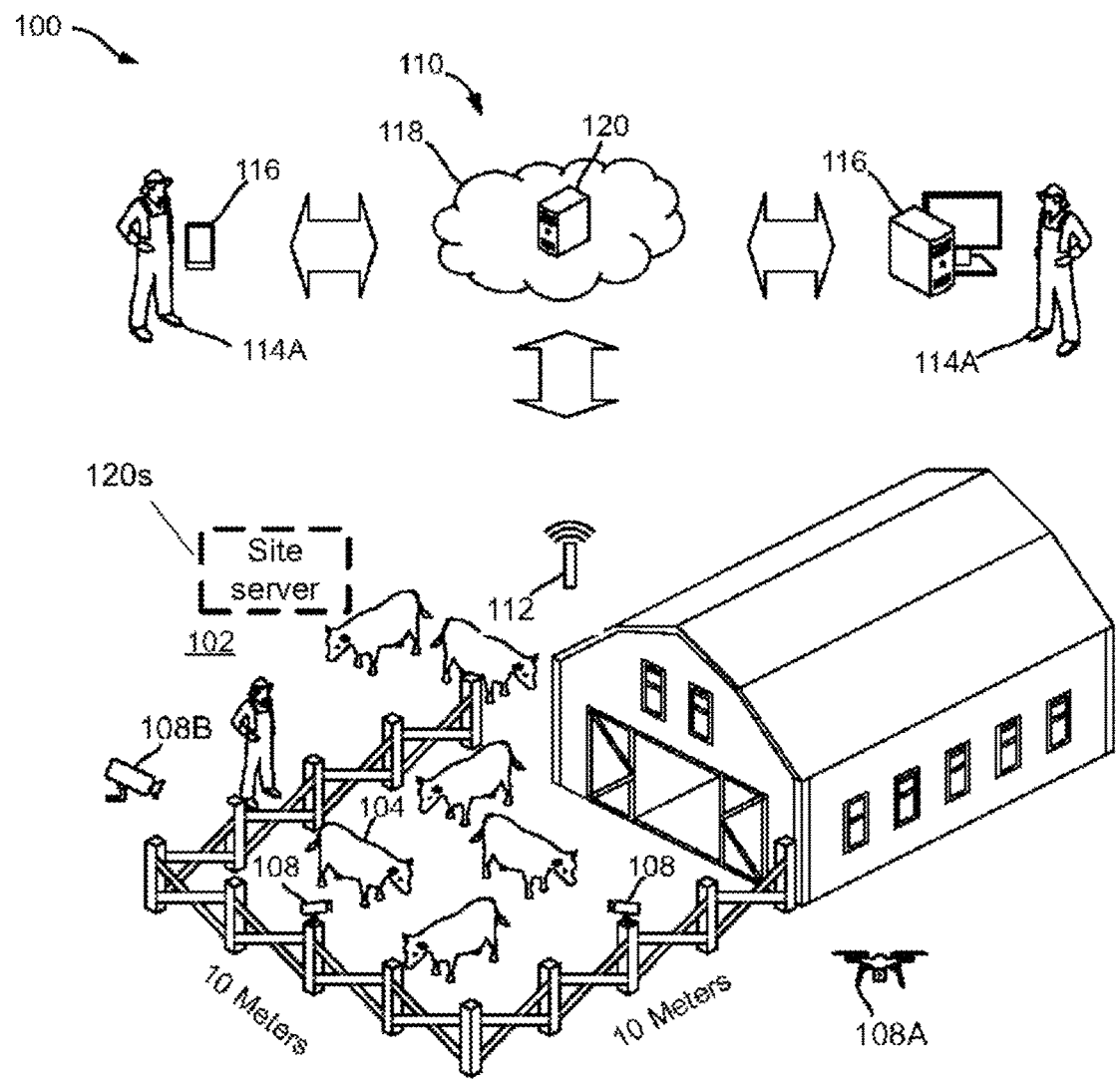
FIG. 1B is a schematic diagram showing another example application of the animal identification and assessment system of FIG. 1A.

FIG. 1B shows another example use of the system 100 shown in FIG. 1A. In this example, the site 102 is a fenced site with a barn accessible to the animals 104. One or more imaging devices 108B may be installed at the site 102 such as on the fence. Alternatively, a mobile imaging device, i.e., a drone 108A may be used to monitor the site 102.

The one or more imaging devices 108 may be any suitable imaging devices such as one or more drones 108A equipped with suitable cameras, one or more surveillance cameras 108B mounted at predefined anchor locations, one or more video cameras 108C movable with and operable by one or more second users 114B such as farmers, researchers, and/or the like, one or more cellphones or smartphones 108D equipped with suitable cameras and movable with and operable by the one or more second users 114B, and/or the like. In at least one embodiment, the first and second users 114A and 114B may be different users while in at least one other embodiment, the first and second users 114A and 114B may be the same users.

Herein, the cameras 108 may be any suitable cameras for capturing images under suitable lighting conditions, such as any combination of one or more visible-light cameras, one or more infrared (IR) cameras, and/or the like. Depending on the types of the imaging devices 108, the deployment locations thereof, and/or the deployment/operation scenarios (e.g., deployed at fixed locations or movable with the user 114A during operation), the imaging devices 108 may be powered by any suitable power sources such as power grid, batteries, solar panels, Power of Ethernet (POE), and/or the like.

Moreover, the imaging devices 108 may communicate with other devices via any suitable interfaces such as the Camera Serial Interface (CSI) defined by the Mobile Industry Processor Interface (MIPI) Alliance, Internet Protocol (IP), Universal Serial Bus (USB), Gigabit Multimedia Serial Link (GMSL), and/or the like. The imaging devices 108 generally have a resolution (e.g., measured by number of pixels) sufficient for the image processing described later. The imaging devices 108 that are used may be selected such that they are able to acquire images that preferably have a high resolution such as, but not limited to, 720p (1280×720 pixels), 1080p (1920×1080 pixels), 2K (2560×1440 pixels) or 4K (3840×2160 pixels), for example. Some or all imaging devices 108 may have a zoom function. Some or all imaging devices 108 may also have an image stabilization function and motion activated function.

In at least one embodiment, at least one of the imaging devices 108 may be controlled by the system 100 such that the angle, amount of zoom and/or any illumination of the imaging device 108 may be controlled with a server (e.g., server 120 or server 120s) that is associated with system 100. Alternatively, any mobile imaging devices 108b may be controlled to go from one site to another site or to move around larger sites in a controlled manner where the flight path of drone 108A is pre-defined or controlled by a user. In these embodiments, a server (e.g., server 120 or server 120s) of the site that provides these control signals to the imaging devices 108 may do so under program control or under control commands provided by system personnel.

Figure 2:
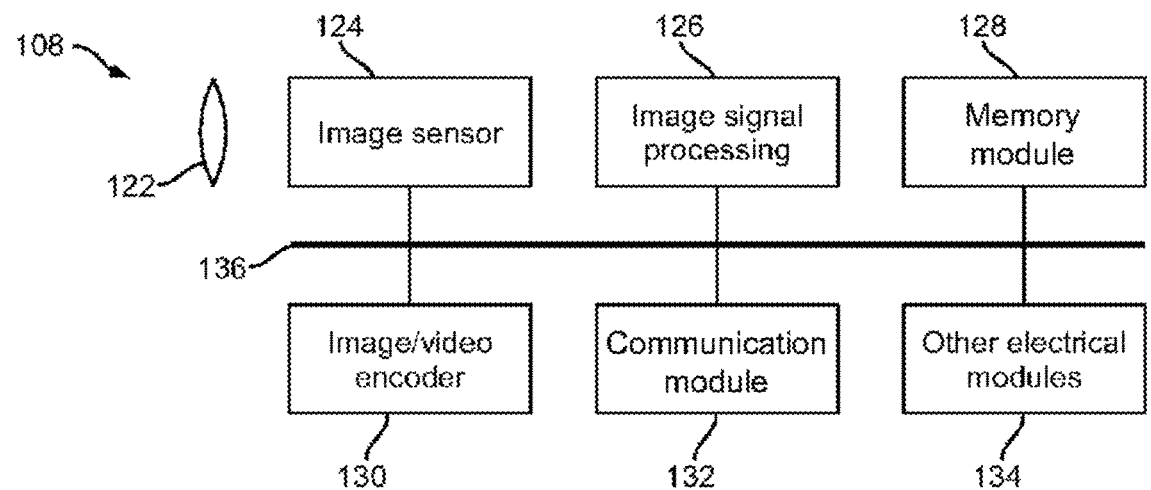
FIG. 2 is a schematic diagram illustrating an example embodiment of the hardware structure of an imaging device that may be used with the animal identification and assessment system of FIG. 1A.

FIG. 2 is a schematic diagram illustrating the hardware structure of the imaging device 108. As shown, the imaging device 108 comprises an image sensor 124, an image signal processing module 126, a memory module 128, an image/video encoder 130, a communication module 132, and other electrical modules 134 (e.g., lighting modules, phone modules when the imaging device 108 is a smartphone, motion sensing modules, and/or the like). The imaging device 108 also comprises a lens module 122 coupling to image sensor 124 for directing light to the image sensor 124 with proper focusing. The imaging device 108 may further comprise other mechanical, optical, and/or electrical modules such as an optical zoom module, panning/tilt module, propeller and flight control modules (if the imaging device 108 is a drone), and/or the like. The various elements of the imaging device 108 are interconnected by a system bus 136 to allow transfer of data, and control signals therebetween. Also included, but not shown, is a power supply and a power bus for providing power to various elements of the imaging device 108. It should be understood that by referring to various elements herein with the word module this implies that these elements include hardware.

The image sensor 124 may be a complementary metal oxide semiconductor (CMOS) image sensor, a charge coupled device (CCD) image sensor, or any other suitable image sensor.

The image signal processing module 126 receives captured images from the image sensor 124 and processes received images as needed, for example, automatically adjusting image parameters such as exposure, white balance, contrast, brightness, hue, and/or the like, digital zooming, digital stabilization, and the like. The image signal processing module 126 includes one or more processors with suitable processing power for performing the required processing.

The memory module 128 may comprise one or more non-transitory machine-readable memory units or storage devices accessible by other modules such as the image signal processing module 126, the image/video encoder module 130, and the communication module 132 for reading and executing machine-executable instructions stored therein (e.g., as a firmware), and for reading and/or storing data such as data of captured images and data generated during the operation of other modules. The memory module 128 may be volatile and/or non-volatile, non-removable or removable memory such as RAM, ROM, EEPROM, solid-state memory, hard disks, CD, DVD, flash memory, and/or the like.

The image/video encoder module 130 encodes captured images into a format suitable for storage and/or transmission such as jpeg, jpeg2000, png, and/or the like. The image/video encoder module 130 may also encode a series of captured images (also denoted a captured "video stream" or "video clip") and associated audio signals into a format suitable for storage and/or transmission using a customized or standard audio/video coding/decoding (codec) technology such as H.264, H.265, HVEC, MPEG-2, MPEG-4, AVI, VP3 to VP9 (i.e., webm format), MP3 (also called MPEG-1 Audio Layer III or MPEG-2 Audio Layer III), FTP, Secure FTP, RTSP, and/or the like.

The communication module 132 is adapted to communicate with other devices of the animal identification and assessment system 100, e.g., for receiving instructions from the computer cloud 110 and transmitting encoded images (generated by the image/video encoder module 130) thereto, via suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP 5G networks, and/or the like.

In at least one embodiment, the imaging devices 108 maybe Internet of Things (IoT) devices and the communication module 132 may communicate with other devices using a suitable low-power wide-area network protocol such as Long Range (LoRa), Bluetooth Low Energy (BLE), Z-Wave, and/or the like.

In at least one embodiment, parallel ports, serial ports, USB connections, optical connections, or the like may also be used for connecting the imaging devices 108 with other computing devices or networks although they are usually considered as input/output interfaces for connecting input/output devices. In at least one embodiment, removable storage devices such as portable hard drives, diskettes, secure digital (SD) cards, minSD cards, microSD cards, and/or the like may also be used for transmitting encoded images or video clips to other devices.

The computer cloud 110 generally comprises a network 118 and one or more server computers 120 connected thereto via suitable wired and wireless networking connections. The network 118 may be any suitable network such as a local area network (LAN), a wide area network (WAN), a metropolitan area network (MAN), the Internet, and/or the like.

The server computer 120 may be a server-computing device, and/or a computing device acting as a server computer while also being used by a user. The client computing devices 116 may be any suitable portable or non-portable computing devices such as desktop computers, laptop computers, tablets, smartphones, Personal Digital Assistants (PDAs), and/or the like. In each of these cases, the computing devices have one or more processors that are programmed to operate in a new specific manner when executing programs for executing various aspects of the processes described in accordance with the teachings herein.

Figure 3:
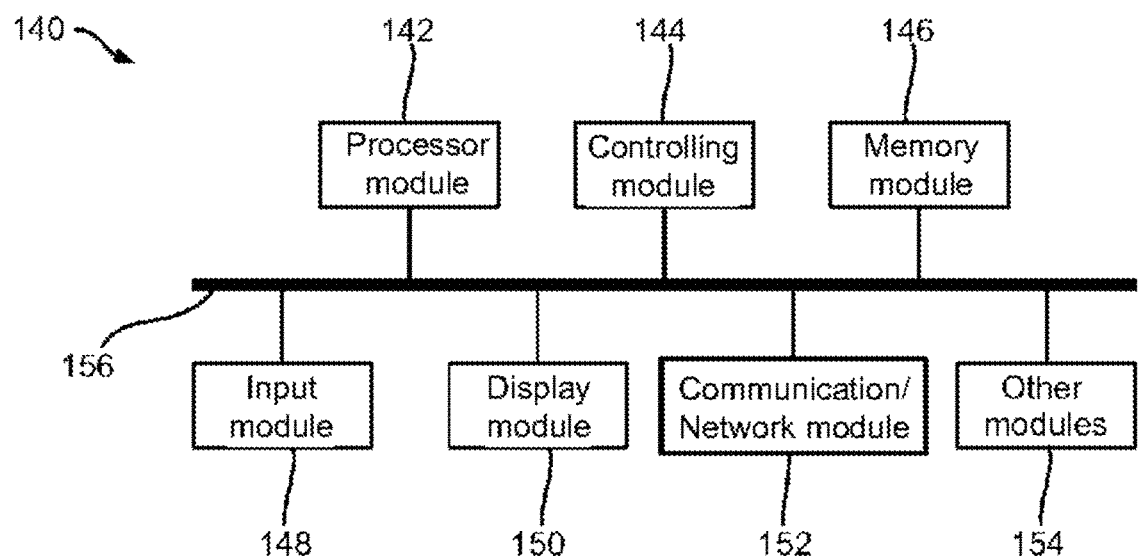
FIG. 3 is a schematic diagram illustrating an example embodiment of the hardware structure of the client computing devices and server computer of the animal identification and assessment system of FIG. 1A.

Generally, the client computing devices 116 and the server computers 120, 120s have a similar hardware structure such as a hardware structure 140 shown in FIG. 3. As shown, the computing device 116/120 comprises a processor module 142, controlling module 144, a memory module 146, an input module 148, a display module 150, a communication/networking module 152, and other modules 154, with these various elements being interconnected by a system bus 156. It should be understood that by referring to various elements herein with the word module, this implies that these elements include hardware.

The processor module 142 may comprise one or more single-core or multiple-core processors such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like.

The controlling module 144 comprises one or more controlling circuits, such as graphic controllers, input/output chipsets and the like, for coordinating operations of various hardware components and modules of the computing device 116/120.

The memory module 146 includes one or more non-transitory machine-readable memory units or storage devices accessible by the processor module 142 and the controlling module 144 for reading and/or storing machine-executable instructions for the processor module 142 to execute, and for reading and/or storing data including input data and data generated by the processor module 142 and the controlling module 144. The memory module 146 may be volatile and/or non-volatile, non-removable or removable memory such as RAM, ROM, EEPROM, solid-state memory, hard disks, CD, DVD, flash memory, or the like. In use, the memory module 146 is generally divided to a plurality of portions for different use purposes. For example, a portion of the memory module 146 (denoted as storage memory herein) may be used for long-term data storing, for example, for storing files or databases. Another portion of the memory module 146 may be used as the system memory for storing data during processing (denoted as working memory herein).

The input module 148 comprises one or more input interfaces for coupling to various input devices such as keyboard, computer mouse, trackball, touch-pad, touch-sensitive screen, touch-sensitive whiteboard, or other human interface devices (HID). The input device may be a physically integrated part of the computing device 116/120 (e.g., the touch-pad of a laptop computer or the touch-sensitive screen of a tablet), or may be a device physically separate therefrom but functionally coupled thereto (e.g., a computer mouse). The input module 158 may also comprise other input interfaces and/or input devices such as microphones, scanners, cameras, Global Positioning System (GPS) components, and/or the like.

The display module 150 comprises one or more display interfaces for coupling to one or more displays such as monitors, LCD displays, LED displays, projectors, and the like. The display may be a physically integrated part of the computing device 116/120 (e.g., the display of a laptop computer or tablet), or may be a display device physically separate therefrom but functionally coupled thereto (e.g., the monitor of a desktop computer). In at least one embodiment, the display module 150 may be integrated with a coordinate input to form a touch-sensitive screen or touch-sensitive whiteboard.

The communication/network module 152 is adapted to communicate with other devices of the animal identification and assessment system 100 through the network 118 using suitable wired or wireless communication technologies such as those described above.

The computing device 116/120 may further comprise other modules 154 such as speakers, printer interfaces, phone components, and/or the like.

The system bus 156 interconnects various components 142 to 154 for enabling them to transmit and receive data and control signals to and from each other as required. Also included, but not shown, is a power supply and a power bus for providing power to these elements.

Figure 4:
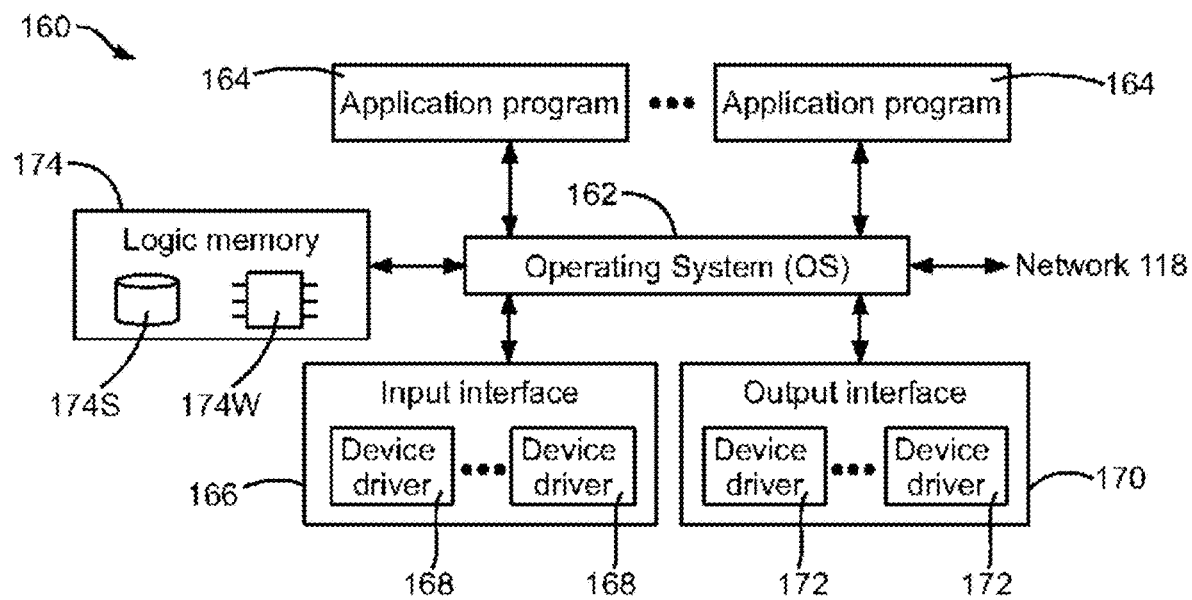
FIG. 4 is schematic diagram illustrating an example embodiment of a simplified software architecture of the client computing devices and server computer of the animal identification and assessment system of FIG. 1A.

FIG. 4 shows a simplified software architecture 160 of the computing device 116/120. The software architecture 160 comprises an operating system (OS) 162, a plurality of application programs 164, an input interface 166 having a plurality of input-device drivers 168, an output interface 170 having a plurality of output-device drivers 172, and a logic memory 174. The operating system 162, application programs 164, input interface 166, and output interface 170 are generally implemented as computer-executable instructions or code in the form of software code or firmware code stored in the logic memory 174 which may be executed by the processor module 142.

The OS 162 manages various hardware components of the computing device 116/120 via the input interface 166 and the output interface 170, manages the logic memory 174, and manages and supports the application programs 164. The OS 162 is also in communication with other computing devices (not shown) via the network 118 to allow application programs 164 to communicate with those running on other computing devices. As those skilled in the art will appreciate, the operating system 162 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google Inc., Mountain View, CA, USA), or the like. The computing devices 116/120 may all have the same OS, or may have different OS's.

The application programs 164 are executed or run by the processor module 142 (e.g., see: FIG. 3) for performing various tasks. Herein, the application programs 164 running on the server computers 120 (denoted "server programs") perform tasks to provide server functions for managing network communication with client computing devices 104 and facilitating collaboration between the server computer 102 and the client computing devices 104. The server programs also perform one or more tasks for at least one embodiment of the animal identification and assessment system 100 described herein based on images captured by the imaging devices 108. Herein, the term "server" may refer to a server computer 120 from a hardware point of view or a logical server from a software point of view, depending on the context.

The application programs 164 running on the client computing devices 116 (denoted "client programs" or so-called "apps") perform tasks for communicating with the server programs for inquiry of animal identification and assessment data and for displaying same on a display of the client computing devices 104.

The input interface 166 comprises one or more input device drivers 168 managed by the operating system 162 for communicating with the input module 148 and respective input devices. The output interface 170 comprises one or more output device drivers 172 managed by the operating system 162 for communicating with respective output devices including the display module 150. Input data received from the input devices via the input interface 166 is processed by the application programs 164 (directly or via the OS 162). The output generated by the application programs 164 is sent to respective output devices via the output interface 170 or sent to other computing devices via the network 118.

The logic memory 174 is a logical mapping of the physical memory module 146 for facilitating access to various data by the application programs 164. In at least one embodiment, the logic memory 174 comprises a storage memory area (174S) that may be mapped to a non-volatile physical memory such as hard disks, solid-state disks, flash drives, and the like, generally for long-term data storage (including storing data received from other devices, data generated by the application programs 164, the machine-executable code or software instructions of the application programs 164, and/or the like). The logic memory 174 also comprises a working memory area (174W) that is generally mapped to high-speed, and in some implementations, volatile, physical memory such as RAM, generally for application programs 164 to temporarily store data (including data received from other devices, data generated by the application programs 164, the machine-executable code or instruction of the application programs 164, and/or the like) during program execution. For example, a given application program 164 may load data from the storage memory area 174S into the working memory area 174W and may store data generated during its execution into the working memory area 174W. A given application program 164 may also store some data into the storage memory area 174S, as required or in response to a user's command.

With the hardware and software structures described above, at least one embodiment of the animal identification and assessment system 100 is configured to identify at least one animal at the site 102 and, in some cases, assess at least one of the conditions of an identified animal. In particular, the various embodiments of the animal identification and assessment system 100 described herein generally use a multi-layer artificial intelligence (AI) pipeline that is organized among several layers or levels that each have AI models where each level has a unique overarching purpose. The AI models may be implemented using various machine learning algorithms depending on the functionality of the AI models since some machine learning algorithms are better suited than others at performing certain functions. Examples of machine learning algorithms that may be used by the system 100 include, but are not limited to, one or more of Pre-Trained Neural Network (PTNN), Transfer Learning, Convolutional Neural Networks (CNN), Deep Neural Networks (DNN), Deep Convolutional Neural Networks (DCNN), Fully Connected Networks (FCN), Recurrent Neural Networks (RNN), Long Term Short Term (LSTM), Transformer Networks, and/or Pyramid Networks for performing certain functions such as, but not limited to, identifying an animal from its appearance from one or more angles. The neural networks that are used by the system 100 may operate individually or together in a chaining tree.

Figure 5:
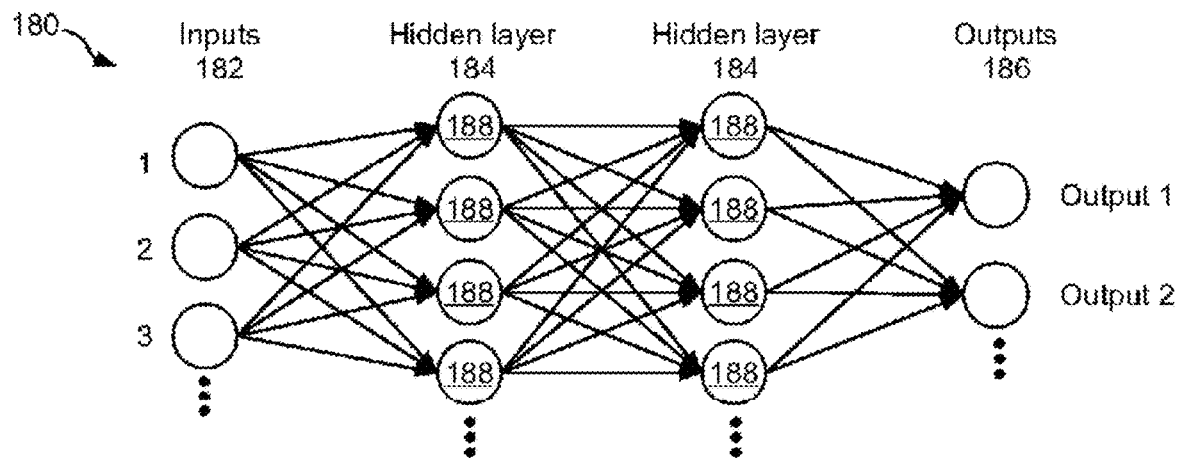
FIG. 5 is a schematic diagram of a deep neural network (DNN) that may be used by the animal identification and assessment system of FIG. 1A.

Referring now to FIG. 5, shown therein is a schematic diagram of an example of a DNN 180 which generally comprises an input layer 182, a plurality of hidden layers 184, and an output layer 186 cascaded in series. Each layer comprises a plurality of nodes with each node in a layer connecting to a plurality of nodes in a subsequent layer. Each node is a computational unit having a plurality of weighted or unweighted inputs from the nodes of the previous layer that it is connected to (denoted "input nodes" thereof), a transfer function for processing these inputs to generate a result, and an output for outputting the result to one or more nodes of the subsequent layer connected thereto.

Animal Identification

Figure 6:
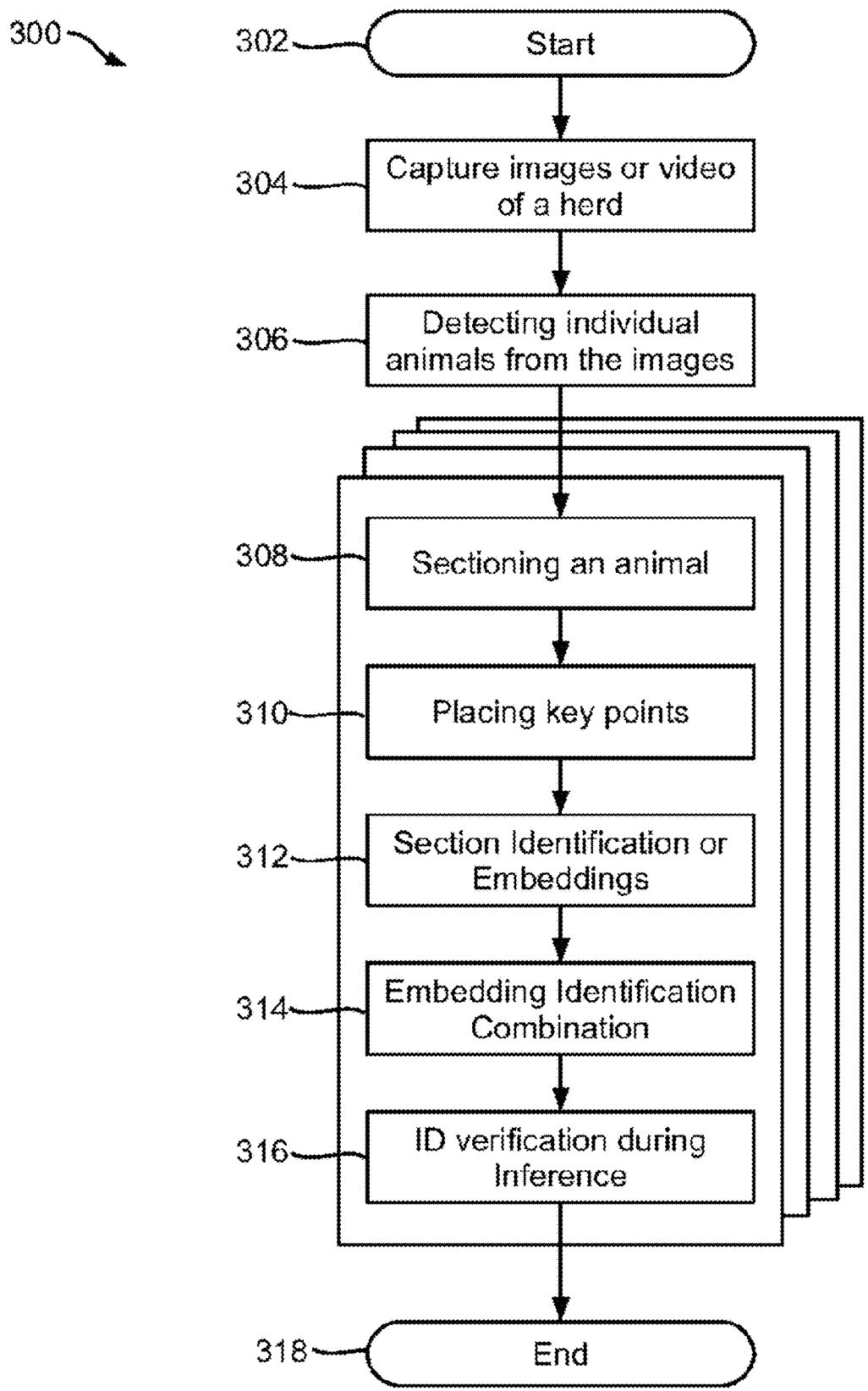
FIG. 6 is a flowchart showing an example embodiment of an animal identification process that may be executed by a server program of the animal identification and assessment system of FIG. 1A, for identifying at least one animal at the site using an Artificial Intelligence (AI) pipeline.

FIG. 6 is a flowchart showing an example embodiment of an animal identification process 300 that may be implemented using one or more server programs 164 operating on one or more processors of the processor module 142 in at least one embodiment of the system 100 for identifying at least one animal at the site 102 using an AI pipeline. For ease of description, cow or cattle is used hereinafter as an example of the animal in describing the process 300, but the process 300 may be applied to other types of animals.

In various embodiments, the process 300 may start (step 302) automatically (e.g., periodically), manually under a user's command, or when one or more imaging devices 108 send a request to the server program 164 for transmitting captured (and encoded) images thereto.

After the process 300 starts, the server program 164 commands the imaging devices 108 to capture images or video clips of at least one animal or an entire herd of animals (collectively denoted "images" hereinafter for ease of description) at the site 102 from one or more viewing angles such as front, side, top, rear, and the like, and starts to receive the captured images or video clips from one or more of the imaging devices 108 (step 304). As those skilled in the art will appreciate, the images may be captured from one or more angles and over various distances depending on the orientation and camera angles of stationary imaging devices or the flightpath/movement and camera angle for mobile imaging devices. The camera angle of some imaging devices may also be controlled by one of the application programs 164 to obtain images of animals from one or more desired animals.

The images may be processed, for example, automatically adjusting image acquisition parameters such as exposure, white balance, contrast, brightness, hue, and/or the like, digital zooming, digital stabilization, and the like. For example, functions that are available through the Vision Programming Interface (VPI) in the DeepStream SDK (offered by NVIDIA CORPORATION of Santa Clara, CA, U.S.A.) may be used for the above processing operations such as performing color balancing on images. Software built into OpenCV or other libraries made available by Nvidia may also be used. In at least one embodiment, some of the image processing is not needed as such when training uses images obtained using various image acquisition parameters.

At step 306, the server program 164 uses a machine learning algorithm to perform as an object detector to detect animals on one or more of the acquired images. Various machine learning algorithms, such as, but not limited to, CNN or DNN based algorithms, may be used to detect animals from the acquired images. For example, a single-pass bounding box algorithm may be used as the object detector and may be implemented using a Single Shot detector (SSD) algorithm, a DetectNet or DetectNet_V2 model, and/or the like. Alternatively, a two stage network may be used such as FasterRCNN or some other appropriate object detection model. In some cases, some image pre-processing may be performed such as, for example, in cases where an image is de-warped such as for images that are obtained using a 360-degree camera. In at least one embodiment, images from acquired video may be scaled to be 720p for the AI models used in layer 0 and layer 1 of the AI pipelines described herein.

Figure 7:
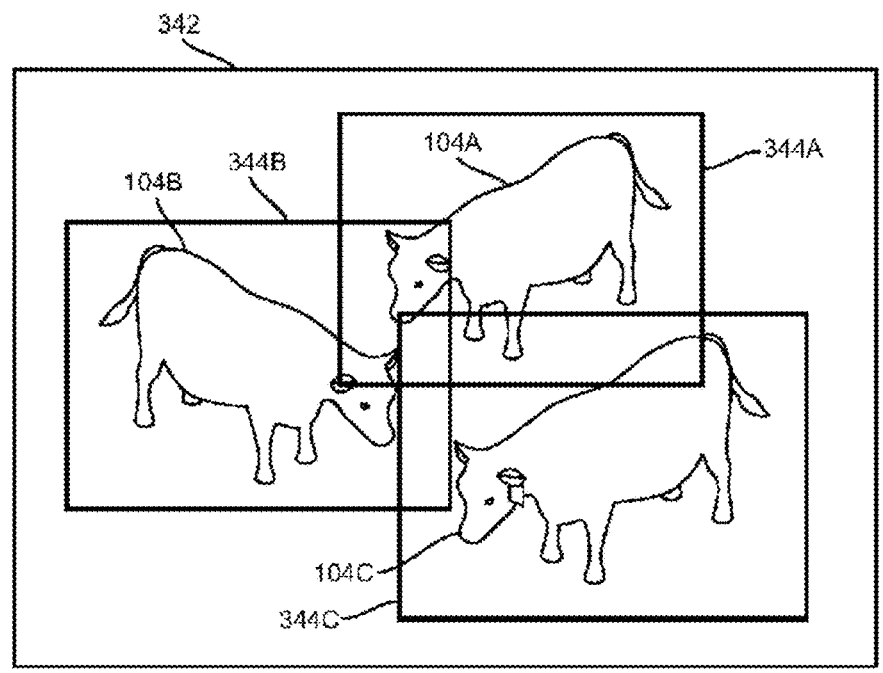
FIG. 7 is an example of an image that is processed according to the teachings herein wherein three animals are detected and each are associated with a respective bounding box defined thereabout.

The object detector detects one or more animals in a current image that is processed and may also define a bounding box to indicate the location of the detected animal. The bounding box may be overlaid on the image to encapsulate or surround the detected animal. At this step, at least one animal in the image, including animals partially obscured or turned away from the camera, is detected and associated with a respective bounding box in at least one embodiment of the system 100. FIG. 7 shows an example image 342 in which three animals 104A, 104B, and 104C are detected, for which respective bounding boxes 344A, 344B, and 344C are generated and defined thereabout.

Once the animals are detected and the bounding boxes are generated, the location of certain points (e.g., x1, x2, y1, y2) defining the perimeter of the bounding box may be stored in a data store along with the image number for the image that is currently being processed and the animal ID (which is determined later) so that the bounding box can be retrieved from the data store at a later point and used for various purposes such as certain types of measurements. It should be noted that a data store may be any of the memory elements described herein.

One or more detected animals may then be identified and optionally assessed through steps 308 to 316. In at least one embodiment, steps 308 to 316 may be repeatedly executed for all detected animals in a given image.

At step 308, a detected animal is processed, by using one or more AI models, which may generally be referred to as a sectioning or bounding box AI model, into a plurality of sections that are each defined by a bounding box. Examples of AI models that may be used to produce the animal sections are described with respect to the AI pipelines shown in FIGS. 33 and 34A. Depending on the angle at which the image was acquired for an animal and whether the detected animal is partially occluded in the acquired image, one or more of the following sections are generated for the detected animal:

up to three sections corresponding to three sides of the head portion of the detected animal (i.e., left side, right side, and front/centre side thereof);

up to three sections corresponding to three sides of the hide/body portion of the detected animal (i.e., left side, right side, and top thereof);

up to one section corresponding to the back or rear-side portion of the animal;

up to four sections corresponding to the legs of the detected animal (e.g., up to four leg sections for cows and other four-legged animals, and up to two leg sections for chicken, birds, and other two-legged animals); and/or up to one section corresponding to the drop tag attached to the detected animal.

Once the sections are determined for the detected animals, coordinates defining the bounding boxes and/or pixel values of the image that occur at and within the bounding box perimeter may be saved in a data store. In at least one embodiment, the bounding coordinates may only be saved if there is no bandwidth constraint. One or more of the AI models of the AI pipelines described herein, use the image data within a bounding box as input. If such input is used more than once, then the bounding box contents (e.g., image values within a bounding box and at the boundary perimeter) box may be stored.

Figure 8:
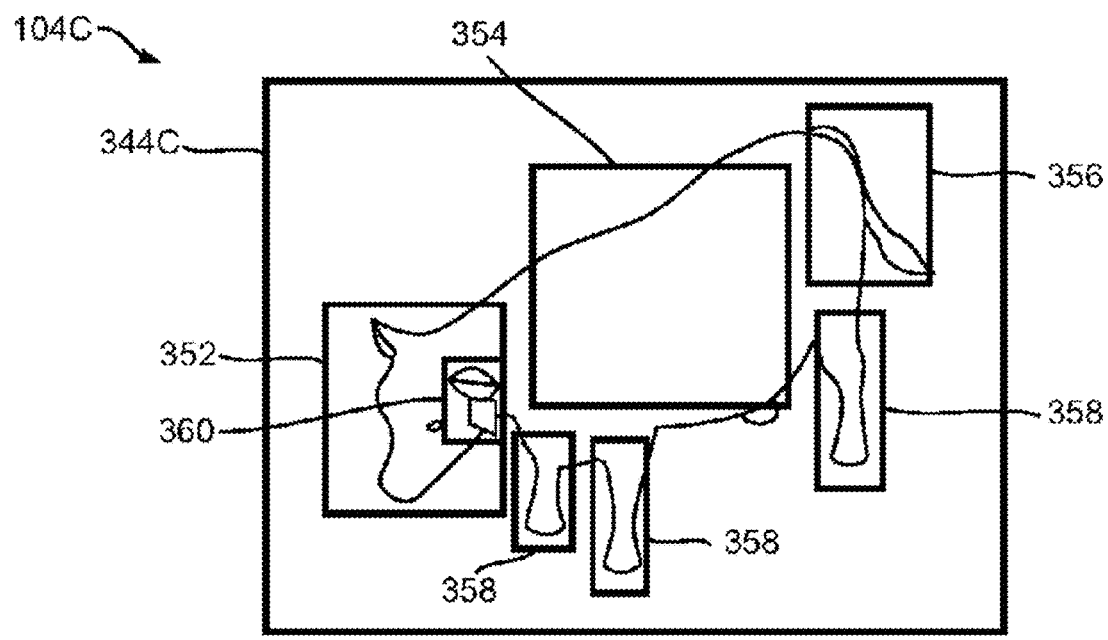
FIG. 8 is an example image being that is processed according to the teachings herein and illustrates one of the animals of FIG. 7 segmented into a plurality of sections.

For example, FIG. 8 illustrates the segmentation of the detected cow 104C in bounding box 344C in the image 342 shown in FIG. 7. As shown, the image of the detected cow 104C is partitioned into a left-side head section 352, a body section 354, a back or rear-side section 356, three leg sections 358 (the fourth leg is occluded in the image), and a drop-tag section 360 enclosing the drop tag 106 thereof.

Figure 9:
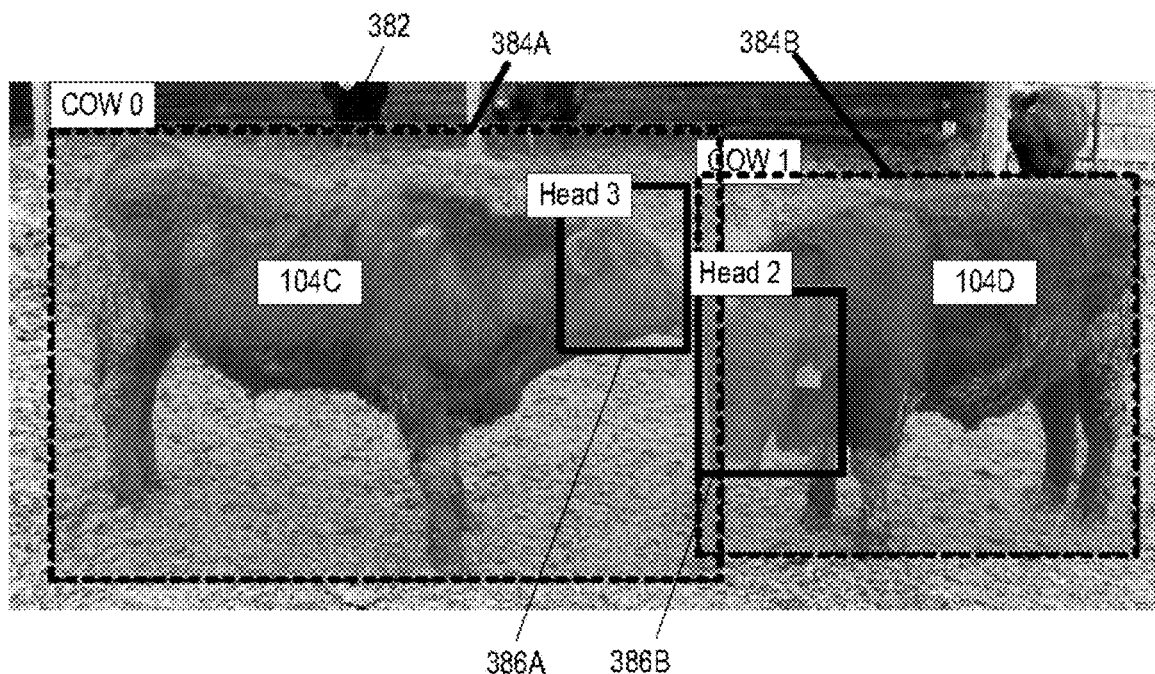
FIG. 9 shows another example of an image that is processed according to the teachings herein wherein two animals are detected and associated with respective bounding boxes, and the head section of each animal image is segmented with a respective bounding box.

FIG. 9 shows another example illustrating an image 382 being processed at step 308 (the processing of step 308 is not yet fully completed). Two cows 104C and 104D are detected in the image 382 with respective bounding boxes 384A and 384B generated and overlaid on the respective cows 104A and 104B. The right-side head section 386A of cow 104A and the front-side head section 386B of cow 104B have been segmented and also overlaid on the corresponding portions of the respective cows 104A and 104B.

While not shown in FIGS. 8 and 9, by segmenting the detected animals in the images 342 and 382, each detected animal image can be optionally isolated from the background, thereby improving the accuracy of animal identification For example, in at least one embodiment, the sections and bounding boxes for the segmented detected animal in a currently processed image may be completely separated from the background in the image. In such embodiments, the background may be removed (and discarded) by using a mask algorithm, to provide a little improvement in animal identification accuracy (e.g., see FIGS. 35G and 35H). Masking may be performed using suitable algorithms such as Mask-RCNN.

Alternatively, as another example, in at least one embodiment, while the sections and bounding boxes of segmented detected animals in a currently processed image are isolated from the background in the image, and the background is maintained separately and saved as another image (e.g., a background image) since the pixel values in the background may be used for generating useful assessment data (described in more detail later).

Referring back to FIG. 6, at step 310, key points are assigned to or placed, by using one or more AI models, which may be referred to as a key point AI model, onto the image with the detected animal with each animal section being assigned certain key points depending on which part of the animal that the animal section corresponds with and what type of animal has been segmented (e.g. a cow versus a horse or a pig). A different or same number of key points can be used for each segmented animal section. In at least one embodiment, the key points may correspond to important features of the animal such as visibly distinct features (e.g., eyes, nose, mouth, and the like), joints, and/or the like. AI models that may be used for determining key points for different sections of the animal are described in more detail with respect to the AI pipelines shown in FIGS. 33 and 34A.

The key points of each animal section are generated independently from those of other animal sections that are generated for detected animals in the currently processed image. Some of the key points in each section may then be linked and aligned using a normalization or alignment method for correcting distortions introduced by different viewing angles and/or distances between the object (i.e., the animal) and the imaging device 108 that captured the image. For example, for a head section, a template may be defined that generally shows where the eyes, ears, nose and other keypoints may be for each head that is processed. The template may be defined by determining the most likely position of the key points by identifying those key points in a training set of images. This may be done by using training data or using an average of many animal images. When the keypoints for a head are predicted, they do not necessarily match the locations of the corresponding key points in the template. Accordingly, in at least one embodiment, an alignment/normalization method can be used to distort the image pixels in the bounding box for the animal section by warping (e.g., stretching and squeezing) the image as necessary using the predicted key points, to match the location of the corresponding key points in the template. The above may also be done for the Tail section and the body section when these sections are used to determine animal identification.

In particular, a plurality of standard viewing angles may be defined for the system 100 such as a front view, a left-side view, a right-side view, a rear-side view, and a top view. An image may be captured by one of the imaging devices 108, e.g., generally on the left side of the animal but at a viewing angle offset from the standard viewing angle of the left-view. The server program 164 then applies a calculated distortion to the animal image to normalize it to the standard viewing angle of the left-view. This may be done by using an appropriate software tool such as the OpenCV function: FindHomography which can map the points from the image contents of the bounding box image to a template by applying a perspective transformation between two planes. Another software tool, such as WarpPerspective from OpenCV or a similar functioning software tool, may be used to distort the image contents of the bounding box (also referred to as bounding box image) accordingly, using the transformation determined by the FindHomography software tool. After this processing, the eyes, ears, nose and other landmarks of the detected animal in the image correspond generally with the locations of the corresponding key points in the image template.

Moreover, in at least one embodiment, the server program 164 may also scale the animal image to normalize it to a size corresponding to a standard size. For example, the images can be scaled to 256×256 or some other standard size using OpenCV's Resize function or Nvidia's DeepStream's built-in libraries.

Figure 10:
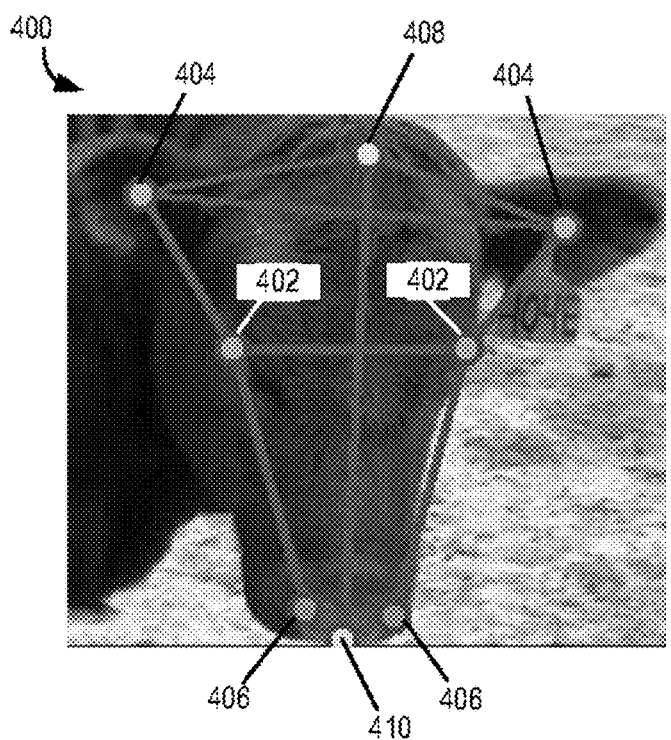
FIGS. 10 and 11 example images showing the head section of an animal with key points added thereto.
Figure 11:
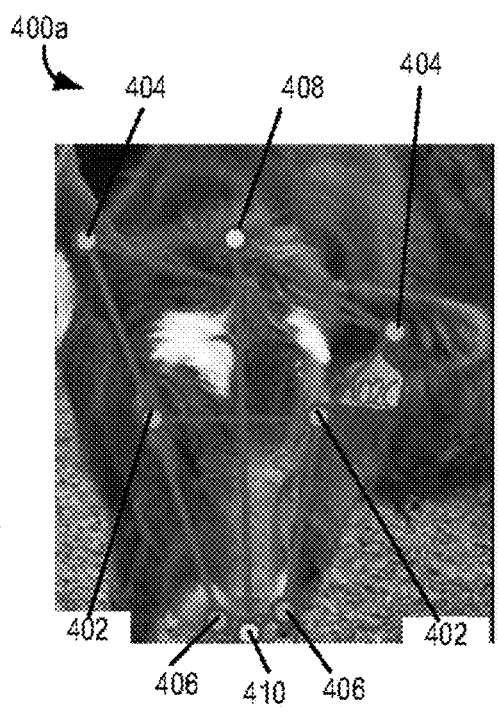

As shown in FIGS. 10 and 11, in at least one example embodiment, the front-side head section 400 may be assigned with eight (8) key points generally including:
  two points 402 for the eyes (i.e., left eye and right eye),
  two points 404 for the ears (i.e., left ear and right ear),
  two points 406 for the nose (i.e., left nostril and right nostril),
  one point 408 for a top portion of the head, and
  one point 410 for a bottom portion of the head.

Figure 12:
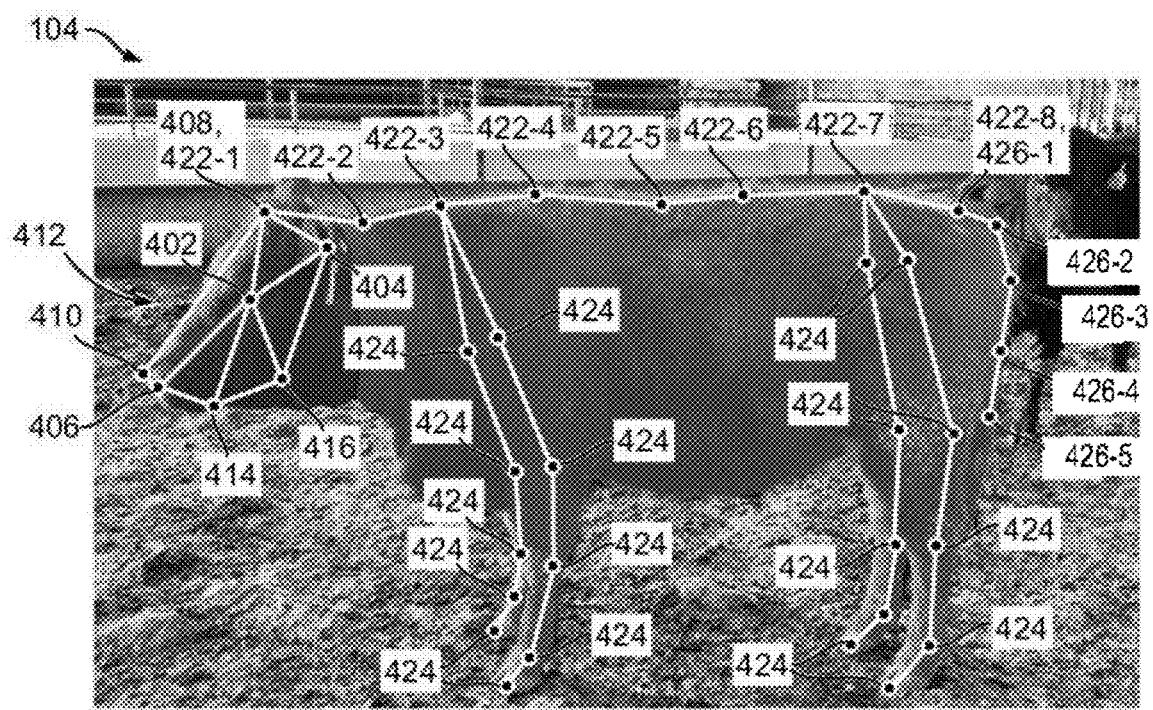
FIGS. 12 and 13 are example image each showing a cow with key points and lines connecting various key points added thereto.

As shown in FIG. 12, in at least one example embodiment, the left-side head section 412 may be assigned with a certain number of key points such as eight (8) key points, for example. The head section key points generally include:
  one point 402 for the left eye,
  one point 404 for the left ear,
  one point 406 for the nose (i.e., left nostril),
  one point 408 for the top portion of the head,
  one point 410 for the bottom portion of the head,
  one point 414 for the mouth, and
  one point 416 for the bottom of the left-side cheek.

The right-side head section may be assigned with eight (8) key points in a manner similar to those of the left-side head section.

By using these key points and the links therebetween (i.e., the line segments connecting two adjacent key points), the shape and movement (by comparing the same key points across consecutive images) of the head (e.g., a flick on an ear) may be accurately determined and used for identifying the animal.

Figure 13:
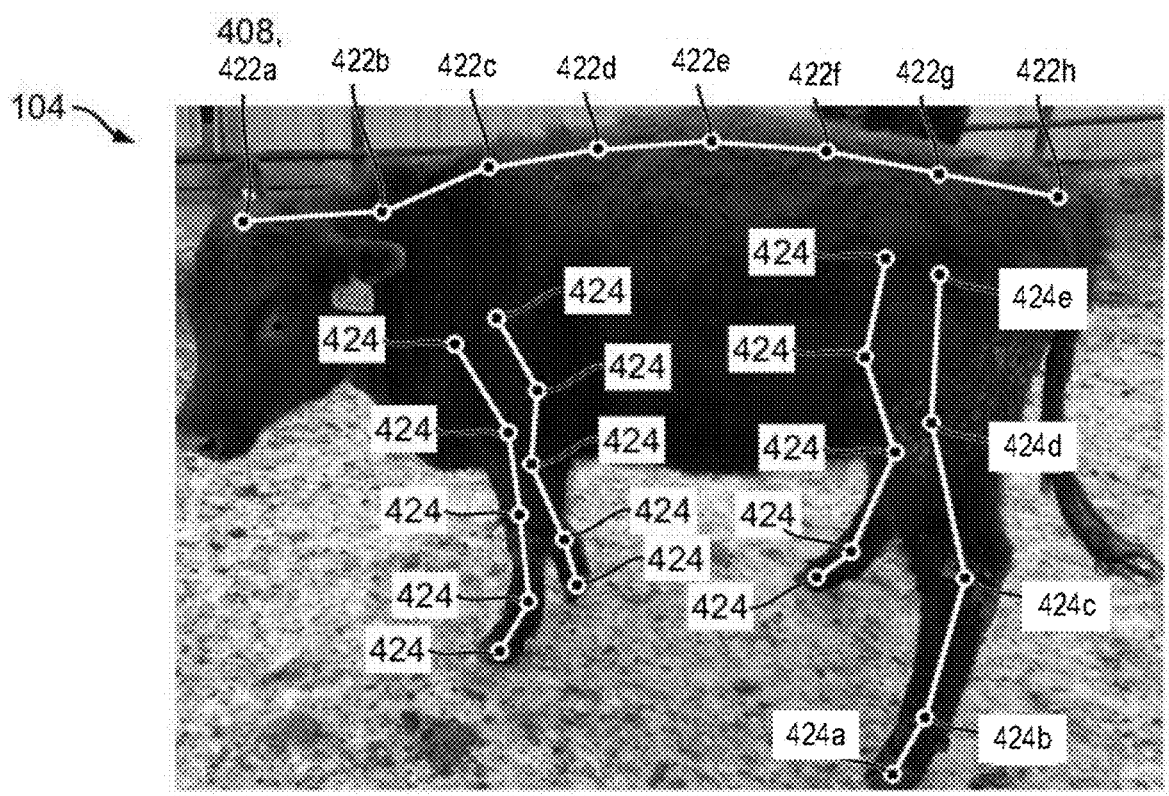

As shown in FIGS. 12 and 13, in at least one embodiment, the spine (which may be visible in various sections such as the body section 354 also known as the top section) may be assigned a certain number of key points such as eight (8) key points 422, for example (422-1 to 422-8 in FIG. 12; 422a to 422h in FIG. 13). Referring to FIG. 13, the spine key points may include a first key point 422-1 that coincides with the key point 408 of the top portion of the head, a second key point 422-2 that is in the neck area of the spine, the third to seventh key points 422-3 to 422-7 that are distributed along the spine from the withers to the rump, and a final key point 422-8 that is located at the tailhead. The spine section may also be referred to as the hide section.

Furthermore, in at least one embodiment, each leg section may be assigned a certain number of key points such as five (5) key points 424, for example, depending on the type of animal (424a to 424e in FIG. 13). For example, the key points of the leg section of a cow starting at the bottom of the leg up to the shoulder may be located at the coffin joint, the fetlock joint, the carpal joint (e.g., knee joint), the elbow joint and the shoulder joint. Adjacent key points in the leg section are sequentially linked to one another to form the links of the leg. The uppermost key points of the forelegs may be linked to one key point of the spine such as the second key point 422-3 of the spine, and the uppermost key points of the rear legs may be linked to another key point of the spine such as the seventh key point 422-7 of the spine (e.g., see: FIG. 12).

Figure 14:
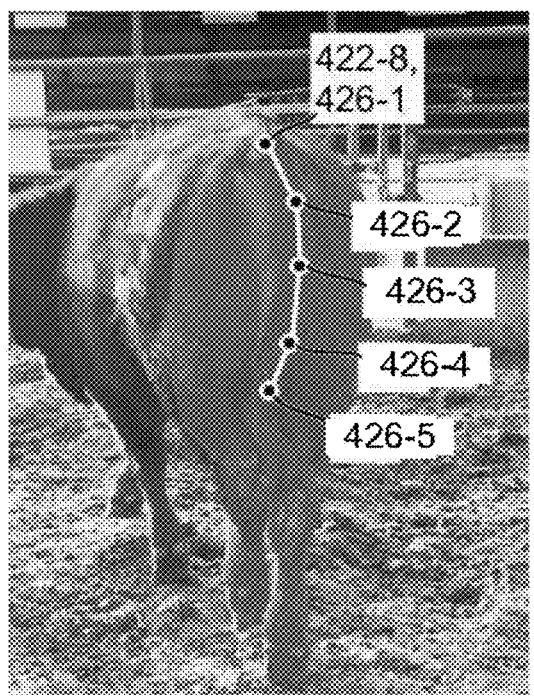
FIG. 14 is an example image showing the back section of a cow with key points and lines connecting various key points added thereto.

As shown in FIGS. 12 and 14, in at least one embodiment, the back section may be assigned a certain number of key points such as five (5) key points, for example. For instance, the key points may include key point 426-1 to 426-5 (corresponding to the five joints of the cow tail) with the first key point 426-1 located at the tailhead and coinciding with the last key point 422-8 of the spine and the last key point 426-5 being at the last joint in the tail.

The key points thus form a virtual skeleton of the animal, which may be used by one or more AI models of the AI pipeline for reliably identifying a detected animal. In at least one embodiment, 2 or more key points, 8 or more key points, over 10 key points, over 20 key points, over 30 key points, over 40 key points, or over 50 key points, for example, may be applied to an image of a detected animal.

In various embodiments, other key points may also be defined corresponding to important features of a detected segmented animal. For example, in at least one embodiment, in addition to or in an alternative to the key points described above, other key points may be defined and applied to such as, but not limited to, the nose tip, jaw (forward and back), lip (top and bottom), hip (left and right), neck, and joints, stifles, hocks, ankles, knees, elbows, shoulders, and/or hooves of all legs, for example. Accordingly, for other types of animals, there may be a different number of key points for each section and/or the key points may be defined to be at different locations.

Referring again to FIG. 6, at step 312, one or more sections of the animal 104 may be uniquely identified using a suitable method such as a Triplet-Loss Siamese Network method or the like, based on the placed key points. The identifications for some of the sections may then be combined using a weighted average or the ID with the top accuracy score may be used for the ID for the animal. Using the key points, the processed images are normalized to share the same projection mapping in three-dimensional (3D) space with a combination of skews and rotations as necessary. For example, an image may be warped using the software library Open CV WarpPerspective function, where the inputs are homography mapping between the template and the predicted key points in a bounding box where the template is defined so that the head section is aligned with the template so that most of the facial landmarks, such as the eyes, ears and nose, for example, are in the same place for different animals in the same species (e.g., cows).

The result of step 312 is that each section is given an embedding in a higher-dimensional space. For example, the number of dimensions of each embedding may be any suitable number such as 128, 200, 500, 512 or 1000, for example, in at least one embodiment. However, those skilled in the art will appreciate that the number of dimensions of the space may take other suitable values as necessary based on the complexity of the section. Generally speaking, if there is enough training data, the embedding size can be increased to make it easier for the AI models to create ID zones in the embedding. However, if the dimensions of the embeddings are too larger, then it may be harder for the AI model to be trained effectively.

Figure 15:
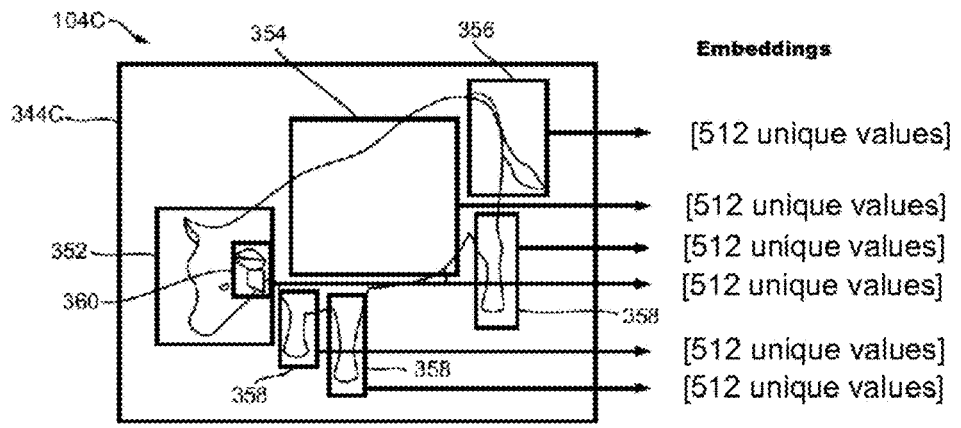
FIG. 15 is an example image that is processed according to the teachings herein and illustrates embeddings that are generated for the sections shown in FIG. 8.

FIG. 15 shows an example of the processing result of step 312 on the cow 104C shown in FIG. 8. As shown, six embeddings are generated for the sections 352 to 358, one embedding per section, including the tail embedding, the hide embedding, the head embedding, the rear-left leg embedding (denoted leg embedding RL), the front-left embedding (denoted leg embedding FL), and the front-right embedding (denoted leg embedding FR). No embedding is generated for the drop-tag section 360.

Referring again to FIG. 6, at step 314, the embeddings are weighted and combined using a machine learning classifier (e.g., an identification AI model) along with a SoftMax function to obtain a single prediction of the animal identification (ID) with a confidence score. Alternatively, in at least one embodiment, the embedding providing the ID with the highest accuracy may be used such as the Face ID or Drop Tag ID. For example, with the Drop Tag ID, each character in the OCR is read for a prediction of 10 numbers, 26 letters and a blank end token (37 prediction targets in total). The end token pads the predictors so that they all have a uniform length of 26. Each prediction is a classifier for each digit (with 36 targets), providing a confidence score accordingly. The confidence score for all the read characters may be averaged out to get a final confidence score. The implementation of the identification AI model is described in more detail with respect to the AI pipelines of FIGS. 33 and 34.

Figure 16:
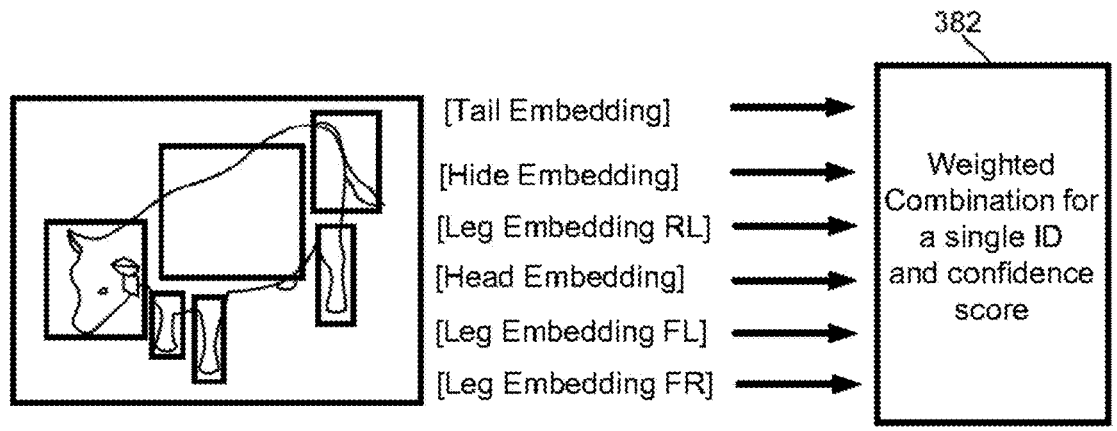
FIG. 16 is an example image that is processed according to the teachings herein and illustrates how embeddings, such as those of FIG. 15, are weighted and combined using a neural network to obtain a single prediction of the animal identification (ID) with a confidence score.

FIG. 16 shows an example of the processing result of step 314, following the embedding identification and combination step 312 shown in FIG. 15. As shown, the embeddings are weighted and combined using an identification AI model for obtaining a single animal ID 382 with a confidence score. The confidence score represents the accuracy that the animal identification is predicted correctly. The confidence score may be compared to a confidence score threshold to determine whether the predicted animal identification should be accepted or not.

In at least one embodiment, the IDs that are determined are logged and stored. If the confidence score for the ID is too low, then it may be incorrect and predictions that are tied to the ID are generally not used except optionally for herd tracking.

In at least one embodiment, once an animal is correctly identified, while the animal can be tracked using a tracking algorithm, the ID may still be determined for subsequent images to verify that it is still being determined properly and comparing the ID with that of previous frames and recording the corresponding confidence score for each ID. The tracker algorithm allows the ID to be applied between video frames. and provides a way to track bounding boxes between frames. An example of a tracker which may be used is the tracker built into NVIDIA DeepStream, which is Gst-nvtracker of which there are three versions. For example, the GPU accelerated version called NvDCF may be used for optimal speed and accuracy and also for tracking the change in bounding box locations between video frames.

Figure 17:
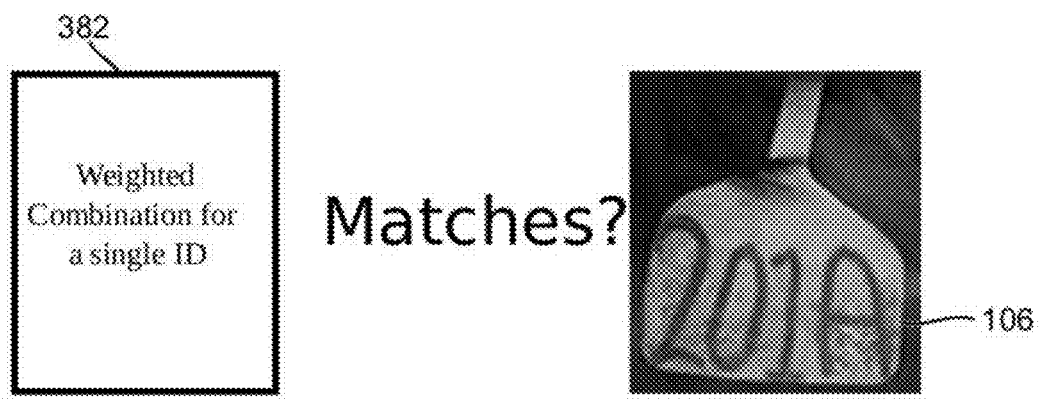
FIG. 17 illustrates the verification of the animal-ID prediction against a recognized drop tag, in accordance with the teachings herein.

Referring again to FIG. 6, step 316 may be performed if a drop tag is attached to the animal and the drop tag is visible and readable. As shown in FIG. 17, after the animal ID prediction is obtained, the server application 164 recognizes the drop tag 106, if it is visible and readable using any suitable optical character recognition (OCR) method, and verifies the animal ID prediction against the recognized drop tag 106. This verification step may be done when confidence score for the ID determined by an AI model is above a first accuracy threshold and the confidence score for the OCR on the drop tag is above a second accuracy threshold which may be the same as the first accuracy threshold. As an example, the first and second accuracy thresholds may be about 90%.

The prediction results, including the predicted animal ID, the confidence score thereof, and the drop-tag verification, are stored in the computer cloud 110 and are used for further processing such as animal management. The generation of the confidence scores are described in more detail with respect to FIG. 34A.

Those skilled in the art will appreciate that an animal's appearance and behavior may change in its lifetime which may cause the confidence of the animal ID prediction to decrease overtime. Therefore, the animal identification and assessment system 100 may retrain the AI models (e.g., with all stored data) when the confidence score of the animal ID prediction decreases to a level below a predefined cut-off threshold such as, but not limited to, about 60% for example for several images such that when the average confidence score produced by an AI model, such as a rolling average over the past N number of frames drops below the accuracy threshold it triggers a retaining event for this AI model and perhaps other related models.

As described above, steps 308 to 316 may be repeatedly performed for each detected animal in a given image frame that is currently being processed. When all detected animals in the currently processed image frame are processed (i.e., all animals identified via steps 308 to 316), the process 300 then ends (step 320).

Figure 18A:
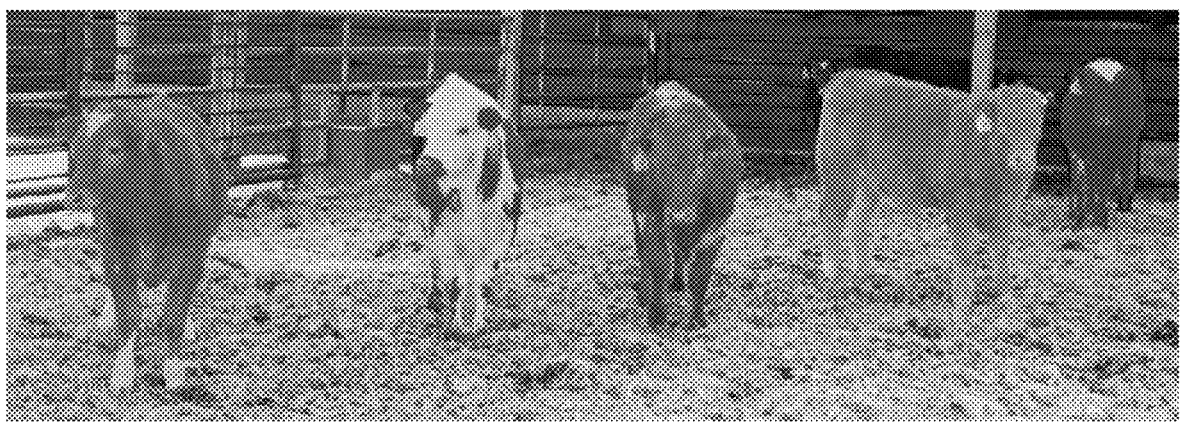
FIG. 18A shows an example image of a herd to be processed according to the teachings herein.
Figure 18B:
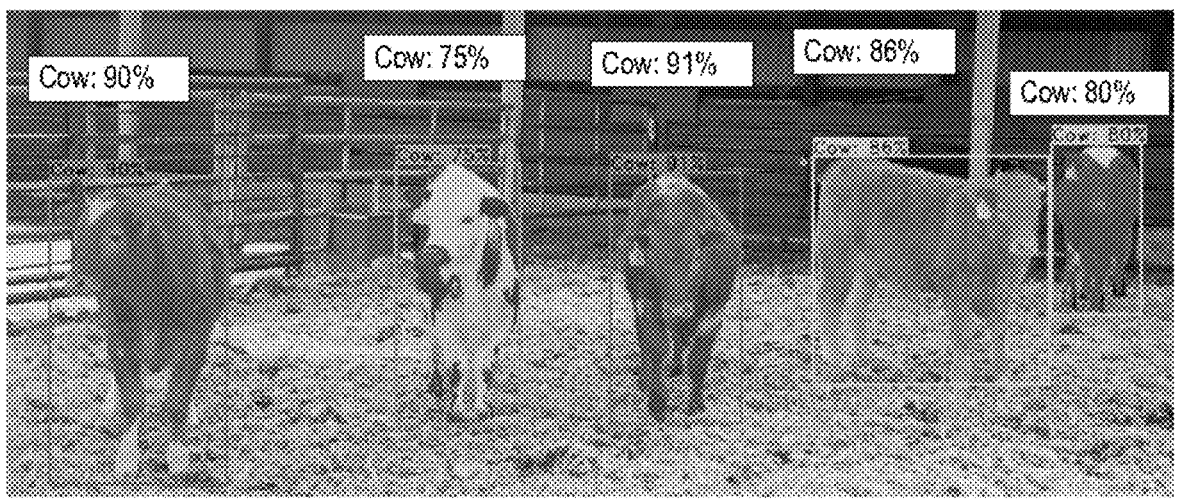
FIG. 18B shows the image of FIG. 18A overlaid with the bounding boxes for the five (5) cows with corresponding confidence scores thereof in the form of percentages with higher percentages representing the bounding boxes are generated with more accuracy (i.e., higher confidence).

FIG. 18A shows an image of a herd. FIG. 18B shows the image of FIG. 18A overlaid with the animal identification results of the animal bounding box for five (5) cows with corresponding confidence scores thereof in the form of percentages with higher percentages representing higher confidences in the placement of the bounding box around the corresponding animal. As can be seen, the animal bounding box identification results are all associated with high confidence scores (i.e., confidence scores >75%) indicating reliable generation of the bounding boxes. In at least one embodiment, the confidence scores may be obtained using the SoftMax function as described herein.

Figure 19:
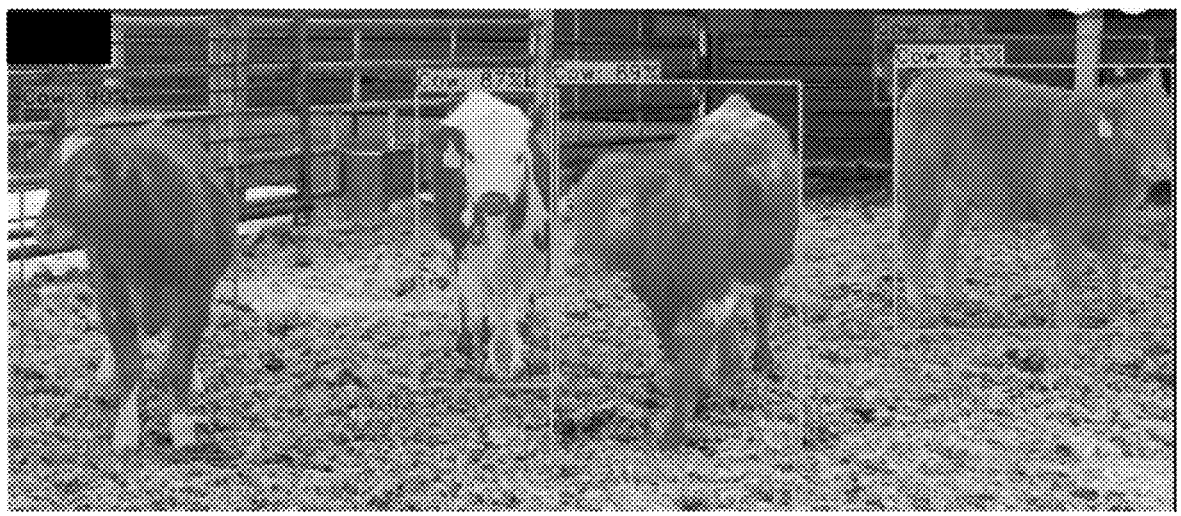
FIG. 19 shows another example image of a herd overlaid with the animal identification results of several cows with corresponding confidence scores thereof.

FIG. 19 shows another image of a herd overlaid with the animal identification results of several cows with corresponding confidence scores thereof. As shown, one of the animals in the image has complicated partial occlusions. However, the confidence scores indicate that the animal identification results are still reliable, even on the animal with a substantive portion thereof being occluded where the confidence score is 65%.

In at least one embodiment, the system 100 may also be programmed to track the animal's strides over time to make a prediction for its gait. An example of this is described with reference to FIG. 20 which only shows one way to use certain angles and distances as input to an gait AI model that can be used to determine a characteristic of the animal's gait.

Figure 20:
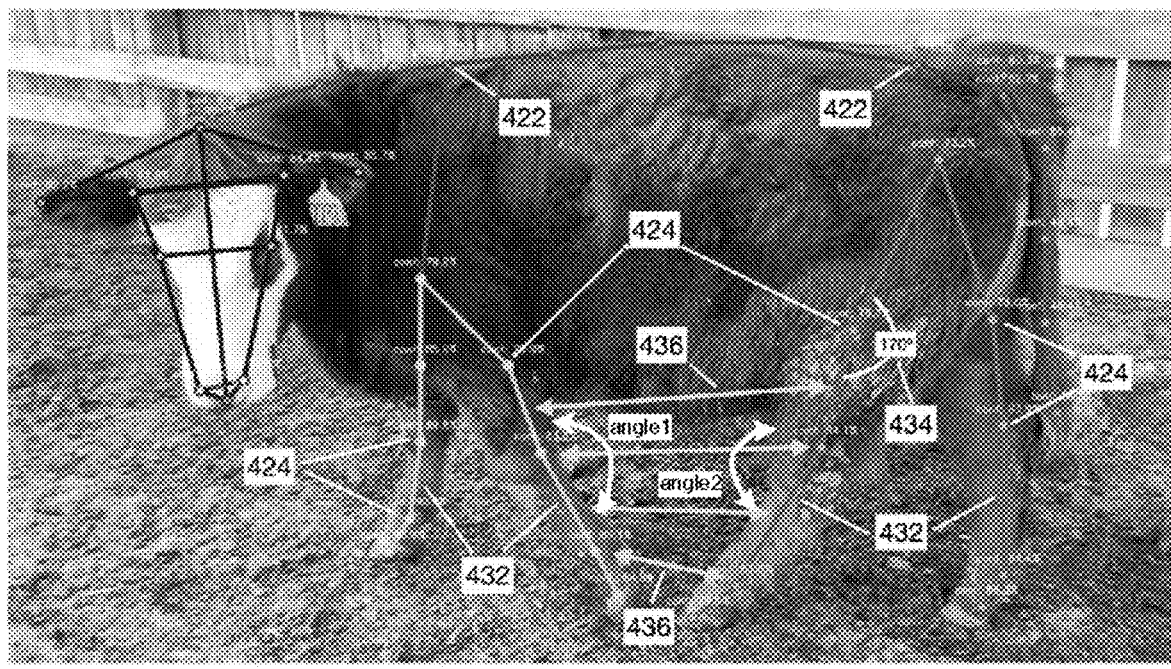
FIG. 20 shows an image of a cow that has been processed according to the teachings herein and overlaid with key points including key points of the spine and key points of the legs, and the links therebetween, for illustrating the determination of various characteristics of a cow such as the cow's gait.

FIG. 20 shows an image of a cow overlaid with key points including key points 422 of the spine and key points 424 of the legs, and the links 432 therebetween (only some of the key points for the legs and the links are labelled). Similar to the normalization of the face section of an animal to a face template, the side section image data is also normalized so that the key points of the side view are projected onto the template so that they are located where they are expected to be for a healthy animal. The gait may be determined based on using some of the angles 434 of adjacent links 432 on upper and lower portions of both of the cow's legs that are above and below the cow's knees, the location of certain key points, the distances 436 between corresponding key points 432 of different legs on the same or different sides of the animal and ratios of at least some of these values as inputs that are then provided to a suitable recurrent neural network such as LSTM or a Transformer model to process data over time. Generally speaking, animals are symmetric, and anything that shows a break in that symmetry may indicate lameness. In this case, the LSTM or Transformer model can be trained using training data that may be processed to fill in any missing temporal values (for example a program called TimeStream may be used), and then using the LSTM or Transformer model to classify the motion of the identified animal over time. Through training, the LSTM or Transformer model selects values for weights that can be applied to the input values/features where the values of the weights are used to emphasize the input features that can be used to make an accurate.

Accordingly, in at least one embodiment, the final layer of the gait AI model is used to provide classifications which can then be processed by the SoftMax function to determine the accuracy of the classification, i.e., the accuracy of the predicted characteristic of the animal's gait. For example, if the animal's gait is being tracked to determine whether the animal is lame and the severity of the lameness, the classification layer may have 5 nodes to provide a classification result for lameness on a scale of 1-5 so there are 5 classes. The SoftMax function makes it clearer which of the five classes are predicted with more accuracy and the lameness class (e.g., 1, 2, 3, 4 or 5) being predicted with the most accuracy is used as the predicted lameness for the animal.

The animal identification results may be stored in the server computer 120, e.g., in a database thereof or another data store that the server computer 120 is communicatively coupled to. The results may be stored such that the ID for the identified animals, their bounding box locations for their sections and the locations of their key points for each image are stored in a database or file referenced by the image number. In this way, when a user views a given image, the system 100 can access the database to determine the identified animals, the accuracy of the identified animals and their bounding boxes and optionally their sections and/or key points. Alternatively, or in addition thereto, the image numbers in which a given animal is identified can be stored and referenced by the animal ID. In this way, once an animal is selected, images of the animal can be retrieved and displayed so that the animal's appearance overtime can be monitored. The key points and bounding boxes can then be added to the image of the animal when it is reviewed by a user. Alternatively, or in addition thereto, the system 100 may store images with the bounding boxes and key points overlaid on the image of the animal.

Data about each identified animal across various images frames can be determined and stored so that the data can be further processed to obtain additional data about a given identified animal. For example, in a given image frame, the key points that are determined for one or more leg sections of the identified animal can be analyzed in terms of angles between certain adjacent links and/or distances between corresponding key points on different legs of the animal to determine if the animal is standing, lying down or in mid-stride (if it is walking) when the given image was acquired. The same key points in successively acquired images can also be compared to obtain additional data about the animal. For example, the location of the key points representing the identified animal's jaw, mouth and/or lower portion of its face can be compared across successive frames to see if the changes in location of these key points is indicative of the animal eating. This may be done by providing the (a) key point locations, (b) the corresponding bound box, (c) the length of the link, (d) any angles between the adjacent links, (e) ratios of the key point locations, angles and/or lengths or (f) any combination of a to e as input to an AI model that is trained to recognize an activity that the animal is performing in the images that are being analyzed. All of this data may be obtained, associated with image numbers that have timestamps and may be stored temporally and/or permanently.

When a user 114A wishes to obtain data about a given animal over a desired time period, the stored data that is associated with images having time stamps in the desired time period can be analyzed. For example, each image is obtained with a timestamp so as to determine the amount of time that the given animal is engaged in a certain activity such as, but not limited to, standing, lying down, walking and eating, for example. The time stamp for an image when the given animal begins performing the activity can be subtracted from the time stamp of the image frame in which the given animal stops performing the activity to determine the time interval for performing the activity. Images in which the animal is performing a certain activity can be determined by a corresponding AI model as was described previously for determining when an animal is eating when an image of the animal is acquired. This can be repeated to determine all of the time intervals where the given animal is performing the activity during the desired time period. The time intervals can then be added to determine the overall time duration that the given animal spent engaging in the activity in the desired time period. The overall time duration may then be shown on a display and/or stored. Alternatively, the percentage of the overall time duration as a fraction of the time duration of the desired time period can be shown on a display and/or stored. This may be done where the desired time period is a day and repeated for each day during a larger time duration such as a week, a month, a quarter, or a year to obtain statistics for the given animal for performing a certain activity.

Figure 21:
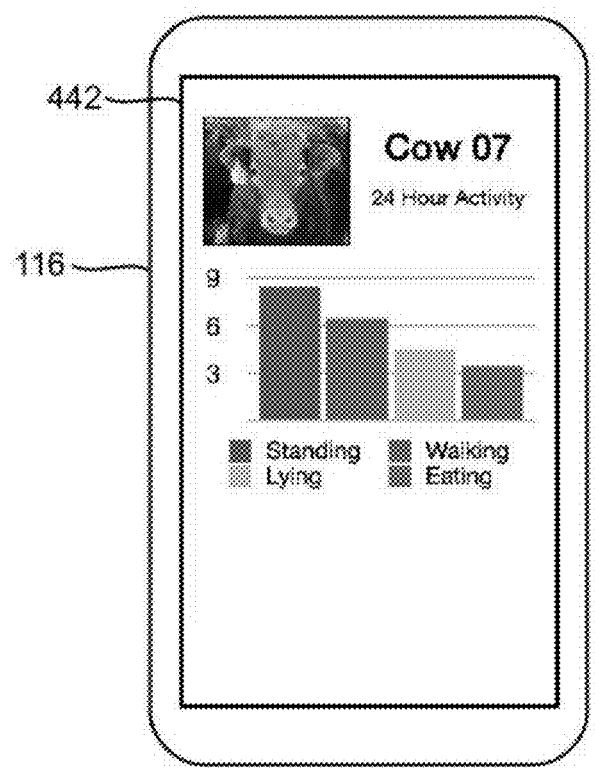
FIG. 21 illustrates an example screen of a smartphone showing data for a specific animal in a site, according to at least one embodiments of this disclosure.

As described above, a user 114A may use a client computing device 116 such as a smartphone to query the server computer 120 and obtain data of one or more identified animals. FIG. 21 illustrates an example GUI 442 of the smartphone 116 showing the data of a specific identified animal at the site 102. As shown, the data may include some statistical data for an activity being performed by the identified animal over a desired time period such as a 24-hour period and show the activity therein. For example, the activity may include, but is not limited to, standing, lying down, walking, or eating and the GUI 442 may show the amount of time that the identified animal spent standing, lying down, walking and eating during the time period.

As described above, one or more of the image devices 108 may continuously capture a plurality of images of the herd. Subsequently, the animal identification process 300 may also be continuously executed to continuously monitor the herd and identify the animals (i.e., obtaining the animal ID predictions as described above). In at least one embodiment, the animal identification results for a series of images may be combined for improving the confidence of animal identification. For example, previously obtained prediction results may be used for improving the confidence of animal identification.

For example, when the confidence score generated by an AI model degrades over time for a specific animal then the AI model may be retrained so that it performs more accurately. To retrain the AI model, up-to-date images on the animals of the site can be used. The DropTag ID is used as truth. The DropTag ID is used as the animal ID for the bounding boxes of the head, body, tail, etc. of the animal. For example, the DropTag ID is assigned to the Face bounding box. The key points for the face bounding box are predicted and normalized as described previously. This is generally done for substantial number of images (e.g., 100 images) for each animal. When there is enough data, for all the animals in the herd at the site, a new embedding model (i.e., an ID model) is trained which may be done using a Triplet Loss Siamese Network, a variation thereof or another suitable algorithm. Once the new embedding model is operating with a desired level of accuracy it can then be used in the AI pipeline during the normal use of the system 100.

In at least one embodiment, the prediction results may also be used for training the AI pipeline and updating one or more of the AI models used in the AI pipeline. This updating can be performed in the cloud, on a site server, on a mobile device or on an edge device. With operation of above-described animal identification process 300 over time, the confidence of the animal ID prediction increases with each new sighting of a given animal that is correctly identified.

In another aspect, in at least one embodiment, the system 100 may also frequently update the embeddings to improve AI accuracy. This may be done as previously described for the AI model used to determine the Face ID (e.g., the animal identification using one or more head sections of the animal). The embeddings are predicted as part of an ID prediction AI model. When a new ID prediction AI model is created, the embeddings it predicts are also updated. Both the ID prediction AI model and the embedding space it predicts are updated. The ID prediction AI model may be based on certain sections of the animal (e.g., see the Face ID, Tail ID, and Hide ID models in FIG. 34A). In other words, when an ID prediction AI model is being updated the current AI model is taken and trained which causes it to update the "zones" in the embedding space that define the ID, or another characteristic.

In cases where an animal is growing quickly, as is usually the case in the first year of life, it is expected that the system 100 will need to relearn the ID of an animal on a regular basis. Accordingly, in at least one embodiment, the system 100 can be trained on quickly growing animal at weekly or monthly intervals. Alternatively, in at least one embodiment, the system 100 can be trained on a quickly growing animal when the confidence score associated with the predicted animal ID drops below a confidence threshold for one or more images, for example, below 75%, below 70% or below 65 for a period of time like a week.

In at least one embodiment, the animal identification process 300 segments a detected animal in several image into a plurality of sections including a left-side head, a right-side head, a front-side head, a left-side body, a right-side body, a top-side body, a rear-side, and/or up to four leg sections (depending on the type of animal), which substantively cover the entire view of the animal from any angle. The embeddings generated from these sections generally represent the visible features of the animal from all angles available in the images of the animal. Therefore, the combination of these embeddings implies a combination of animal features from all angles being used in animal identification, which may provide a higher confidence than other methods which use a specific view of the animal or the view of a specific portion of the animal for identification. These embeddings can still be weighted and combined using a suitably trained identification AI model.

Moreover, by using views of the animal from two or more angles, the animal identification process 300 may at least partially solve the partial occlusion and/or bad-viewing-angle issues by continuously capturing images of animals when they are in herds. For example, sections of an animal occluded by other objects (e.g., other animals or other types of objects, e.g., trees, rocks, buildings, and/or the like) may become visible in later-captured images. As another example, by using views of the animal from all angles before making a final animal identification, the process 300 may identify animals at any angle to the image device 108 while other methods relying on a specific view may fail if the position of the animal is at a "bad angle" relative to the imaging device during image acquisition.

The reason that the animal ID may be determined using images from different angles is because the images are normalized (e.g., using the warpPerspective and findHomograph Open CV functions) to match a template (which may be static or partially dynamic). Once such images are normalized, the images that are used to perform identification are on the same "angle" with respect to the image acquisition device. However, normalization may have limits and so sectioned image data is obtained for a small set of angles such as the three different sections for an animal's head which means that three separate ID prediction AI models are used.

In at least one embodiment, an object tracking method may be used to facilitate the animal identification by employing useful data of the animals such as their locations, velocities, moving directions, changes of sizes in the field of view (FOV) of the imaging device 108, and/or the like, and combining such data with the prediction results for improving the confidence of animal identification. For example, a tracker utility provided by NVIDIA DeepStream called Gst-nvtracker may be used. There are three of these types of trackers, one of which is a GPU accelerated tracker for optimal speed and accuracy, called NvDCF which can track bounding boxes between video frames. Tracker results from one image or level may be advanced to the next level to allow for tracking changes over time. Tacking changes over time may be used to determine many characteristics of an animal such as, but not limited to, direction, velocity, and location.

Figure 22:
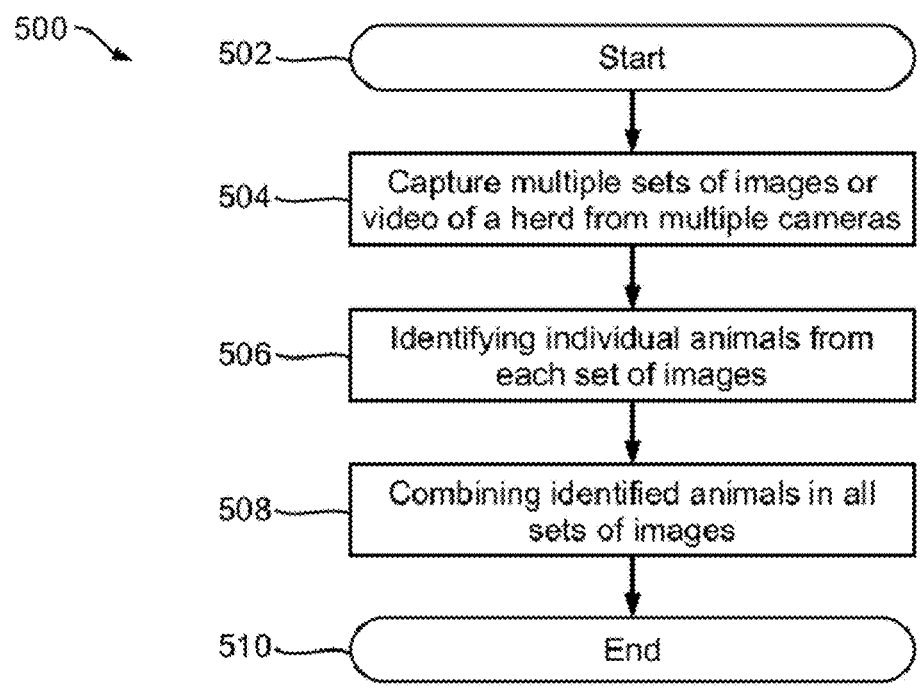
FIG. 22 is a flowchart showing another example embodiment of an animal identification process that may be executed by the animal identification and assessment system of FIG. 1A for identifying several animals in a site using an AI pipeline, according to at least one embodiment of this disclosure.

FIG. 22 is a flowchart showing an example of another embodiment of an animal identification process 500 that may be executed by one or more server programs 164 executed by one or processors of the processor module 142 in at least one embodiment of the system 100 for identifying at least one animal at the site 102 using one or more AI models in the AI pipeline, according to the teachings herein. In such embodiments, the system 100 comprises a plurality of imaging devices 108 for acquiring images.

As shown in FIG. 22, the process 500 may start (step 502) automatically (e.g., periodically), manually under a user's command, or when one or more imaging devices 108 send a request to the server program 164 for transmitting captured (and encoded) images.

After the process 500 starts, the server program 164 commands the imaging devices 108 to capture images or video clips of a herd (collectively denoted "images" hereinafter for ease of description) at the site 102 and starts to receive a set of captured images or video clips from each of the imaging devices 108 (step 504). Therefore, a plurality of sets of images are received and may be processed, for example, by automatically adjusting image parameters such as exposure, white balance, contrast, brightness, hue, and/or the like, digital zooming, digital stabilization, and the like, as explained earlier.

At step 506, the server program 164 identifies individual animals from the plurality of sets of images using the methods described above (e.g., performing steps 308 to 316 shown in FIG. 6). At step 508, the animal identification results of each set of images are matched and combined/fused for obtaining the final animal identification results for the herd. Fusion may be done by using different body parts (e.g., the tail section, the body section or the head section) to obtain IDs which are then combined (e.g., fused) together, using techniques described herein, to obtain an ID for the animal. Therefore, the animals that are accurately identified for each set of images are included in a list of all of the animals for the herd (with duplicates removed). Rather than fusion, the location of the bounding box for an identified animal may be tracked as the bounding box location changes from one video frame to another and so even if the identified animal is occluded in one frame so that it cannot be identified using the AI models herein, the location of its bounding box can be tracked in the frame where the identified animal is occluded and the tracked bounding box is used to identify the animal. Accordingly, for each image in the plurality of images, all of the animals in the image are identified and the associated bounding box and animal ID can be overlaid on the image and stored as a new image. Alternatively, for each animal, the image number in which the animal is identified along with the location of the bounding box can be stored in a database. The process 500 then ends (step 510).

Those skilled in the art will appreciate that, by using a plurality of imaging devices 108 for capturing images of the herd from various angles, animals occluded from some viewing angles in some of the captured images may be visible from other viewing angles in other captured images. Therefore, by combining or fusing the animal identification results of a plurality sets of images captured from a plurality of viewing angles, the system 100 may effectively solve or alleviate possible occlusion issues and obtain more reliable animal-identification results.

Animal Assessments

In at least one embodiment, the system 100 may also be configured to perform one or more animal assessments. For example, referring now to FIG. 23, shown therein is a flowchart showing an example embodiment of an assessment process 550 that may be performed by one or more processors of the processor module 142 when executing one or more of the server programs 164 for assessing one or more characteristics or conditions of one or more of the animals at the site 102.

Figure 23:
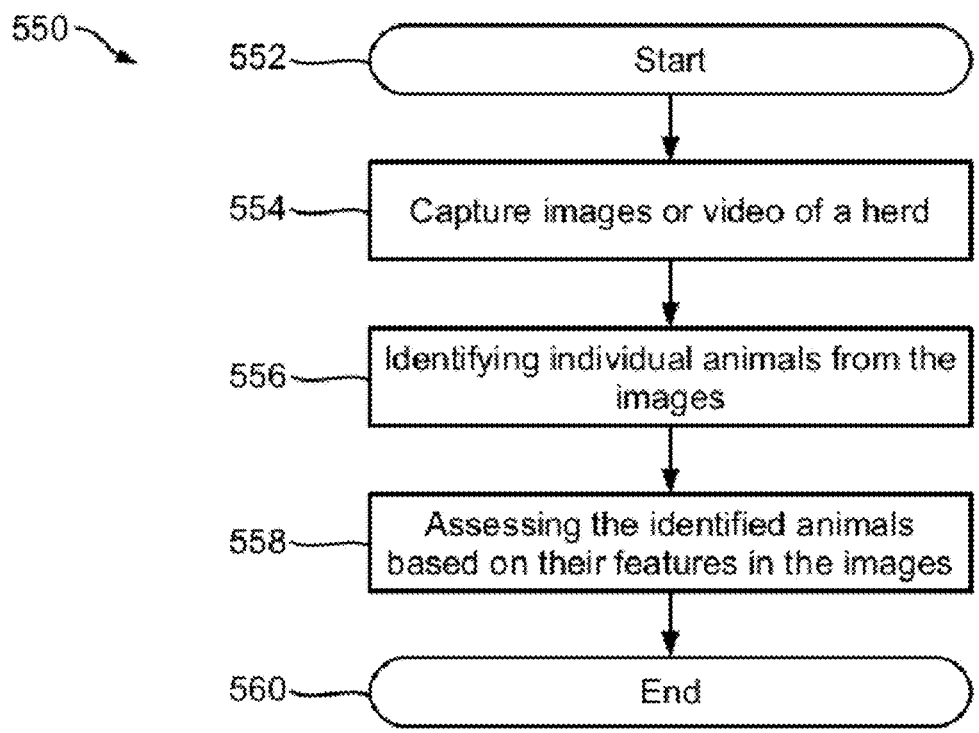
FIG. 23 is a flowchart showing an example embodiment of an animal assessment process that may be executed by the animal identification and assessment system of FIG. 1A for assessing the animals in a site, according to at least one embodiment of this disclosure.

As shown in FIG. 23, the process 550 may start (step 552) automatically (e.g., periodically), manually under a user's command, or when one or more imaging devices 108 send a request to the server program 164 for transmitting captured (and encoded) images.

After the process 550 starts, the server program 164 commands the imaging devices 108 to capture images or video clips of a herd (collectively denoted "images" hereinafter for ease of description) at the site 102 and starts to receive a set of the captured images or video clips from each of the imaging devices 108 (step 554). Accordingly, a plurality of sets of images are received and may be processed, for example, by automatically adjusting image parameters such as exposure, white balance, contrast, brightness, hue, and/or the like, digital zooming, digital stabilization, and the like, as was explained earlier.

At step 556, the server program 164 identifies individual animals from the plurality sets of images using the methods described above (e.g., performing steps 308 to 316 shown in FIG. 6). At step 558, the animal images are further processed for assessing one or more of the characteristics or conditions for at least one of the identified animals. The process 550 then ends (step 510).

The process 550 may be used for assessing one or more conditions of the identified animals based on the captured animal images. For example, in at least one embodiment, the process 550 may be used for predicting certain diseases of one or more of the identified animals.

For example, the process 550 may be used for predicting bovine respiratory disease (BRD) which is a disease that can infect about 20% of a feedlot and can be the highest cause of fatality in a feedlot. In such embodiments, the server program 164 may use at least one AI model of the AI pipeline for predicting BRD for at least one animal based on data from one or more of the head sections (e.g., including the left-side head section, the right-side head section, and/or the front-side head section) and/or one or more body sections of a given identified animal in the acquired images. For example, a BRD AI model of the AI pipeline may be configured to analyze and monitor the statuses and movements of the given animal's eyes, nose, and mouth of the one or more head sections and/or the statuses and movements of the animal's body section for identifying BRD symptoms such as:

nasal and eye discharges: determined based on nose and eye movements which may be determined by providing locations of the key points used for the nose and eyes of the given animal across a set of images which contain the given animal to the BRD AI model;

coughing and sneezing: determined based on mouth movements such as abrupt mouth open/close movements and/or head movements such as a sharp head movement which may be determined by tracking locations of the key points used for the nose and eyes of the given animal across a set of images which contain the given animal to the BRD AI model to classify when an animal coughs or sneezes and how often;

droopy ears: determined based on the ear status (e.g., related but pointed to the side, floppy indicating the animal is feeling down, or pointed up indicating the animal is alert) and movements of the ears which may be determined by providing locations of the key points used for the ears of the given animal across a set of images which contain the given animal to the BRD AI model;

open-mouthed breathing: determined based on the mouth status (e.g., open versus closed) and movements of the mouth which may be determined by providing locations of the key points used for the mouth of the given animal across a set of images which contain the given animal to the BRD AI model; and/or when an animal stops stop drinking and/or eating for a minimum period of time indicative of potential BRD.

The BRD AI model may be created to include inputs for various key points, links, bounding boxes to a classifier that provides a YES or NO answer as to whether the animal has BRD. For example, one or more LSTM models may be employed to detect certain characteristics like sneezing, the cessation of eating and/or drinking, and/or detecting movements indicating a lethargic or depressed state (e.g., drooped ears and/or shoulders) for the animal. Inputs to the BRD AI model can include key points to determine coughing and/or sneezing, activity classification results from determining whether the animal is eating and/or drinking, and classification results from determining whether the animal has slouching/lethargic movement. The model can be trained using images from animals that have BRD and healthy animals. A softmax function can then be applied to the output of the BRD AI model to determine the confidence of the prediction that the animal has BRD. Upon the process 550 having identified an animal as displaying BRD symptoms, a veterinarian may further examine the animal for BRD symptoms, and advise on appropriate remedial steps (e.g., isolation of the animal from the herd, intensified herd monitoring), as necessary.

In such embodiments, the system 100 may further comprise imaging devices for measuring the output from the identified animal (e.g., release of urine and/or manure which may occur when the animal's tail points straight up) to further facilitate the determination of depressed appetite by providing the amount of urine and manure output of the animal by as inputs to the appetite assessment AI model.

Referring to FIG. 13, the leg length for the left hindleg may be obtained by (a) identifying the section for the left hindleg, (b) locating the key points for the left hindleg, (c) determining a first length of a first link from key point 424*a* to 424*b*, a second length of a second link from key point 424*b* to 424*c*, a third link from key point 424*c* to 424*d* and a fourth link from key point 424*d* to 424*e*, (d) determining the length of the links (e.g., first to fourth lengths for the first to fourth links respectively) (e) determining an overall length by adding the first to four lengths and (f) recording the overall length.

As another example, referring again to FIG. 13, the body length for the identified animal may be obtained by (a) identifying the hide section, (b) locating the key points for the hide section, (c) defining links for successive key points, (d) determining lengths for each defined link, (e) determining an overall length by adding lengths for each link and (f) recording the overall body length for the date on which the image from which the calculations were made were obtained.

In at least one embodiment, the animal identification and assessment system 100 may be configured to record which animal in a herd leads the herd. This shows which animals are the alpha animals in the herd and determining whether the alpha animals exhibit bullying behaviour, which is not desirable since these animals spend too much energy maintaining their alpha position and second, other animals have to wait to eat, which causes them to gain wait more slowly. The determination of which animal leads a herd maybe performed by obtaining images of a herd, identifying the animals in the herd for the images, identifying a position for the identified animals at the topmost, bottommost, rightmost and leftmost regions of the herd and then determining which of these identified animals advance their position over time and whether the positions of other located animals in the herd move in a similar direction. For example, if the topmost positioned animal continues to move to the top of the image and the rest of the positions of the animals in the herd move in a similar direction then the topmost identified animal is the leader. The identified animal that leads the herd can be recorded for a given day and this analysis can be repeated for several days during a desired time period and recorded.

In at least one embodiment, the animal identification and assessment system 100 may further comprise one or more microphones for recording sound from the animals at a site and may analyze the recorded sound to determine the breathing sound of an identified animal, determine if there is noise in the breathing sound and combine the breathing noise with image-based methods for facilitating the prediction of BRD. This is described in more detail below. An animal may wheeze if it has BRD. An LSTM may be used to detect wheezing by analyzing the audio recordings over time, although this may be more effective in a closed setting like a barn.

For example, in at least one embodiment, the animal identification and assessment system 100 may be configured to determine when an identified animal has an open mouth through locating the key points associated with the identified animal's mouth and then determining when the location of these key points move further apart indicating that the identified animal has opened its mouth. The timestamps (e.g., visual timestamps) of the images in which the identified animal has an open mouth may then be recorded and compared to the timestamps (e.g., audio timestamps) for when a "Moo" sound is recorded by the microphone, so that the system 100 may map that animal sound to the identified animal that has an open mouth based on visual timestamps that temporally match or temporally overlap audio timestamps. This may depend on the type of animal. For example, cattle tend to be quiet when their mouths are closed.

In at least one embodiment, the animal identification and assessment system 100 may include at least one microphone for recording sound from the animals at a site and the system 100 may be configured to employ an artificial recurrent neural network (RNN) architecture such as long short-term memory (LSTM) to or a Transformer network to map a "Moo" sound to a specific cow. Alternatively, in at least one embodiment, the animal identification and assessment system 100 may be configured to extract a "Moo" sound of a given identified cow from the "Moo" sounds of other animals and background sounds at the site by using a deep learning version of independent component analysis (ICA). For example, using two microphones, and ICA, a "Moo" sound can be isolated from the background noise and the isolated "Moo" sound audio recording is used to train an LSTM or transformer model to associate the "Moo" sound to the ID of an animal. Moreover, the individual "Moo" sounds may also be mapped to specific meanings such as the animal undergoing stress or the animal providing a warning to the herd.

In at least one embodiment, the animal identification and assessment system 100 may further comprise one or more thermal cameras for measuring the temperature of an identified animal for detecting fever, which may be used together with above-described the image-based methods based on locations and/or movement of locations of certain key points and/or the audio-based methods to provide inputs into the BRD AI model that then predicts whether an identified animal may have BRD and provides a confidence score for the prediction, as described previously. Alternatively, a basic model may be used to predict when an animal has a fever and potentially BRD and then a second model may use the temperature input to predict BRD, so the first and second models are chained together, which is something that is also done with certain AI models in the AI pipeline of FIGS. 33 and 34A.

In at least one embodiment, one or more of the server programs 164 may be executed by one or more of the processors of the processor module 142 so that the system 100 is configured to use one or more of the images for identified animals for determining and monitoring lameness of any one of the identified animals and determining the severeness of the lameness (i.e., a lameness rating with a scale of 1 to 5) based on above described segmentation and skeleton of the identified animals, or based on the gait of the identified animals. For example, the gait of each identified animal in a set of images may be determined and then compared to gait lameness templates with irregular patterns to determine which animals are lame. The keypoints and key angles may be used to track an animal's joints relative to each other, over a series of video frames, to thereby form a pattern. An LSTM or Transformer model may be trained to recognize the pattern and classify the animal's gait to determine a level of lameness for the animal with a confidence score, as described previously. Alternatively, the key points of the identified animals may then be masked with skeletal key points that correspond to irregular patterns which may indicate lameness. In both cases, the gait templates or skeletal key points with irregular patterns that are used may be associated with a certain amount of lameness (e.g., on the scale of 1 to 5). Accordingly, the gait lameness template and/or the skeletal key point with an irregular pattern to which the gait and/or skeletal key points of a given identified animal match most closely (e.g., are the most correlated with) then defines the amount of lameness for the give identified animal.

In at least one embodiment, one or more of the server programs 164 may be executed by one or more of the processors of the processor module 142 to configure the system 100 to use the acquired animal images for determining and monitoring stress or anxiety of the identified animals in the images based on applying the above-described segmentation techniques to determine key points of certain portions of the skeleton of the identified animals and analyzing the locations of certain key points and/or change in location of certain key points to detect animal behaviours that may indicate stress such as, but not limited to, folded ears, a wagging tail or a stiff tail, for example.

Figure 24:
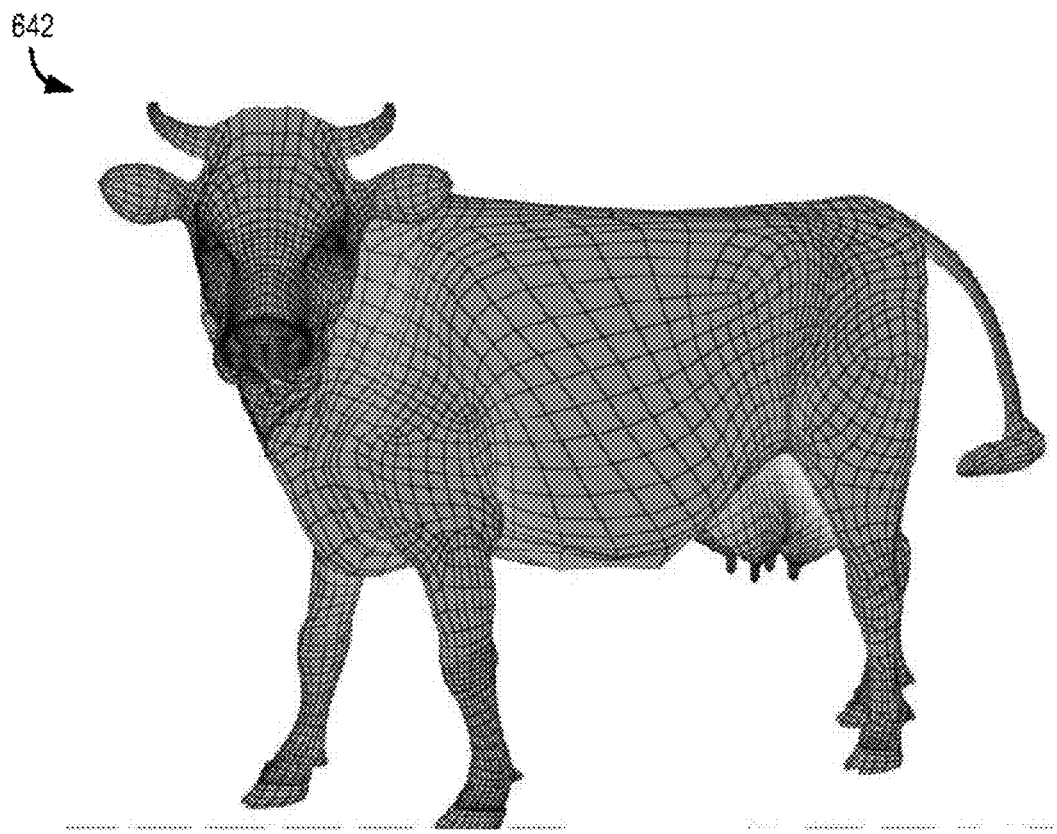
FIG. 24 shows a three-dimensional (3D) point cloud of an identified animal that is determined according to the teachings herein.

In at least one embodiment, the animal identification and assessment system 100 may further comprise one or more Light Detection and Ranging (LIDAR) sensors (also denoted as "LIDAR cameras" hereinafter). As shown in FIG. 24, one or more of the server programs 164 may be executed by one of more of the processors of the processor module 122 so that the system 100 is configured to use data obtained by the LIDAR sensors to build a 3D point cloud 642 of an identified animal, and use the point cloud 642 to predict one or more animal measurements such as, but not limited to:

weight, mass, and volume: determined based on the size or volume of the point cloud 642 by converting the 3D point cloud to a mesh which has a volume, weighing the animal to get its weight and then building a model to compute the animal's weight from its volume.

In at least one embodiment, one or more of the server programs 164 may be executed by one of more of the processors of the processor module 122 to configure the system 100 to use one or more AI models of the AI pipeline for determining the pulse of an identified animal. For example, the 3D point cloud of the identified animal can be obtained as explained previously and changes (e.g. movements) in a landmark of certain regions of the 3D point cloud, e.g., on the neck area of an identified animal with bare skin in the neck area, can be counted over a period of time to determine the pulse of the identified animal.

In at least one embodiment, the animal identification and assessment system 100 may further comprise one or more thermal cameras. In these embodiments, the animal identification and assessment system 100 may use use one or more AI models of a multi-layer artificial intelligence (AI) pipeline for identifying animals at the site 102 and measuring and monitoring temperatures of various parts thereof. The animal identification and assessment system 100 may also be configured to generate a thermal map for one or more of the identified animals.

Figure 25:
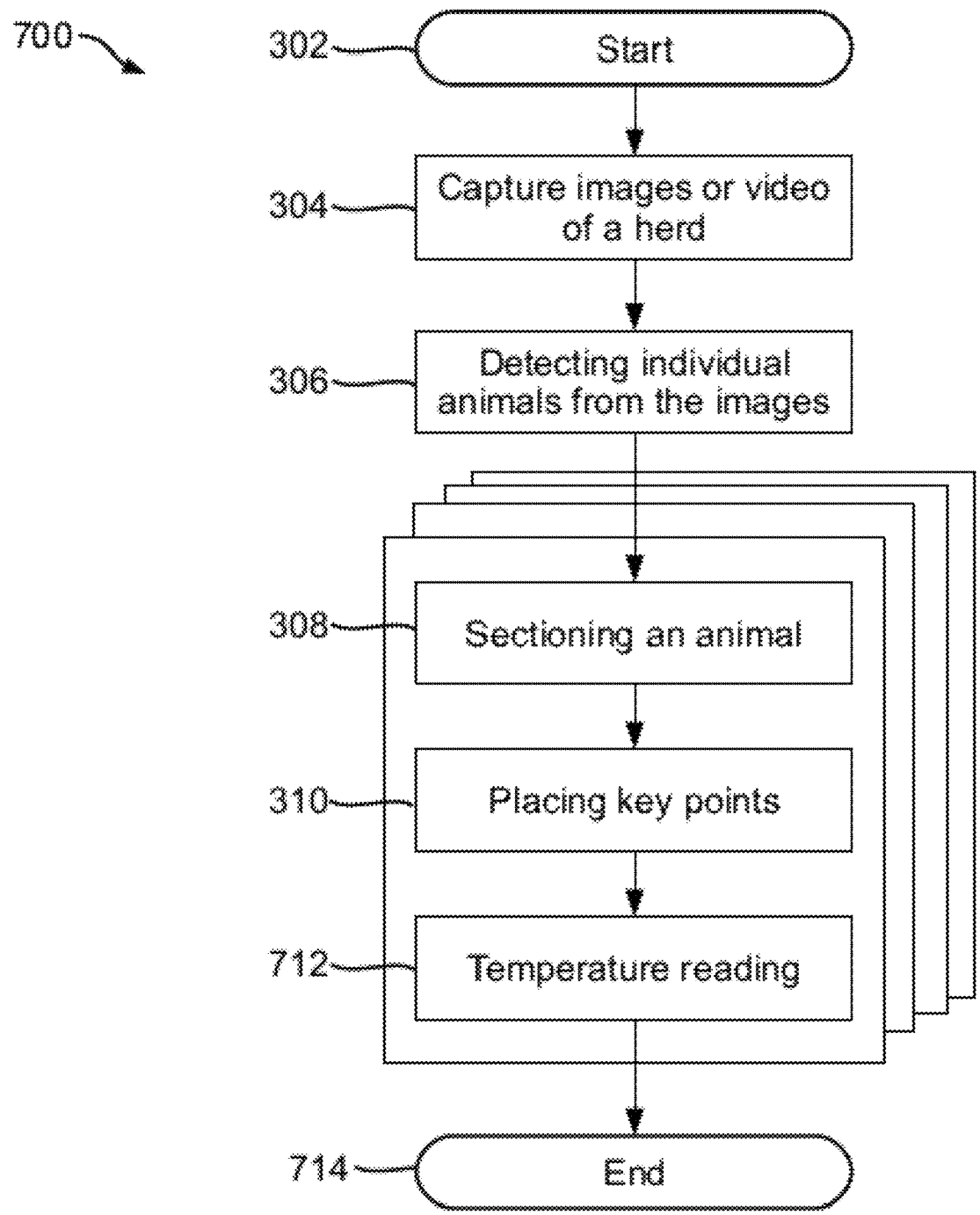
FIG. 25 is a flowchart showing another example embodiment of an animal assessment process that may be executed by the animal identification and assessment system of FIG. 1A for using an AI pipeline to identify the animals at a site and measure and monitor temperatures of various parts thereof, according to at least one embodiment of this disclosure.
Figure 33:
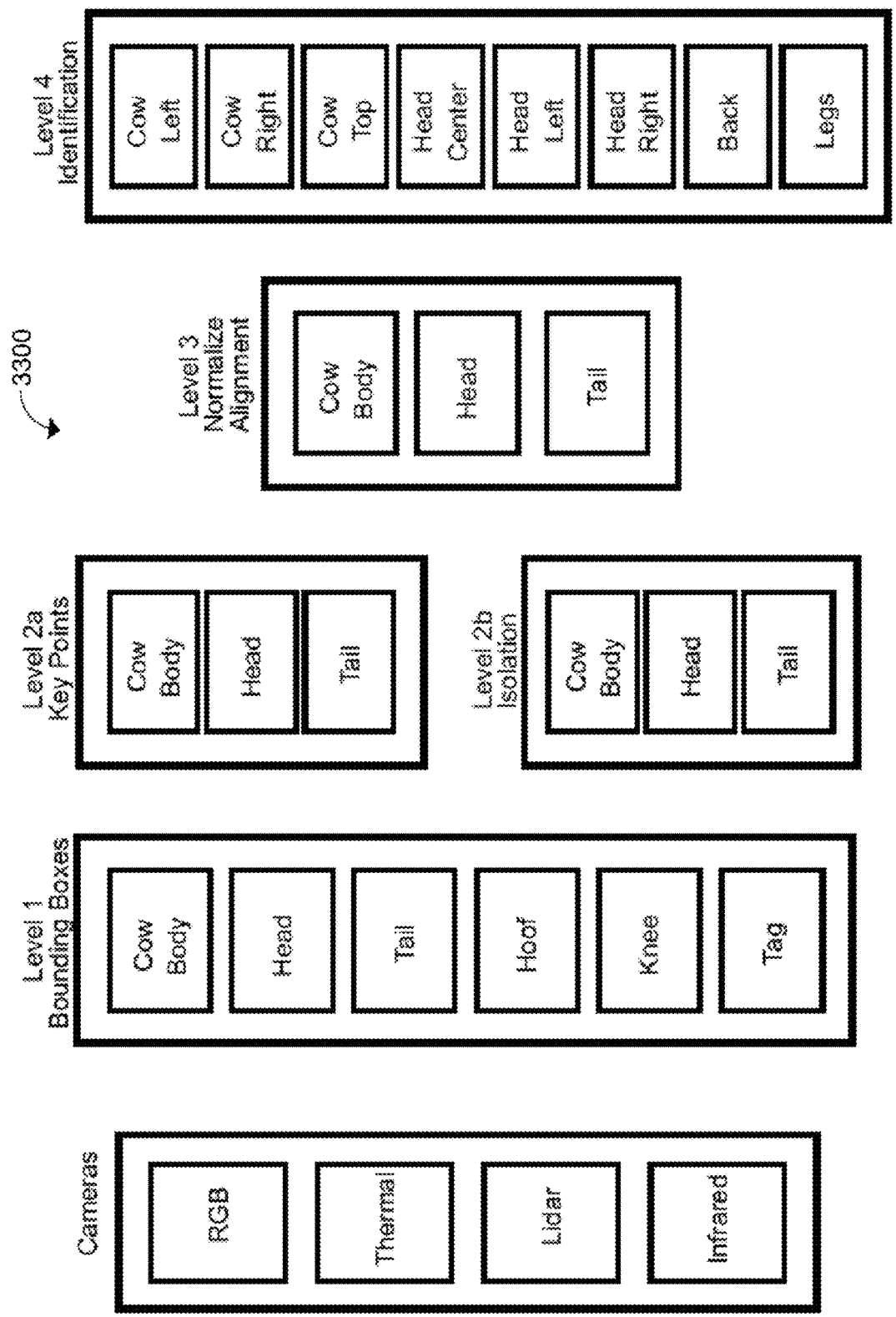
FIG. 33 shows an example embodiment of an AI pipeline that may be used by at least one embodiment of the animal identification and assessment system described herein for the animal identification.

FIG. 25 is a flowchart showing another example embodiment of an animal identification and assessment process 700 that may be performed when one or more processors of the processor module 122 execute one or more of the server programs 164 for identifying the animals at the site 102 and optionally measuring and monitoring temperatures of various parts of the identified animals, using one or more AI models of the AI pipeline of FIG. 33.

The first several steps of the process 700, i.e., steps 302 to 310, are the same as those of the process 300 shown in FIG. 6 (and thus identified using same reference numerals). After determining and locating the sections and key points (e.g., steps 308 and 310), thermal data from one or more thermal cameras are used for measuring the temperatures of various sections of one or more of the identified animals (step 712). The process 700 then ends (step 714).

For example, after the key points and/or bounding boxes are defined at steps 308 and 310, thermal data from one or more thermal cameras are used for measuring the temperature at a key point or bounding box of a selected section of the identified animal based on the measured temperature of the pixels at these locations. In these embodiments, a masking subprocess may be used for separating out the pixels of a thermal image by using the bounding boxes and/or key point locations determined from another image captured by an imaging device 108 (e.g., a visible-light camera or an IR camera) as described above and reading the temperature of a key point or bounding box from the thermal data of the corresponding pixel value of the thermal image. These thermal calculations may be repeated for several images and then the thermal calculations are averaged together to get a more reliable measured temperature.

Figure 26A:
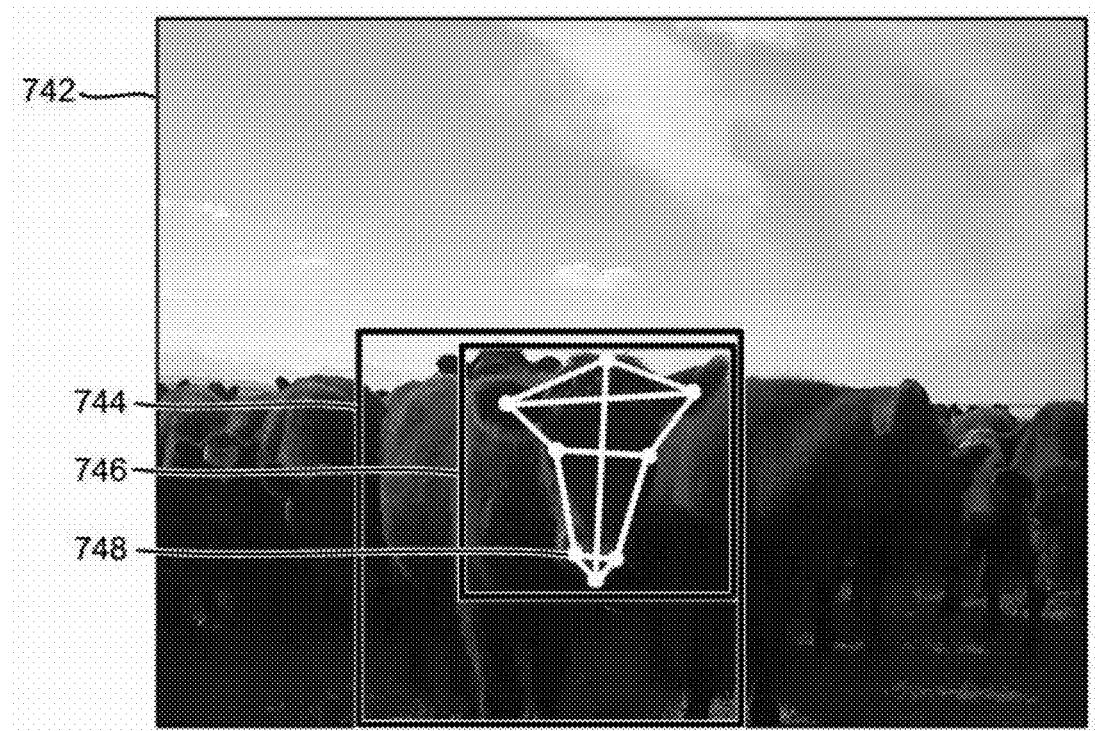
FIG. 26A shows an image of a herd captured by a first imaging device where the image is processed according to the teachings herein and a cow is detected and shown with an associated bounding box, the front-side head section of the identified cow is segmented, and the key points are defined in the front-side head section.

The masking subprocess leverages the key points obtained at step 310. For example, FIG. 26A shows an image 742 of a herd, captured by an imaging device 108. In this image 742, a cow is identified with a bounding box 744. The front-side head section 746 of the identified cow is also segmented, and the key points 748 are defined in the front-side head section 746.

Figure 26B:
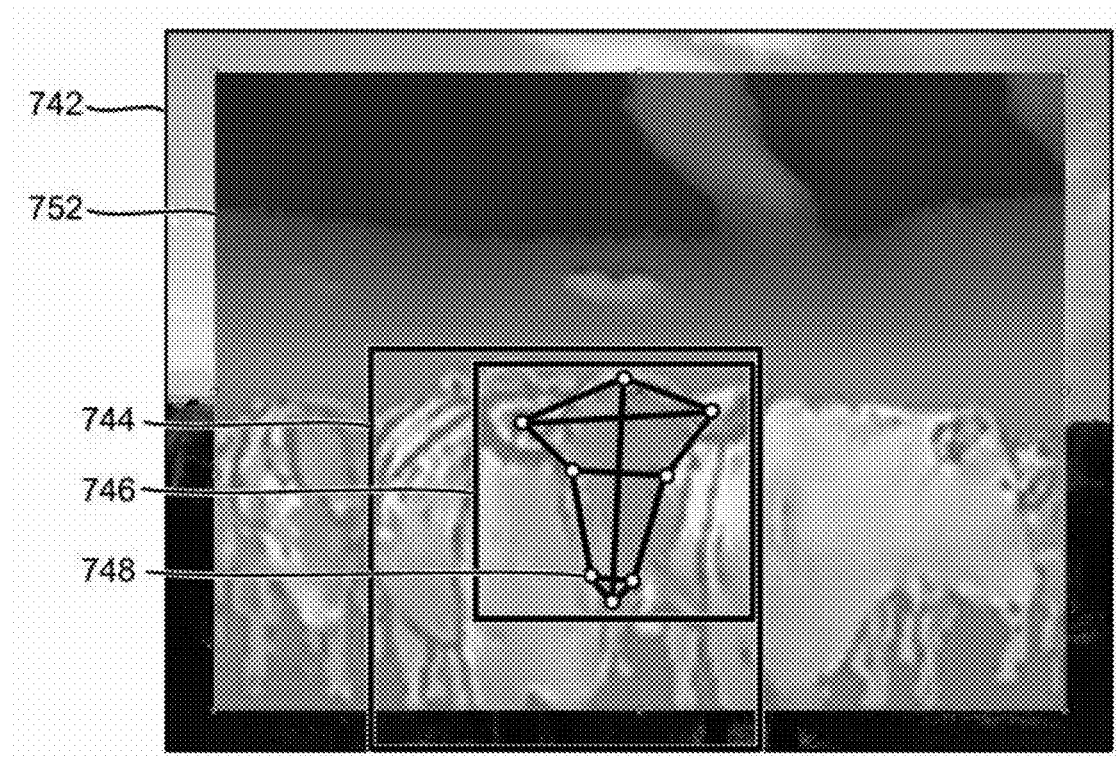
FIG. 26B shows the image of FIG. 26A overlaid with a thermal image for separating out the pixels based on different temperatures obtained by thermal imaging.

As shown in FIG. 26B, a thermal image 752 captured by a thermal camera from a location adjacent the imaging device 108 and at a similar angle is overlapped to the image 742. The image 742 and/or more specifically the bounding box 744 of the cow, the bounding box of the front-side head section 746, and the key points 748, separate out the pixels of the thermal image 752. Then, the process 700 may use the values of the pixels of the thermal image 752 at one or more of the key points 748 to determine the temperatures thereof.

In at least one embodiment, masks may be defined at some key points (e.g., those at eyes and nose) for determining the temperatures thereof.

To determine the temperature of an area of an identified animal such as its head, the bounding box of the area is used, and the average of the temperature readings within the bounding box (determined by the pixels of the thermal image 752 within the bounding box) is used as the temperature of the area. Alternatively, the highest temperature reading within the bounding box may be used as the temperature of the area.

In at least one embodiment, a plurality of thermal images 752 may be captured by the thermal camera from the location adjacent to the first imaging device 108 and at a similar angle. The thermal images 752 may be captured at a suitable rate such as about eight (8) frames per second (fps) to about 25 fps. The captured thermal images 752 are then overlapped to the image 742. One or more of the server programs 164 may then determine the temperatures from each thermal image 752 as described above, for a key point location or for a bounding box of the identified animal and combine the determined temperatures (e.g., by averaging the temperatures or using a suitable optimization method) to minimize the noise in temperature readings.

In at least one embodiment, the FOV of the thermal cameras may be smaller than that of the other cameras that are used to obtain images of the animals (i.e., cameras operating in visible light spectrum). Therefore, one of the server programs 164 may use a set of calibrated pixel mapping parameters to modify the pixels of the thermal images 752, which may be done using interpolation and/or a geometric transformation, so that the location of the modified thermal pixels match the location of the pixels for the key point(s) and/or bounding box(es) defined using the visible-light or IR image 742 before overlapping the thermal images 752 to the visible-light/IR image 742 or applying masking to the thermal images 752 based on the location of the key point(s) and/or bounding box(es).

The animal identification and assessment system 100 may use measured temperature for assessing one or more conditions of a given identified animal. For example, a fever indicative of BRD may be determined a certain amount of time, e.g., 3 to 5 days, before other symptoms show, and therefore an identified cow having a fever can be separated from the herd thereby preventing a BRD outbreak in the herd.

Figure 27A:
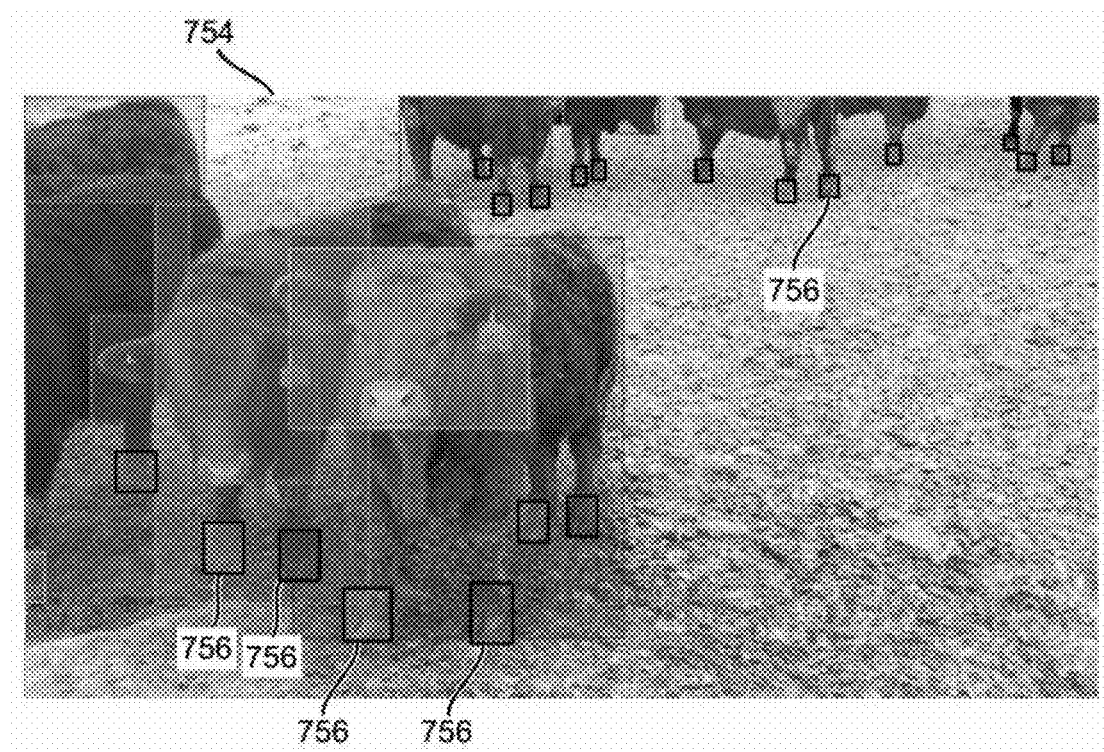
FIG. 27A shows an example image of cows that has been processed according to the teachings herein, wherein the cows are detected and shown with associated bounding boxes and are segmented into a plurality of sections including sections of hooves.
Figure 27B:
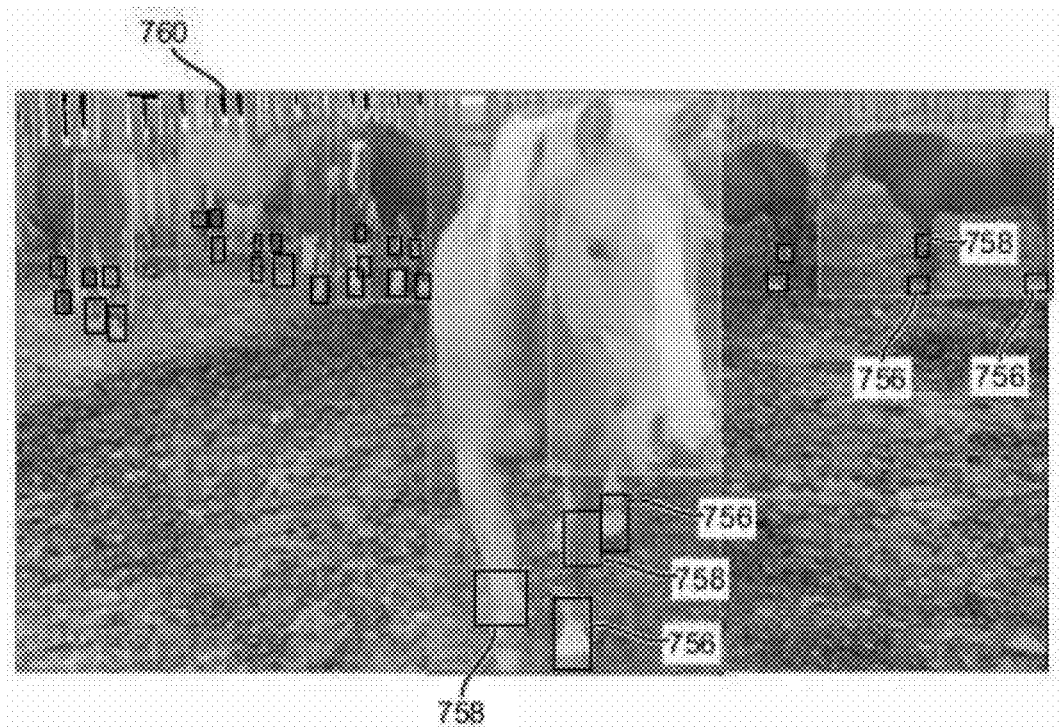
FIG. 27B shows an example image of horses that has been processed according to the teachings herein, wherein the horses are detected and shown with associated bounding boxes and are segmented into a plurality of sections including sections of hooves and sections of knees.

As shown in FIGS. 27A and 27B, in at least one embodiment, the system 100 may be configured to also segment the hooves 756, the knees 758, and/or other joints (not shown) of identified animals (e.g., cows in image 754 shown in FIG. 27A and horses in image 760 shown in FIG. 27B) and determine bounding boxes for the knees and hooves. In such embodiments, the system 100 may also measure the temperatures of the hoof sections 756 and knee sections 758 as explained earlier for other bounding boxes or certain key points by measuring temperatures from the thermal data at associated with these locations.

In at least one embodiment of the animal identification and assessment system 100 that performs temperature measurements, the system 100 may be further configured to also use measured temperatures for other assessments such as one or more of:

(a) measurement of temperature at key points which may indicate poor circulation such as temperature measurement of key points that correspond to an identified animal's ear, which may be especially useful in young calves that have been known to lose their ears to frostbite due to poor circulation (in such cases the measured temperature may be compared to a temperature threshold so that identified animals with poor circulation may be treated to improve circulation); and (b) tracking cheek temperature for assessing implications to rumination as the mouth may be hotter if there were more rumination.

Figure 28:
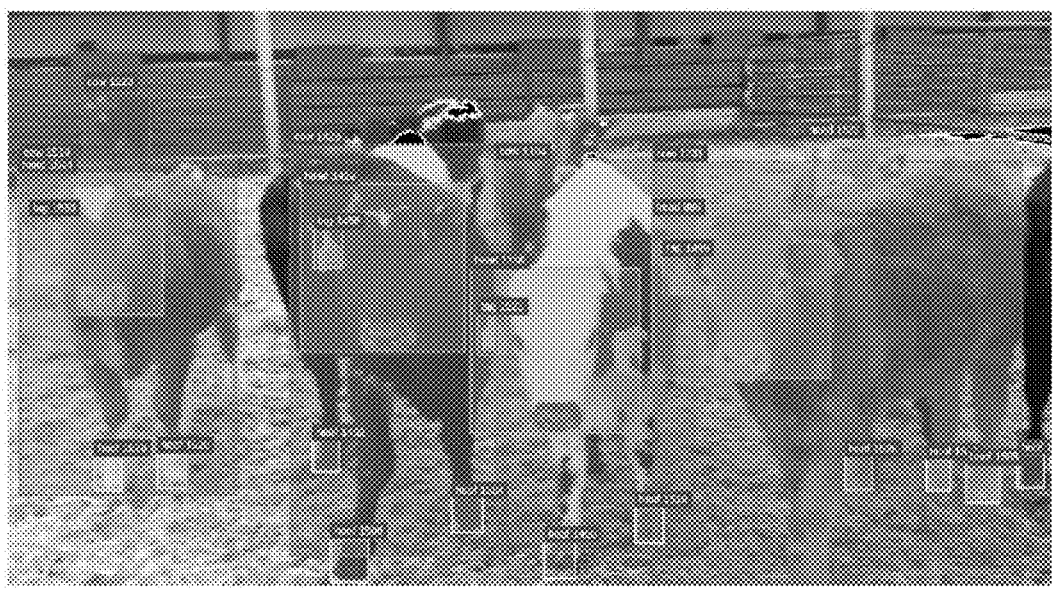
FIG. 28 shows an example video-clip frame that has been processed according to the teachings herein with overlaid bounding boxes and labels showing the obtained animal detections and animal segmentations.

As described above, in at least one embodiment, the animal identification and assessment system 100 may be configured to identify and/or assess animals using video clips. FIG. 28 is an example of a video-clip frame showing the animal detection and animal segmentations using one or more AI models of the one of the AI pipelines described herein.

The animal identification and assessment system 100 may record all identification and assessment results about the animals and store such results in the server computer 120, e.g., in a database thereof. The animal identification and assessment system 100 may continuously generate useful reports and statistics for the end-user. The animal identification and assessment system 100 may integrate collected data into a series of predictions, proactively informing the end user of any critical events. For example, in at least one embodiment the system 100 may be configured to notify a rancher about any animal that is exhibiting certain behaviour which is statistically significantly different than the norm, such as two standard deviations from the mean of a measurement for the behaviour. This may be used for behaviours such as, but not limited to, drinking, eating, producing urine and/or manure, sleeping, and walking, for example. These notifications may be generated on an immediate, hourly, daily basis and/or a nightly basis.

In at least one embodiment, to generate a report showing statistics for certain characteristics of the monitored data, the collected data may be written to a time-series database, such as Time-Stream, for example. Summarization reports on the data can then be generated in Time-Stream, using lambda functions triggered via GraphQL or some other mechanism. The summary statistics may then appear on a customer portal (e.g., see FIG. 32) and the statistics can be provided at the herd level or for a certain animal at the site. For example, the average drinking duration time for a herd, broken down by week, day or hour may be generated and further broken down based on certain characteristic of the monitored animals such as, but not limited to, breed and age.

Figure 29:
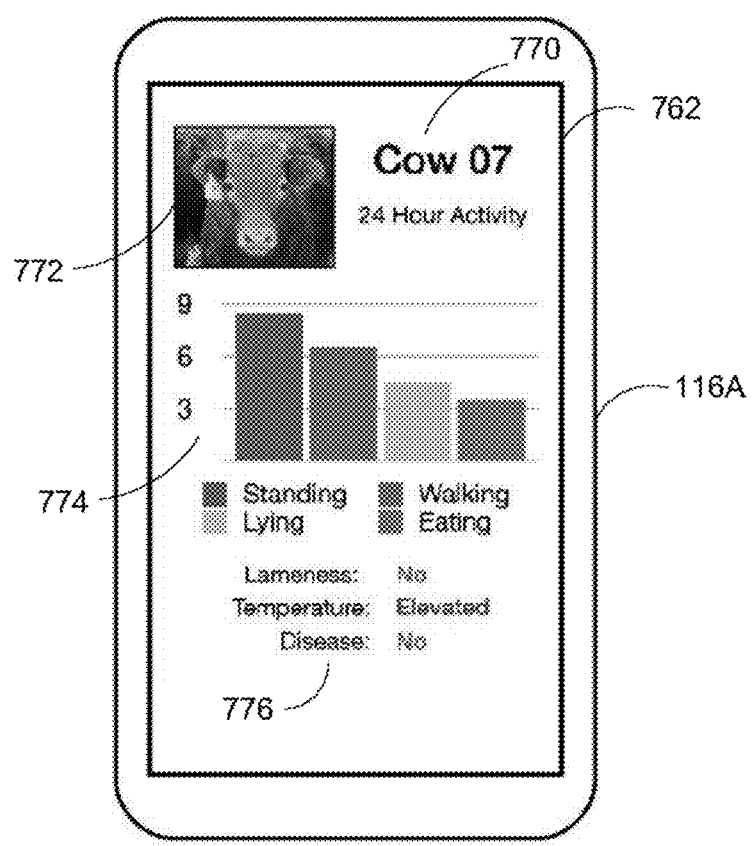
FIGS. 29 to 31 illustrate example screens of a smartphone, a tablet, and the monitor of a desktop computer, respectively, showing animal data for a specific animal in a site, according to at least one embodiment of this disclosure.
Figure 30:
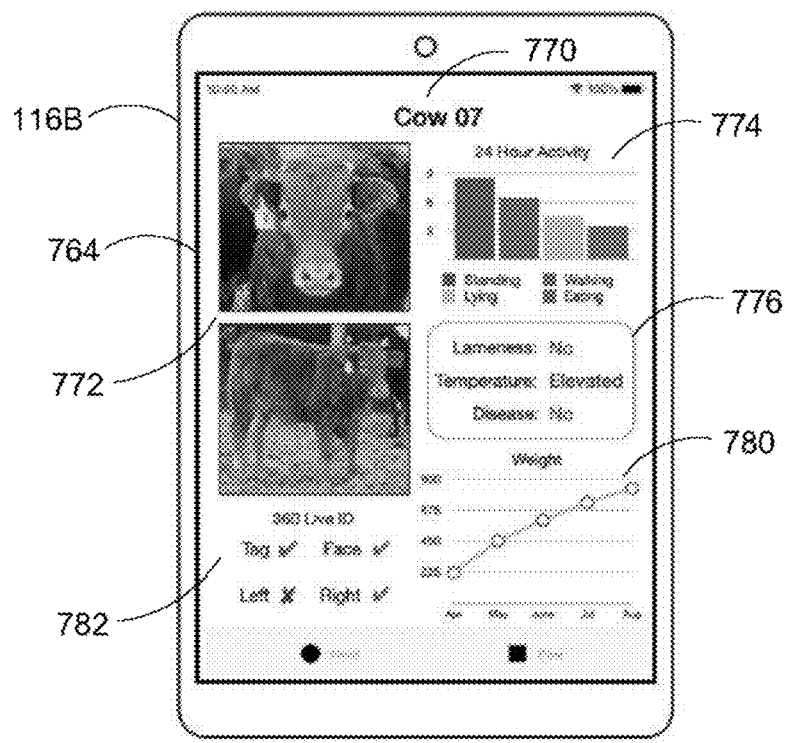
Figure 31:
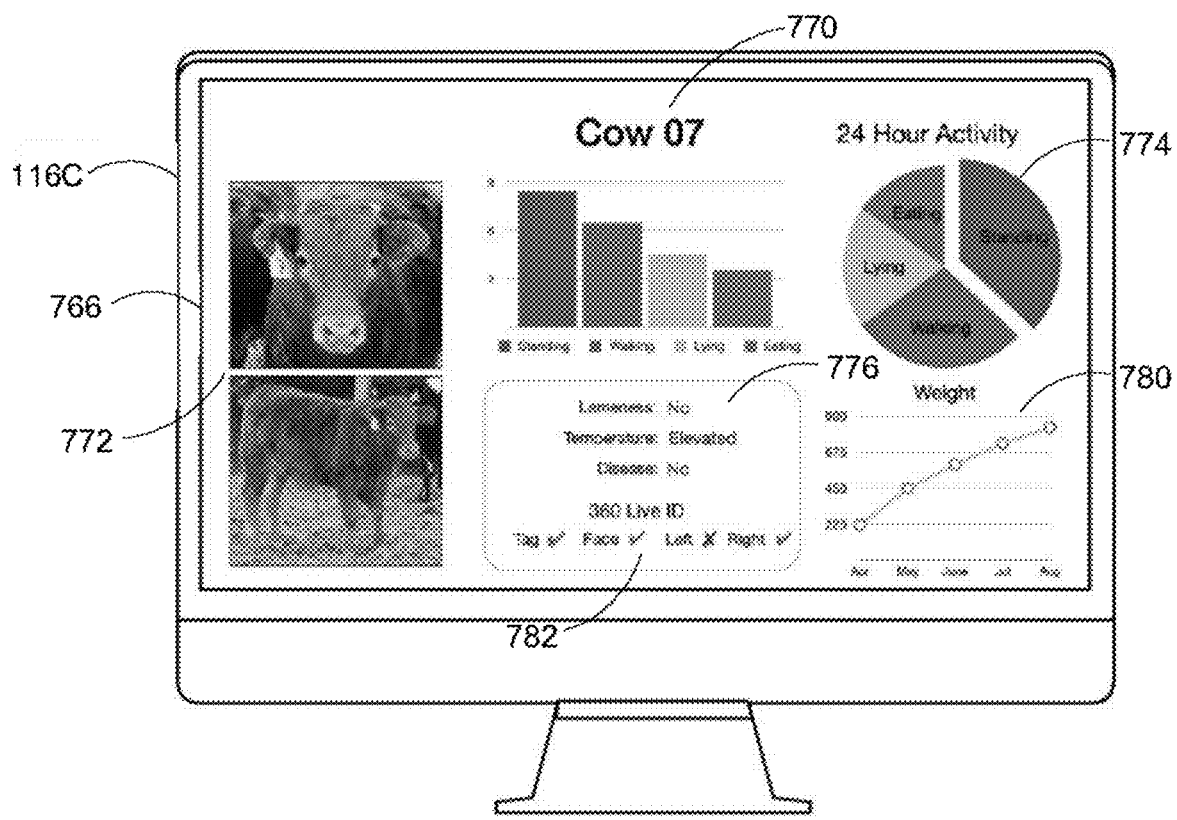

As described above, a user 114A may use a client computing device 116 such as a smartphone to query the server computer 120 and obtain information of one or more identified animals. FIGS. 29 to 31 illustrate example GUIs 762, 764, and 766 of a smartphone 116A, a tablet 116B, and the monitor of a desktop computer 116C, respectively, showing data of a specific identified animal at the site 102 where the data has been measured and/or otherwise determined through using one or more AI models of the AI pipeline. In at least one embodiment, the example GUIs 762, 764 and 766 may include an ID portion 770 identifying the specific animal (e.g., Cow 07), and an image portion 772 where one or more images or an image and a video of the specific animal may also be displayed such as a still image and a 360-degree live video (this may be provided using available software tools such as those from NVIDIA CORPORATION). The displayed data of the specific animal may include statistical data 774 of the animal performing certain activities in a predefined or selected time period, such as a 24-hour period. The statistical data 774 may, for example, include bar graphs, pie charts or other suitable indicators. Further, the displayed data may include an animal assessment portion 776 to display one or more assessments that were performed for the identified animal such as, but not limited to, one or more of lameness, temperature, and potential illnesses. The assessment portion of the GUI 764 may also include additional animal assessments that are displayed graphically such as, but not limited to, for example, a weight assessment 780. The GUI 764 may also include a section view portion 782 which shows which sections of the identified animal's head are visible in the 360-degree video image.

Figure 32:
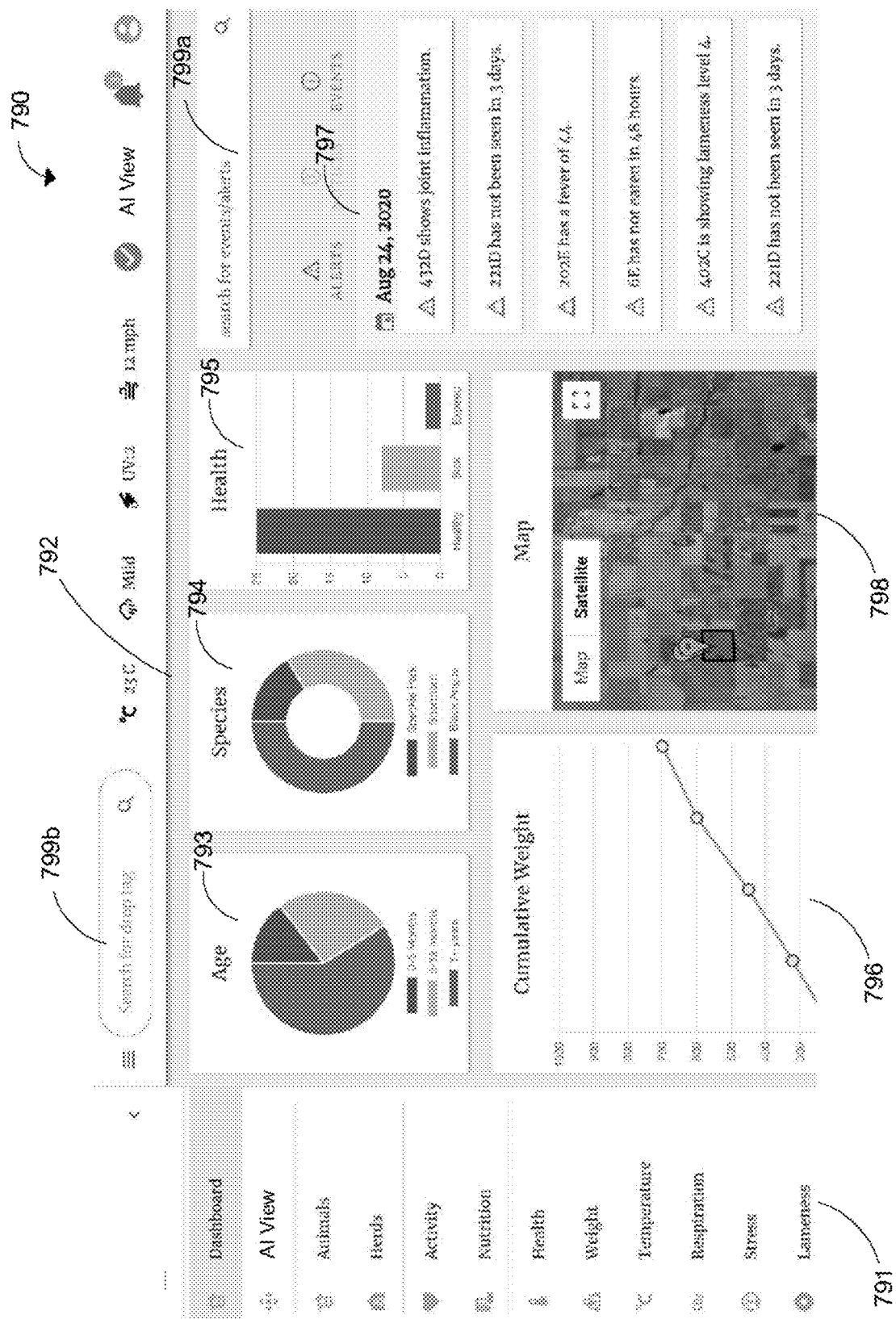
FIG. 32 shows an example screenshot of a graphical user interface which may be displayed on a monitor of a desktop computer that is communicatively coupled to the animal identification and assessment system of FIG. 1A, displaying a window providing animal data for several identified animals.

FIG. 32 shows an example embodiment of another GUI 790 (e.g., a portal GUI) of an administration portal that is displayed on the monitor of a desktop computer. The portal GUI 790 displays a window providing data of the animals and corresponding assessments for a site. The portal GUI 790 may include a menu 791 having various animal monitoring and management tools/options for users to access to view/monitor one or more animals and data therefor at a site as well as aggregate data at a herd level for the site. In this example, the menu 791 includes a Dashboard option, an AI View option, an Animals option, a Herds option, an Activity option, a Nutrition option, a Health option, a Weight option, a Temperature option, a Respiration option, a Stress option and a Lameness option. In other embodiments, other options can be provided in the menu 791.

In the example GUI 790, the Dashboard option is selected and a Dashboard view 792 is displayed having various display portions. For example, the Dashboard view 792 of the GUI 790 may have display portions 793, 794, 795, and 796, where data may be provided for displaying data about the age, species, health, cumulative weight information, respectively, for a herd of animals at the site. The Dashboard view may also have display portion 797 where alerts, notices and/or events for the herd may be displayed when a user selection for one of the tabs labelled "Alerts", "Notices" and "Events" is made by a user. The Dashboard view 792 may also include a map portion 798 of the site. The map portion shows map data, which may be obtained from a suitable map or GPS provider, of the location of the site.

For example, in FIG. 32, when the Alerts tab is selected, a list showing the most recent alerts for certain aspects of the animals in the herd of this site is displayed such as, but not limited to, animals that have not been seen for a certain number of days, animals that have a temperature that is greater than a temperature threshold, animals that have joint inflammation, and animals that have not eaten for more than a certain period of time, for example. The Dashboard view 792 also includes a search input option 799a to allow a user to search for particular alerts, notices or events for the animals at the site. For example, a user may type in a search query consisting of a word or set of words to search for events or alerts based on one or more of the animals having certain conditions. For example, the search input 799a may be used to search for animals that are lame or that are missing.

To display the data in the display portions 793-796, corresponding data about the animals of the site is retrieved from a data store and corresponding cumulative statistics are calculated and displayed. Alternatively, the cumulative data may be periodically calculated and stored in a data store so that when the Dashboard view 792 is displayed in the GUI 790, the most recent cumulative data can be retrieved from the data store and displayed. To display data in the display portion 797, the data store where data for the animals at the site is searched to find animals that have a condition, characteristic or property that corresponds to the search query and data for the located animals with these conditions are displayed in display portion 797.

The GUI 790 may also include a search box 799b that may be used by a user to search for a specific animal using its drop tag ID and display data for the specific animal such as one or more of the animal data items that is shown in any of FIGS. 29 to 31.

While in various embodiments described herein, drop tags are associated with the animals 104, in at least one alternative embodiment, the one or more animals 104 may be associated or identifiable instead, or in addition to the drop tags, with other suitable ID tags 106 such as a radio-frequency identification (RFID) tag attached therewith.

In these embodiments, the animal identification and assessment system 100 may comprise one or more RFID readers at locations near the animals 104 (e.g., in a hallway of a ranch facility such as a barn) and/or movable to be near the animals 104 or in areas where the animals will move past, such as a gate, such that the RFID readers may read the RFID tags attached to the animals 104. Then, the animal identification and assessment system 100 may alternatively verify the ID prediction against the RFID readings (e.g., at step 316 of the process 300 shown in FIG. 6).

In at least one embodiment, the animal identification and assessment system 100 may not comprise a computer cloud 110. Rather, in such embodiments, the animal identification and assessment system 100 may comprise a site server 120a and a local area network (LAN) at the site 102 with communication nodes 112 that are part of the local area network.

In at least one alternative embodiment, the animal identification and assessments that have been described as being performed in the server computer 120 by a server program 164, may instead, or in addition, be performed locally by one of the client computing devices 116 at the site 102. In such embodiments, the client computing device may be an in-field IoT device using, e.g., a Jetson Xavier NX offered by NVIDIA CORPORATION of Santa Clara, CA, U.S.A. which provides an AI peak performance of 21 Trillion Operations per Second (TOPS), for processing the captured images and performing one or more of the animal identification and/or assessments described herein. Alternatively, the imaging devices that are used with the system 100 may be in communication with STARLINK, which is a low orbit satellite system that provides upload speed of 20 meg/s, which is roughly 10 times faster than what is typically available at a rural ranch or feedlot location. The STARLINK communication system makes it practical to upload raw video feeds directly into the cloud with secure FTP. For example, a typical camera runs at 4 mpbs, while the STARLINK communication network can support at least 20 mpbs making it possible to deploy 5 or more motion activated cameras at a location without an edge compute device.

FIG. 33 shows an example embodiment of an AI pipeline 3300 that may be used by at least one embodiment of the animal identification and assessment system 100 for identification of animals. The AI pipeline 3300 may be implemented using the NVIDIA DeepStream SDK. For ease of illustration, FIG. 33 only shows the nodes of the AI pipeline 3300 and does not show the links therebetween. It should be understood that the nodes from a previous layer may connect to one or more of the nodes of the subsequent layer.

As shown, the input layer labelled Cameras comprises image data from images captured by one or more imaging devices such as visible-light cameras (also denoted "RGB cameras" hereinafter), IR cameras, thermal cameras, LIDAR cameras or any combination thereof.

The level-1 layer is a hidden-layer comprising AI models that are used to generate bounding boxes for animals detected in the images provided by the input layer and create a "sectioned" animal. One or more of the animal sections described herein may be determined by a corresponding bounding box AI model that generates a corresponding bounding box for the animal section. Different bounding box AI models may be created different for each species of animal to which the AI pipeline 3300 is used with since the species generally have different characteristics. For example, some animals have horns or antlers, others typically have longer necks, while others have no tails, etc. However, in some cases some bounding box AI models for different species are close to each other, so that an AI model for locating a head section on a first species of animal may be used on a somewhat similar second species of animal. Thus, the bounding box AI models for the first species may be trained with data from the second species.

In this example embodiment, there is a cow body section AI model, a head section AI model, a tail section AI model, a hoof section AI model, a knee section AI model and a drop tag section AI model. Each of the AI models in the bounding box layer may be implemented using a bounding dox AI model such as the NVIDIA DetectNet_V2 model, which will create a bounding box and a confidence score. A single bounding box AI model may be used to predict all of the bounding boxes (e.g., for the overall animal and its sections) may be used for each species of animal. Each of these bounding box AI models receive pre-processed image data for a detected animal as an input and generates bounding box coordinates for one of the animal sections and well as a confidence score that identifies how accurately the bounding boxes are generated. Each of the bounding box AI models may be trained using bounding boxes that have been determined for the section that the bounding box AI model is used to determine in practice. In an alternative embodiment, it may be possible to use one bounding box AI model that is trained for all sections of interest on a species of animal so that the bounding box AI model can generate bounding boxes for the various sections that are defined for the species of animal whose image data is being processed.

The level-2 layer is a hidden-layer comprising a set of nodes which each comprise an AI model that are used to generate the key points of the certain sections of the segmented/sectioned animals in the image that is currently being processed. For example, the set of nodes in the level-2 layer include a first set of nodes (denoted "level-2a nodes") for determining key points on the animal's body, head, and/or tail sections, and a second set of nodes (denoted "level-2b nodes") which comprise the sections (also denoted "isolations") of the animal such as the animal's body section, head sections, and/or tail or rear-side section. The level-2a nodes are implemented using a pose model, and the level-2b nodes are implemented using an isolation model such as Mask R-CNN (also denoted as "MaskRCNN" which is a model for instance segmentation, developed from the Faster R-CNN model which is a region-based convolutional neural network).

The level-3 layer is a hidden-layer of normalization/alignment combining level-2a and level-2b nodes. For example, image warping algorithms can be applied, as was discussed previously, so that key points that are obtained for the bounding boxes are projected to a common plane based on a reference template of where the key points should generally be located based on the section and the species of animal. This is advantageous since images can be obtained where there are different angles and different distances between the animal and the image acquisition device and the normalization and alignment help to adjust the location of the key points that result from Levels 2a and 2b such that they are determined for an image that is obtained from a defined distance and defined angle according to the location of the key points on the template.

The level-3 layer involves nodes for generating an intermediate ID result for each visible side of the animal in the image that was acquired by using an AI model for each of the visible sides or an AI model that is trained to handle all of the visible sides (similar to what was described for the bounding box AI model) and then combining the intermediate ID results into a final ID prediction which may be verified against the tag (e.g., drop tag or RFID tag as described above) to monitor the accuracy of the final ID prediction. The intermediate ID results can be weighted and combined to generate the final ID result. The intermediate ID result includes an animal ID and a confidence score indicating the level of accuracy for the intermediate ID result. If any of the ID results that are generated have a confidence score indicating that they are not accurate then these intermediate ID results are not combined with the others to determine the final ID prediction, which is also generated with a confidence score. The various confidence scores described herein are provided by applying a SoftMax function to the AI models in the level 4 layer which function as classifiers. In an alternative embodiment, the intermediate ID result that has the highest confidence score can be used as the final ID result.

If the accuracy of the final ID result degrades over time (e.g., the accuracy rate is less than 60%) then one or more of the AI models used in the level-4 layer may be retrained with training data that was more recently obtained. In the example embodiment of FIG. 33, the AI models used in the level-4 layer may be a left section AI ID model, a right section AI ID model, a top section AI ID model, a head centre section AI ID model, a head left section AI ID model, a head right section AI ID model, a back or tail section AI ID model and one or more legs AI ID models.

In the various embodiments described herein, the animal identification and/or assessment results may be stored in a data store associated with a server computer 120s in the site 102. The stored animal identification and/or assessment results may then be uploaded to the computer cloud 120 as needed.

In the various embodiments described herein, the segmentation of each detected animal image may result in a plurality of sections corresponding to the legs of any one animal. However, in at least one embodiment, the segmentation of a detected animal image may not comprise any leg sections such as when an animal is lying down in such a way that the legs are not visible.

Figure 34A:
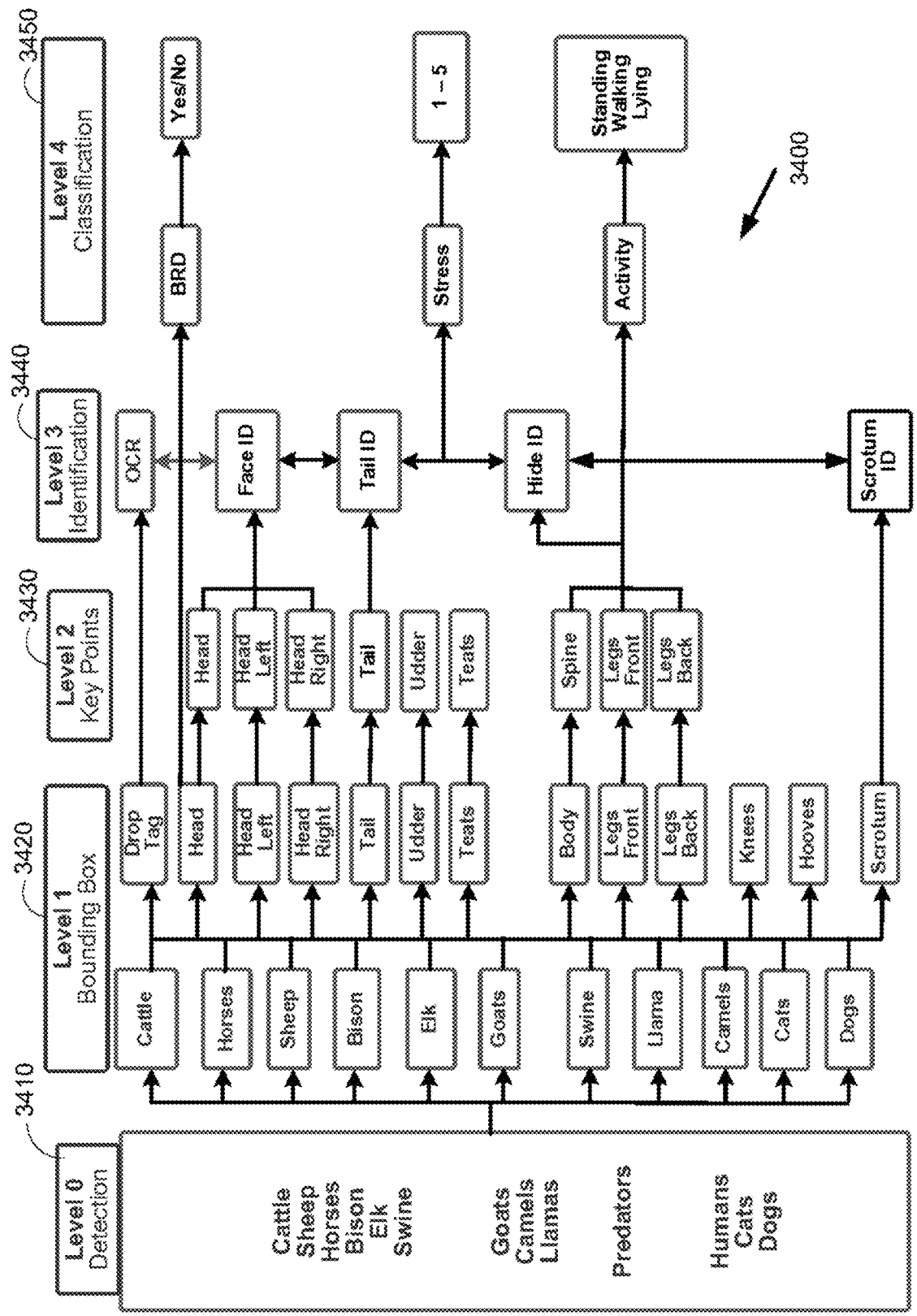
FIG. 34A shows another example embodiment of an AI pipeline that may be used by at least one of the animal identification and assessment systems described herein.

Referring now to FIG. 34A, shown therein is a schematic diagram showing an example embodiment of another AI pipeline 3400 having multiple AI models that may be used by at least one of the animal identification and assessment systems described herein for identifying and/or performing assessments of at least one of the animals at the site 102. The AI models may be implemented as computer-executable instructions or code in the form of software code or firmware code stored in the logic memory 174 which may be executed by one or more processors of the processor module 142. The multiple AI models of the AI pipeline 3400 are generally arranged such that there is a Level 0 Detection layer 3410 having at least one Detection AI model, a Level 1 Bounding Box layer 3420 including one or more Bounding Box AI models, a Level 2 Key Point layer 3430 having one or more key point AI models, a Level 3 Identification layer 3440 having one or more Identification AI models and a Level 4 Classification 3450 layer having one or more Classification AI models. In at least one embodiment, the AI pipeline 3400 may be implemented using DeepStream, which generates annotated video automatically. Plugins can be used to take any output that is in a JSON format and convert it to another format for storage on the cloud.

In at least one embodiment, a Detection AI model in the Level 0 Detection layer 3410 may be used to detect one or more animals in at least one image or at least one video captured by one or more of the imaging devices 108. The one or more imaging devices may be an RGB camera, a thermal camera, a LIDAR camera or an Infrared camera. In at least one embodiment only RGB cameras are used to provide the input images to the level 0 layer of the AI pipeline. Entire images are provided as inputs to the Level 0 Detection layer.

An object detector and a classifier may be used to implement the Detection AI module in order to detect a living thing in the image, generate a bounding box for it and then classify it as being for a particular animal or other living thing to indicate which species of animals are in an image, how many of those animals of each species is in the image and how accurate the detection classification is based on the confidence level. The output of the level 0 layer include bounding box coordinates for each detected animal and the pixels of that bounding box. The detected animals may include, for example, a mammal, including a hoofed animal, including, for example, one or more of a cow, a horse, a sheep, a bison, an elk, a goat, a swine, a llama and a camel. Other detections of living things include any predators, humans, cats or dogs. Examples of predators include cougars, bears or coyotes. Accordingly, the output of the level 0 Detection layer are the bounding boxes with a classification as to whether they correspond to one of the animals listed in the level 1 Bounding Box layer and a confidence score indicating the accuracy of the classification and the location of the bounding box.

In at least one embodiment, a segmentation mask may also be generated for the bounding box. For example, when humans are detected, the human pixels may be blocked out to protect privacy, so those pixels are not recorded or processed further. Accordingly, as part of the Level 0 Logic, before the image is passed onto the AI models of the level 1 layer, the human pixels are blacked out or filled with some other color (or blurred). Training may be done such that some classes have greater emphasis such as humans and predators.

In at least one embodiment, the level 0 Detection AI model includes a backbone and a classifier. Several backbones and classifier approaches can be used. The models for each of these approaches predict a bounding box and, in some cases, a segmentation mask. For example, the NVidia DetectNet_V2 model may be used for bounding box predictions. More information on DetectNet_V2 may be found at an Nvidia website such as https://docs.nvidia.com/metropolis/TLT/tlt-user-guide/text/object_detection/detectnet_v2.html#pre-processing-the-dataset. DetectNet includes a backbone and the DetectNet_V2 model is attached to the backbone. Other examples for the backbone and classifiers may include a V2/DarkNet53 or ResNet (18,34,50) as the backbone and to generate bounding boxes, Efficientnet_b0_relu/Faster_rcnn; Efficientnet_b0_swish/Faster_rcnn or MaskRCNN may be used. For DetectNet and DarkNet, retraining may be done using a process called Transfer Learning. The incoming image data may be pre-processed to scale down it down to 720p. Logic may also be added logic to the count of each detected object type.

The Level 0 Detection AI models can associate a respective bounding box each detected animal, including an animal partially obscured or turned away from the camera.

The Level 1 bounding box layer 3420 receives one or more input images for a certain species of animal as input and then processes the input image(s) using a bounding box AI model for that species to generate as output various sections of the animals in the input image(s) which may include bounding box coordinates for these sections and the pixels within each bounding box. It is preferable to have images of certain sizes that are provided to the bounding box AI models such as 1280×720p, for example, for more standardized and efficient processing. The sections are defined by a bounding box that indicates a location of the detected animal in the image(s), bounding boxes for various sections of the detected animal and confidence scores for each of the bounding boxes indicating the accuracy of the determined bounding boxes. As an example implementation, NVidia's DetectNet_V2 model may be used for the bounding box predictions in the level 1 layer.

Figure 34C:
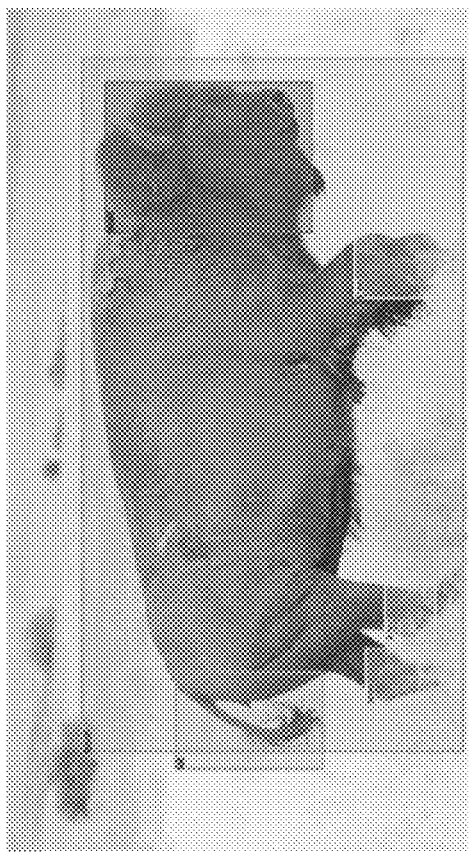
FIGS. 34C and 34D show examples of animal detection and the generation of animal sections performed by the system of FIG. 34A on an image of a bison and an elk, respectively.
Figure 34B:
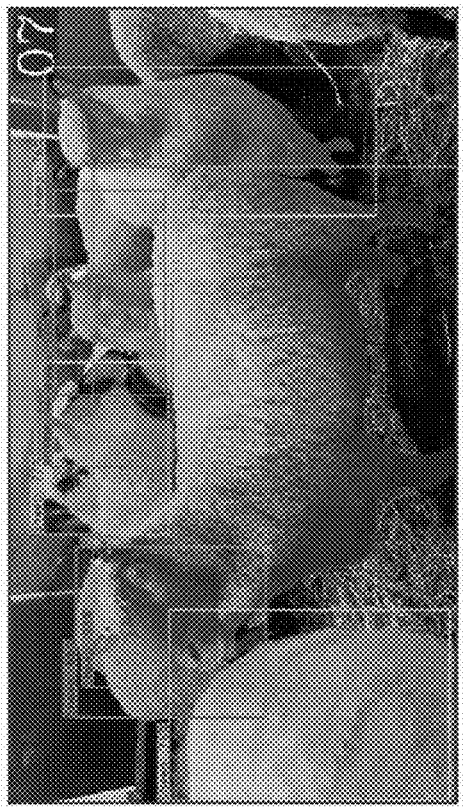
FIG. 34B shows an example of animal detection and identification performed by the system of FIG. 34A on an image of sheep.
Figure 34D:
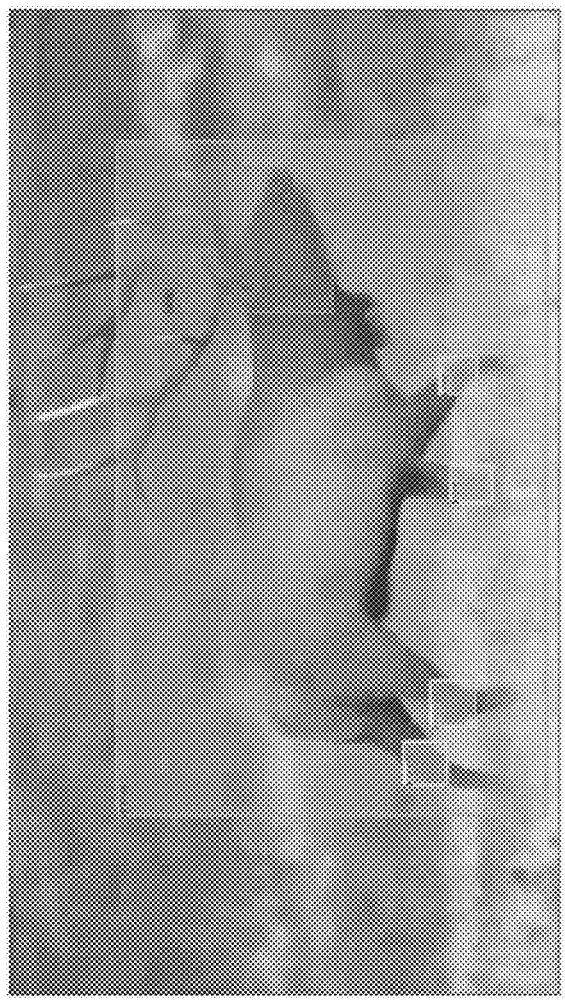

The sections that the bounding boxes are generated for depends on the animal species in the image, the angle the image was taken at and whether the animal is partially occluded in the image. These sections generally include a drop tag section, a head section (i.e., a front head section), a left head section, a right head section, a tail section, an udder section, a teat section, a body section, a front legs section, a back legs section, a knees section, a hooves section and/or a scrotum section. Not every section may be available for an animal in an image since not all of the body parts of the animal may be in the image. Examples of bounding boxes for sheep bison and elk are shown in FIGS. 34B-34D, respectively, with bounding boxes for some sections shown for the bison in FIG. 34C and the elk in FIG. 34D.

As mentioned earlier, once the species is detected in an image from level 0, an AI model in layer 1 looks for the body parts of that species in the image to generate bounding boxes for the sections of that animal in the image. In at least one embodiment, to prevent false positives, layer 1 may be filtered against layer 0 in the AI pipeline which may be done by accepting a section (e.g., a knee) for an animal type only if it is located in a larger bounding box for an entire animal that is the same animal type.

In at least one embodiment, there may be further processing that is performed at the Level 1 Bounding Box layer 3420 to alter the definition of a bounding box. For example, some of the Bounding Box AI models may define the bounding box for each of the front-side head section, the left-side head section and the right-side head section by cropping the head section, scaling the head section and/or adding a margin if the bounding box is not square.

The outputs of the AI models of the level 0 layer and level 1 layer are bounding box coordinates and the pixels of the bounding boxes. When the AI pipeline 3400 is implemented using DeepStream, these pixel values may be fed directly into other AI models that are used in the level 2 and level 3 layers. The bounding box coordinates from the level 0 and level 1 layers may be stored to a database.

The Key Point AI models used in the Level 2 layer 3430 may assign or place key points onto the animal image with each animal section assigned with a different number of key points. In these embodiments, the key points may correspond to important features of the animal such as visibly distinct features including one or more of eyes, ears, nose, mouth, top of head, bottom of head, jaw, hip, lip, neck, or joints as explained earlier. For example, the Key Point AI models may assign up to ten key points (eight of which may be used for reprojection during facial ID) to the front-side head section 400 as shown in FIGS. 10 and 11. The Key Point AI models may use an MMPose AI model to predict the locations of the key points in the various animal sections and generate confidence scores for the determined key points. The output of the level 2 layer AI models include a list of key points, which may be identified by X,Y coordinates, and confidence scores for each determined key point indicating how accurate the locations of determined key points are.

In at least one embodiment, the results generated by an MMPose model may be postprocessed by (a) drawing a bounding box, (b) filtering key point prediction with a confidence score threshold (e.g., 70%) and draw the filtered keying points on the frame image, (c) drawing lines to connect the filtered key points, (d) calculating angles using various combinations of corresponding key points and drawing angles on the frame image, and (e) annotating each image frame with the key points, optionally the links between adjacent key points and optionally the key links. A video output can then be created using the annotated video frames. Alternatively, in at least one embodiment, a DeepPoseKit toolkit or an integrated pose model may be used rather than MMPose.

The Level 3 AI layer 3440 includes Identification AI models for uniquely identifying certain sections of the animal 104 based on the key point assigned by the Key Point AI models. The Input to the AI models in the Level 3 layer 3440 are pixel values for key points, pixels from the bounding box for OCR, or pixel values for keypoints for visual identification. The output of the AI models in the Level 3 layer 3440 is an animal ID represented as a string of text and a confidence score.

Some of the identification AI models used in the Level 3 layer 3440 may employ a Siamese Network. The locations of at least some of the key points in the animal sections that are analyzed in Level 3 may also be transformed since they are generated independently from similar sections of other animal in the same species, and therefore the key points may then be linked and aligned using a normalization or alignment method for correcting distortions introduced by different viewing angles and/or distances between the object (i.e., the animal) and the imaging device 108 that captures the image.

The Identification AI models may generate an embedding in a higher-dimensional space for each section that is provided to them. For example, the Identification AI models may generate embeddings for each of the sections that are analyzed at level 3 which include the face section, the tail section, the hide section and the scrotum section. In this case, the face section that is processed may be a combination of the front head, head left and head right sections depending on the angle of the image acquisition device to the animal during image acquisition. The number of dimensions of each embedding may vary from 100 to 1000 and may preferably be 128 or 512. The Level 3 Identification AI models may further include a neural network configured to combine the embeddings for generating an identification of the detected animal with a confidence score.

As shown in FIG. 34A, the FACE ID model 3440 may generate an animal ID result based on facial recognition using key points assigned to one or more of a front-side head section, a left-side head section and a right-side head section of a detected animal. For example, the level 1 layer provides at least one bounding box for the head, e.g., a left, right and/or front head bounding box. The corresponding key points are predicted for the left, right and/or front head sections. The identification AI model can then process each the available key points and head sections to determine an animal ID based on the animal's face.

The FACE ID model uses the pixel values for the pixels in the head sections to perform animal identification. However, the head sections are pre-processed such that the head section may be cropped and filled so that it is a standard size, such as 256×256 pixels, for example. The key points are located on the head section, and then a certain number of them are projected into a different plane so that all animals have more or less the same proportions and location (e.g., the eyes, nose and mouth are generally in the same place). This is also done to the head left and head right sections. The projected values for these three head sections are then provided to the Face ID model.

Figure 34E:
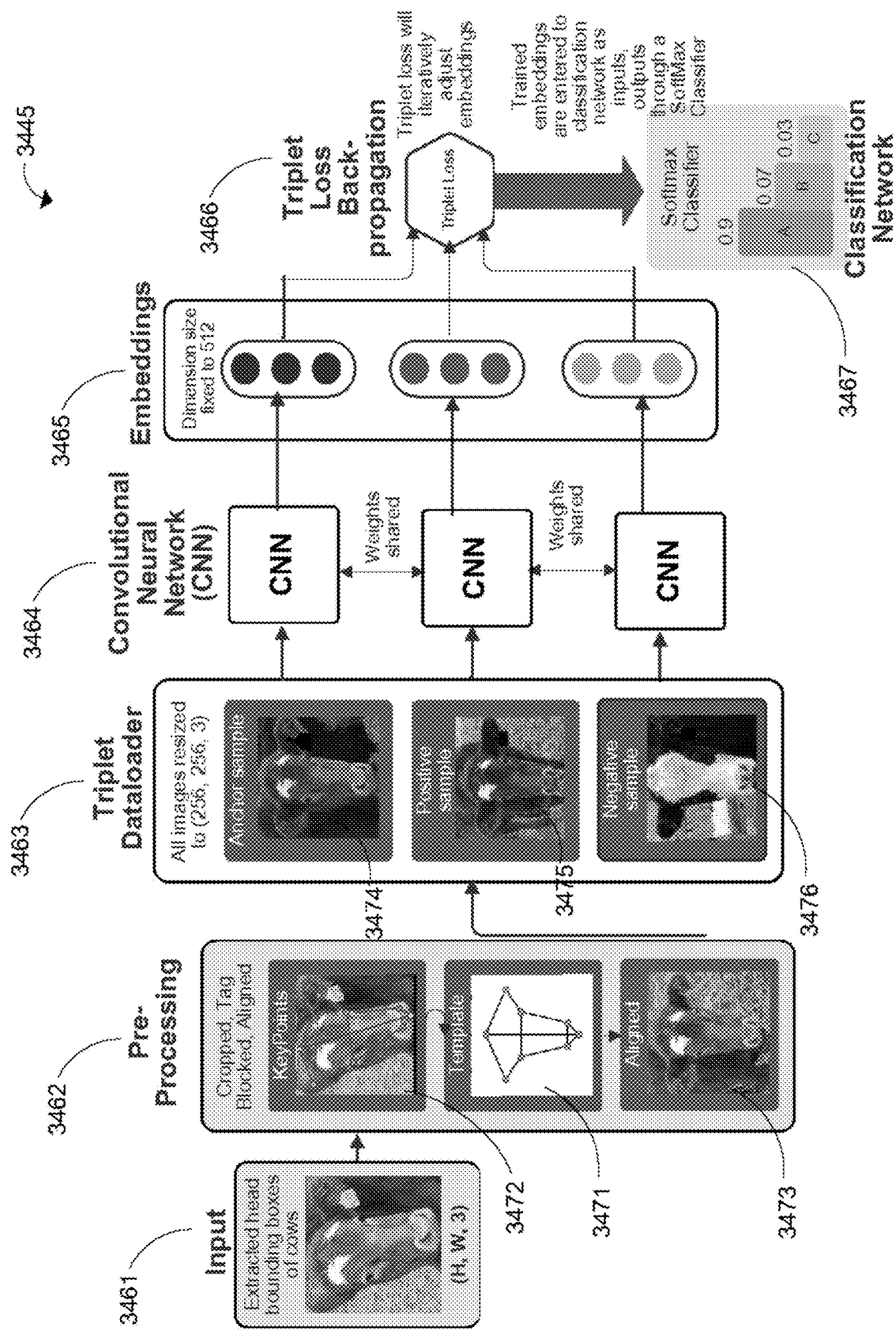
FIG. 34E shows an example embodiment of an architecture for a Face ID AI model that can be used for animal identification and uses a Triplet Siamese neural network.

Referring now to FIG. 34E shown therein is a diagram of an example embodiment of an architecture for a Face ID model 3445 that uses a Triplet Siamese neural network. For example, the Face ID model may comprise a Siamese Network and a concatenated classification network. The Siamese Network is trained using a triplet loss training method. In a triplet loss method, the Siamese Network is trained to generate embeddings using an anchor image, a positive image and a negative image. An embedding is a vector of numbers, ranging to 128 to 1024 in size, depending on the body part. Training may be done in two parts, where first the Siamese network is primed and trained to generate embeddings, and then second the Siamese Network model is frozen.

A classifier network is then attached to the back end of embedding prediction as a Fully Connected Network. The input are the embeddings to the classifier. The output of this network is the ID classification, with confidence scores determined using SoftMax. Once the Triplet Siamese Network is fully trained, any image can be converted into an embedding that is unique, and these converted embeddings are used as input to train the classification network based on cross entropy loss and softmax function. Because these embeddings are feature-dense vectors with high dimensionality, more robust classification can be made. During training, the classifier network is trained to take the embeddings and predict an ID, while the embedding network remains frozen in this second training process.

It should be noted that in at least one embodiment, the Face AI ID model may be updated with new face samples once the confidence scores that are generated in use begin to deteriorate and are lower than an acceptable level, like 60% for example.

During operation, the Face ID model 3445 receives as input 3461 pixels from bounding box of one head section of an animal and pixel values for key points assigned to the head section. Since up to three head sections may be used for Face ID, three separate Triplet Loss Networks can be trained for each head section and the results may later be merged. The remainder of the description of the Face ID model 3445 will be with respect to operating on pixel values for one head section.

The input 3461 may comprise pixels from bounding boxes corresponding to different sizes and poses of an animal's head. For example, the size of an animal head included in an image may vary based on the distance between the object (head of the animal) and the imaging device and/or based on the size of the animal itself. The pose of the animal head in the image may also vary based on the viewing angle corresponding to the object and imaging device.

Accordingly, the Face ID model 3445 employs preprocessing 3462 to normalize the input 3461 and reduce variation caused by differences in size and pose. As a preprocessing step, feature based image alignment may be used to spatially normalize an extracted head section to minimize variation. Accordingly, the preprocessing 3462 may include a template 3471 that is used to normalize and align the pixels corresponding to the animal's head. For example, the key points assigned key to the head of the animal in the image 3472 are matched to the template 3471 to generate the normalized image 3473. In some embodiments, any pixels corresponding to visible drop-tags may be masked to black pixels based on the drop-tag's location. This may prevent the Face ID model 3445 from focusing on the drop-tags instead of other larger or distinctive facial features.

The normalized images and ground truth labels are then passed into triplet data loader 3463, in which they are cropped into standard size images (e.g., 256×256) and then grouped into tuples of anchor, positive, and negative images. An anchor represents an image sample taken from a dataset. If the anchor sample is defined to belong to an arbitrary class "A", then a positive image is another image that also belongs to class A and the negative image is an image that belongs to completely different class. The purpose of a Triplet Siamese Network is to learn feature similarity between images that have been extracted using a Convolutional Neural Network (CNN) 3464 and to express these learned features into an embedding space minimizing the Triplet Loss.

The CNN 3464 generates embeddings 3465 based on normalized images received from the preprocessing 3462. As previously described, the CNN 3464 is trained to minimize the Triplet loss by iteratively adjusting generated embeddings 3465 to reduce distance between images belonging to the same class and to increase distance between images belonging to different classes which means mapping images that belong to the same class in a closer region in the embedding space and mapping images that belong to different classes further away.

The embeddings 3465 generated by the trained CNN 3464 are then be provided as input to the classification network 3467. Using feature-dense vectors with high dimensionality (embeddings 3465) may provide an advantage of robust classifications generated by the classification network 3467. The output of the classification network 3467 is then provided through a SoftMax Classifier which provides an output that includes a string text corresponding to an identification for the detected animal and a corresponding confidence score.

Figure 34F:
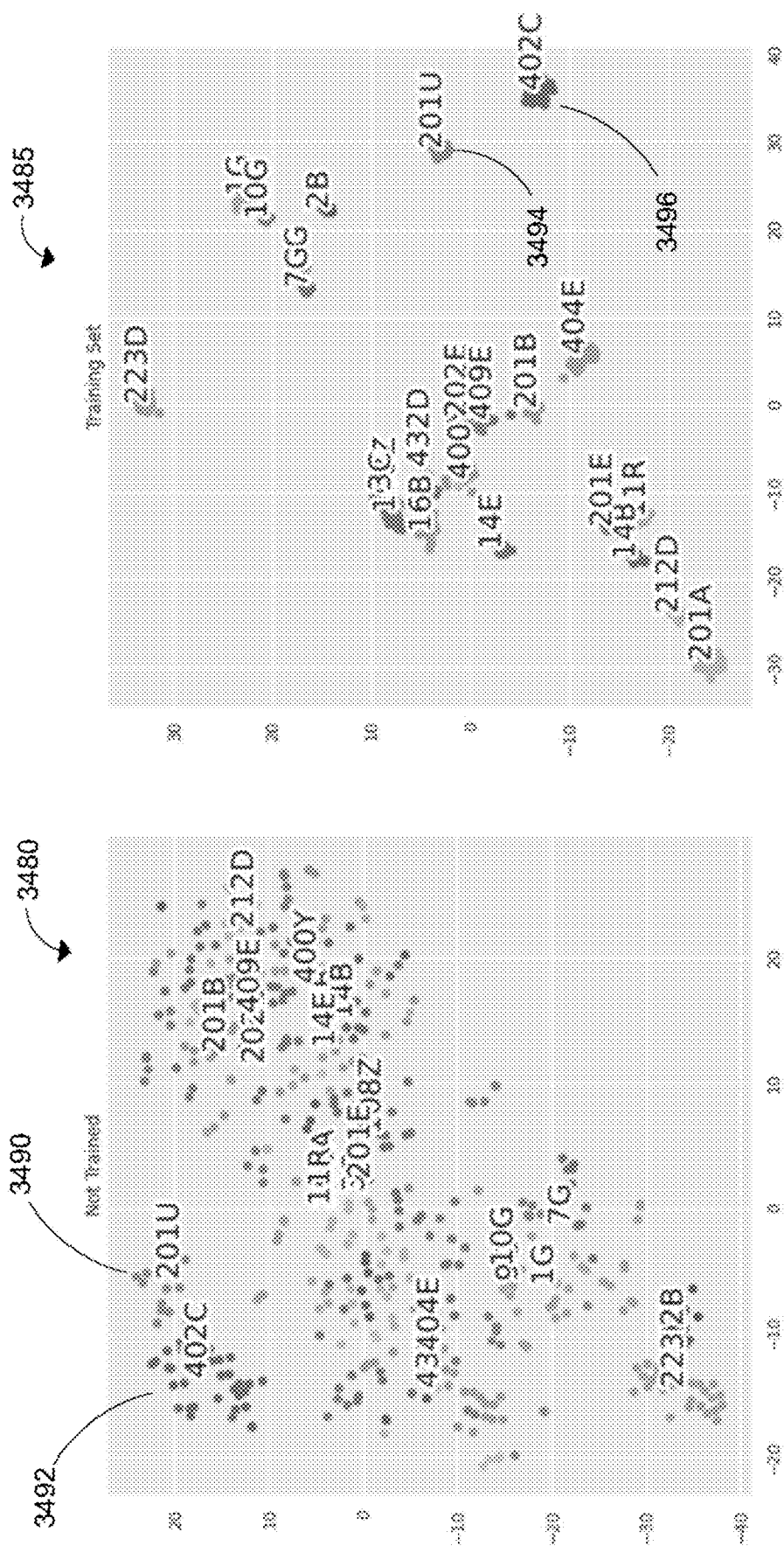
FIG. 34F shows example graphs illustrating embeddings generated with training in accordance with the teachings herein (right hand side) and without training (left hand side).

Referring now to FIG. 34F, shown therein are example graphs 3480 and 3485 illustrating embeddings generated under different conditions: untrained and trained Face ID embedding. The graphs are generated using a t-distributed stochastic neighbor embedding (TSNE) technique and are two-dimensional projections of 512-dimensional embeddings. The graph 3480 represents embeddings that may be generated for head sections by an untrained Siamese Network. The distance between some embeddings 3490 and 3492 corresponding to two different animals (201U and 402C) in this case may be closer than some embeddings corresponding to the same animal. However, the Face ID model that has been trained groups together the IDs when projected to a 2D space (this is a 512 dimensional space plotted in 2D) since the Face ID model is able to group together things that are alike, and push things apart that are not similar. The graph 3485 represents embeddings that may be generated for head sections by a Siamese Network after training. The generated embeddings 3494 and 3496 that correspond to the same animal (201U or 402C) are clustered together and pushed apart from embeddings corresponding to different animals.

In at least one embodiment, when the head sections are being preprocessed for training purposes, the drop tag is masked out so that the AI models that are used for facial identification can focus on actual physical features of the animal's head. For example, at this stage the bounding box coordinates of the drop tag from the Drop Tag AI model of the level 1 layer may be used to overlay another black pixel image that has the size exactly the same as the size of the drop tag bounding box to mask it out.

Referring now to FIGS. 35A-35E, shown therein examples of facial identification and heat maps that are generated for different breeds of cattle by at least one embodiment of the animal identification and assessment systems described herein. The heatmap (also known as activation map) uses areas of different color with red (the most intense area) showing why the animal is unique compared to other animals. The heatmaps shown in FIGS. 35A-35E indicate that cows have facial characteristics which are unique and this is the premise behind the use of the Face ID AI model to generate unique identifications for different animals. These heatmaps also allow for a rancher to determine what makes an animal unique visually, and it can help them track lineage as animals will conserve characteristics between generations. It also helps a rancher understand what makes each animal unique.

Figure 35B:
Figure 35C:
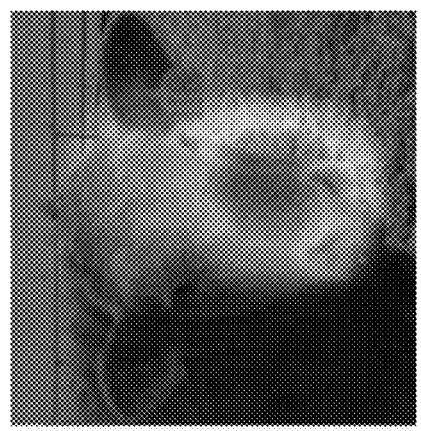
Figure 35A:
Figure 35A:
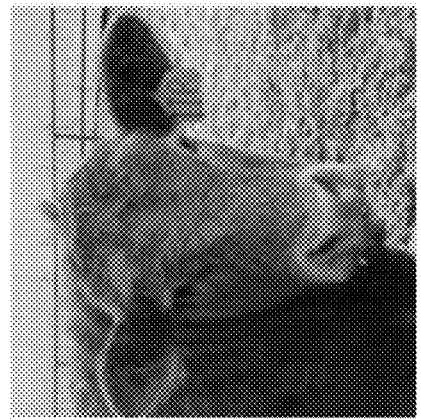
Figure 35A:
Figure 35F:
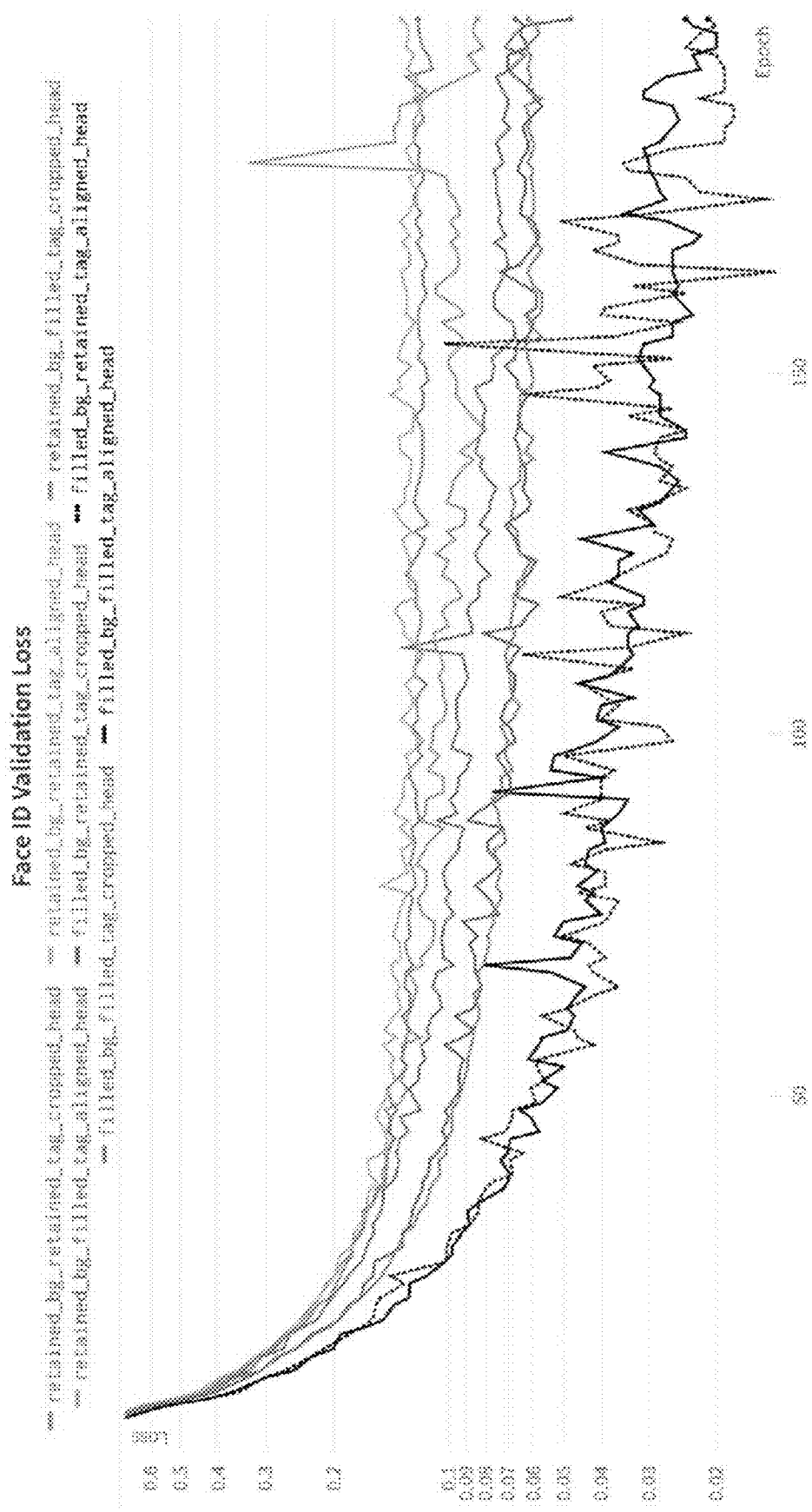
FIGS. 35F and 35G are examples of graphs showing validation loss (FIG. 35F) and validation accuracy (FIG. 35G), respectively, for various AI models used for facial recognition on images of cattle.
Figure 35G:
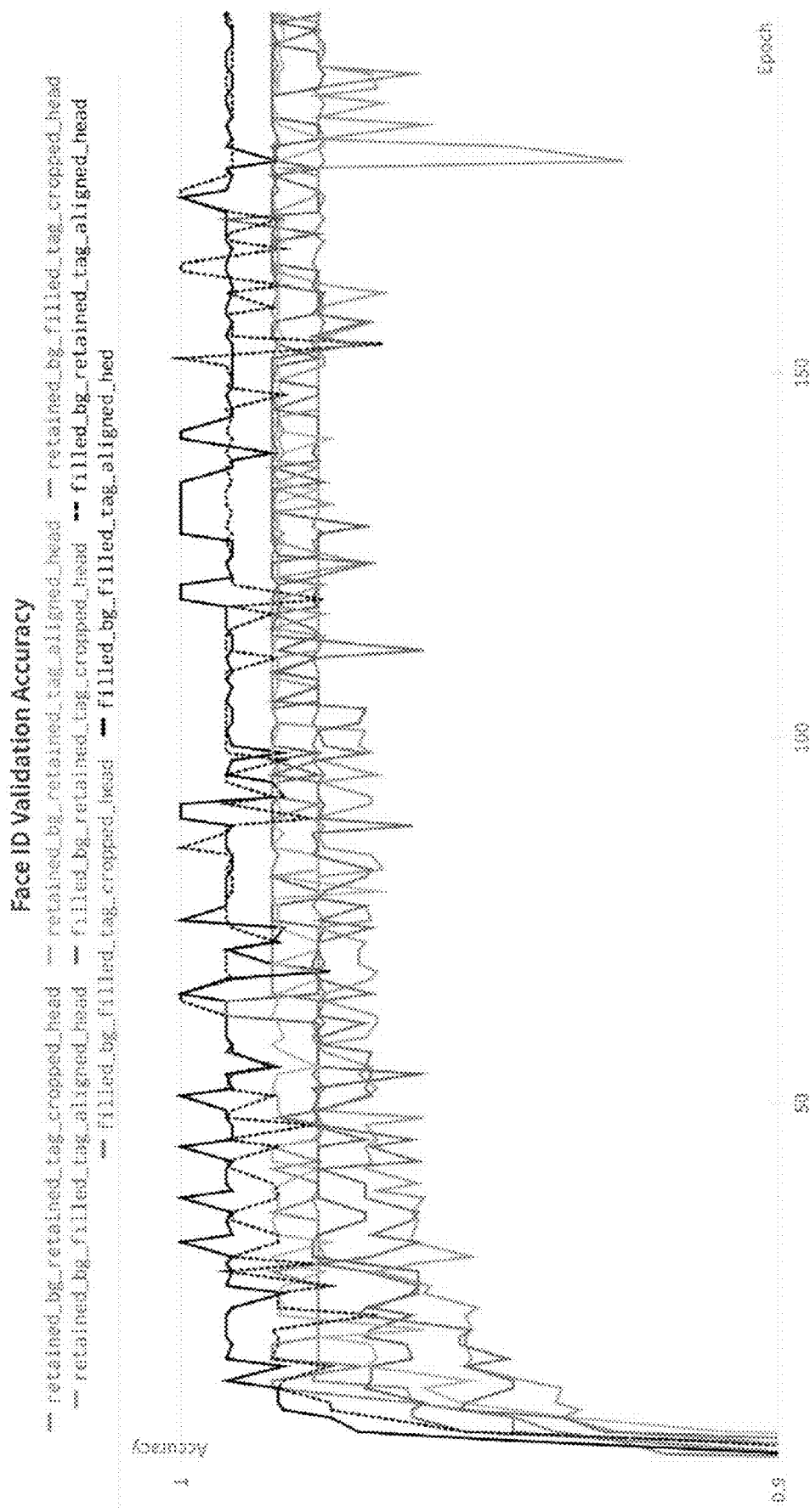

FIGS. 35F and 35G are example graphs showing validation loss and validation accuracy respectively for various implementations used for the FACE ID model. The training set that was used may be split about 70% for training, 20% for validation and 10% for testing. For the example model, the validation loss and validation accuracy depends on the processing performed for the corresponding front head sections, left-side head sections and right-side head sections. The difference in preprocessing amounts to various combinations of whether the background was retained ("bg_retained"), the background was filled ("bg_filled"), the animal's head was cropped ("cropped_head"), the drop tap was retained ("retained tag"), the head was aligned ("aligned_head") or the tag was filled ("tag filled") as part of the preprocessing for the image when performing identification using the Face ID model. The tags referred to here are the drop tags attached to the ear of the animals being identified.

As can be seen from FIG. 35G, the preprocessing that (1) included a filled background, a retained tag and an aligned head or (2) included a filled background, a filled tag and an aligned head had the best validation accuracy when comparing the identification of the Face ID model using this image preprocessing with the ground truth. As can be seen from FIG. 35F, these same two types of preprocessing also had the least amount of validation loss showing that they resulted in the best performance for animal identification out of the various image preprocessing schemes that were tested.

TABLE 1 lists the example validation accuracy for using different AI models for the Face ID model based on the different image preprocessing schemes that were used. From the results it can be seen that the validation accuracy improves when the background is filled, the tags are filled or retained, and whether the head sections are aligned.

TABLE 1

VALIDATION ACCURACY FOR FACE ID MODEL USING DIFFERENT PREPROCESSING SCHEMES

| Model | Background | Drop-Tags | Head | Best Validation Accuracy |
|---|---|---|---|---|
| M1 | Filled | Filled | Aligned | 100% |
| M2 | Filled | Filled | Cropped | 98.43% |
| M3 | Filled | Retained | Aligned | 100% |
| M4 | Filled | Retained | Cropped | 99.20% |
| M5 | Retained | Filled | Aligned | 98.43% |
| M6 | Retained | Filled | Cropped | 97.60% |
| M7 | Retained | Retained | Aligned | 98.34% |
| M8 | Retained | Retained | Cropped | 98.43% |

Figure 35H:
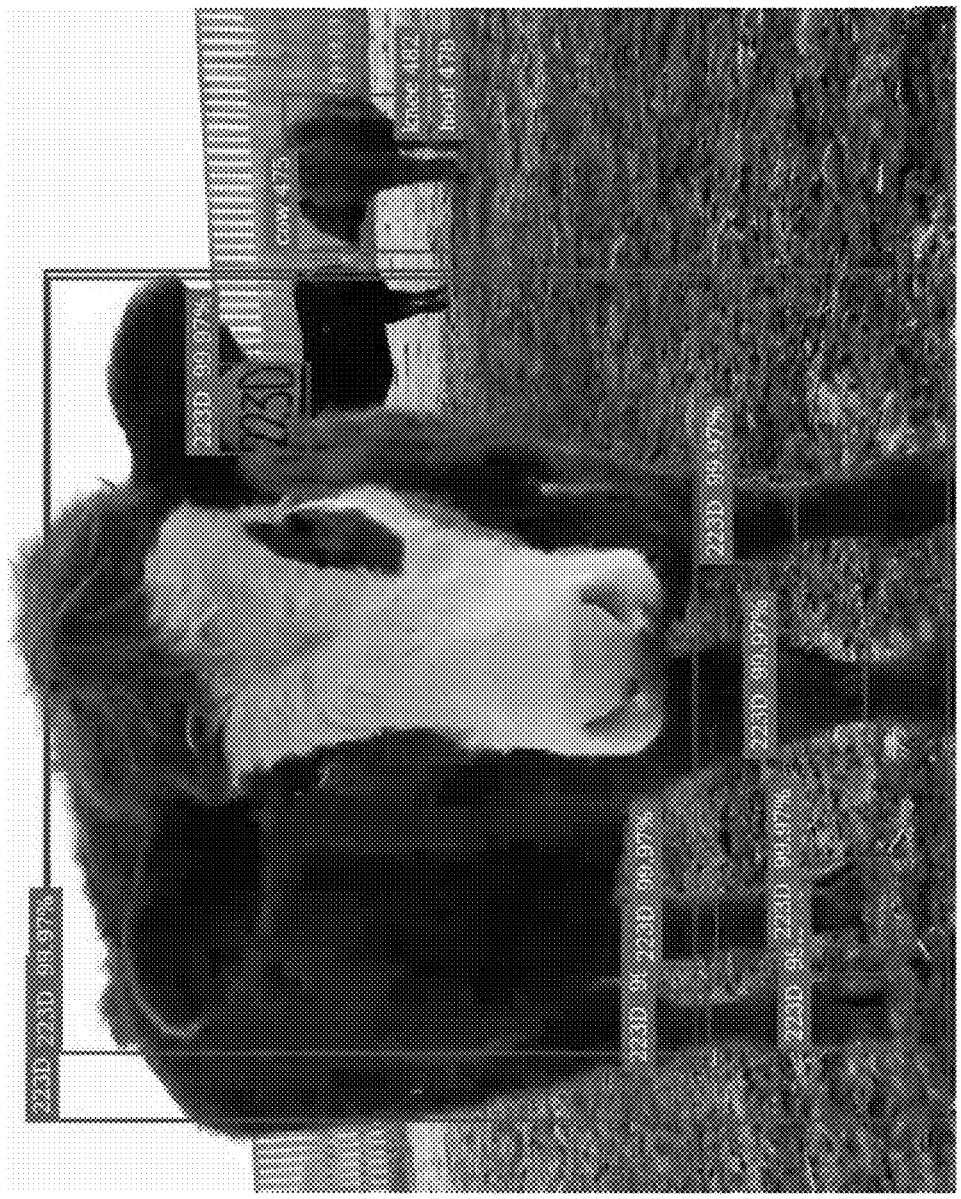
FIG. 35H shows an example image of a cow where the animal ID has also been applied to the limbs to provide limb ID.

Referring now to FIG. 35H, shown therein is an example image of a cow where the animal ID has also been applied to the limbs to provide limb ID for various one or more smaller animal sections like hooves, for example, and/or one or more angles. For example, the knee and hoof sections of the animal in FIG. 35H are shown with the animal ID that was obtained the DropTag OCR reading with a 99.97% confidence score. Alternatively, the ID determined by the Face ID AI model may be used. Alternatively, if more than one ID is available then the one with the highest confidence score may be used.

In at least one embodiment, the Level 3 Identification AI models 3440 may generate identifications based on one or more body parts in addition to the head sections such as a tail identification based on key points assigned to a tail section of a detected animal, a scrotum identification based on key points assigned to a scrotum section of a detected animal and/or a hide identification based on key points assigned to one or more of a top body section, a left-side body section and a right-side body section of the animal. The scrotum section identification may be performed in a similar manner as for the face ID.

The tail identification and the hide identification may be used when the animal in the image is turned away from the camera and its tail and/or hide is shown in the acquired image but not its head sections. The processing steps employed by the Tail ID model and the Hide ID model are similar to the Face ID model, and images of the Hide or tail sections are run through a triplet loss Siamese network to create an embedding. However, there are a few differences.

For example, in at least one embodiment, the Tail ID model may be used when the tail is pointed down, using key points of the tail, such as five key points, to determine when this is the case. The key points of the tail may then be normalized and aligned to a template, similar to how the face ID model operates.

As another example, in at least one embodiment, when the Hide ID model is used the key points of the spine section are normalized and aligned to a template. In this case, the legs and spine key points define a bounding box for the animal's Hide section.

In at least one embodiment, whenever an ID model is applied to an animal's section, a predicted ID as well as a confidence score is obtained. This applies to the drop tag OCR model, the Face ID model, Tail ID model or the Hide ID model.

In at least one embodiment, the ID is tracked between video frames by tracking the bounding box between frames using a tracker as described previously. Accordingly, as long as a lock is maintained on the bounding box in frames where it is not possible to use one of the Identification models, the ID of the bounding box is known and may be displayed in annotated images or videos.

In at least one embodiment, when more than one ID is available for a bounding box in a current image or video frame, either by applying one or more of the identification models to the image or by tracking the bounding box over frames, the multiple ID predictions may be used in several ways.

Firstly, in at least one embodiment, validation may be performed by checking that the IDs obtained from the various bounding boxes (e.g., head sections, tail section, and/or hide section) match one another and logging the identifications and confidence scores for each of the bounding boxes to verify that the various ID models are working. This may be done for quality control and may be used to indicate when certain ID models need to be retrained if their confidence scores drop over time such that the results are not acceptable.

Secondly, in at least one embodiment, the prediction of the ID of the bounding box that surrounds the animal can be predicted by taking ID with the highest confidence score or by using a weighted combination of the determined ID's.

Thirdly, in at least one embodiment, limb tracking can be performed, as described previously, where once the identification is known for the animal bounding box ID (i.e., the bounding box that surrounds an animal), all internal bounding boxes for the animal sections, which may also be called child bounding boxes, may be assigned the same ID. For example, when an ID is determined for a cow bounding boxes, the same ID may be applied to all child bounding boxes, such as knees, hooves, udders, teats, etc.

In at least one embodiment, the Level 3 Identification AI models 3440 may include an OCR AI model to perform OCR on a drop-tag section. The animal identification based on applying the OCR AI model to the drop-tag section may then be compared with one or more of the face identification, the tail identification, the scrotum identification and the hide identification and the results of the comparison may be used to train the Level 3 Identification AI models 3440.

The Level 4 Classification AI models 3450 may be configured to generate one or more animal assessments based on input from pixel values from the input image and/or the key points assigned by one or more of the Level 2 Key Point AI models 3430. The image pixels may be for one or more bounding boxes and the key points in the bounding boxes. The output from one of the Classification models of layer 4 may be a YES or NO result when looking for specific behaviours, characteristics, or activities for the animal that is being assessed. For example, in FIG. 34 there is a BRD AI model, which may be implemented as discussed previously, that provides a YES or NO answer for whether the animal being assessed has BRD. Alternatively, the output of one of the Classification models may be a score for assessing the severity or a condition or situation that is being experienced by the animal that is being assessed such as its level of stress (as shown in FIG. 34A) or how lame it might be, which may be determined as discussed previously.

Figure 36:
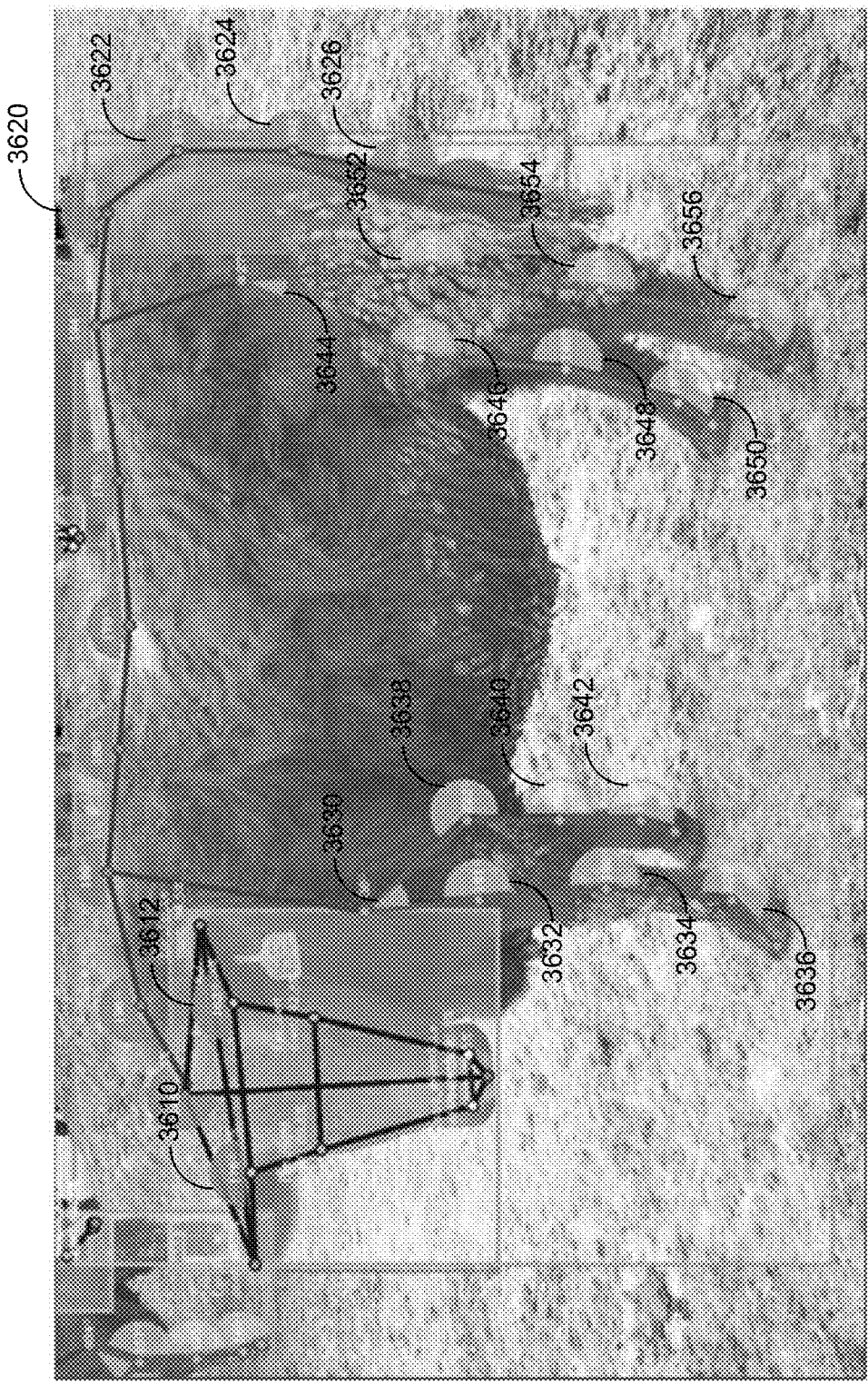
FIG. 36 shows an example image of a cow with key points, along with links therebetween and angles between the links shown.

For example, in at least one embodiment, the Level 4 Classification AI models 3450 may generate an animal stress assessment based on the angles 3610 and 3612 of certain body parts of the animal being assessed. For example, as shown in FIG. 36, the angles may correspond to adjacent links between the certain key points corresponding to a feature of a detected animal such as one or more of its ears.

As another example, in at least one embodiment, the Level 4 Classification AI models 3450 may also base the animal stress assessment on the angles 3620 to 3626 corresponding to the links between the key points corresponding to the tail feature of a detected animal.

Alternatively, in at least one embodiment, the Level 4 Classification AI models 3450 may determine the activity of a detected animal (e.g., standing, lying down, etc.) based on the angles 3630 to 3652 (e.g., see FIG. 6) corresponding to the links between the key points corresponding to the leg features of a detected animal on a frame-by-frame basis.

In at least one embodiment, the models employed to generate various bounding boxes in layers 0 and 1 of the AI pipeline 3400 are able to do so for animal sections without employing masking since the models that are used for predicting key points, OCR, the IDs, or layer 4 classification are robust enough to ignore non-animal (background) pixels. Also, segmentation may not be needed as the bounding boxes that are generated are sufficient to be animal sections.

In at least one embodiment, in general, if a confidence score is too low, the item that it corresponds to (e.g., bounding boxes, key points, ID) is not used for further computations in the AI pipeline. However, this item and the confidence level is logged for historical reference so scores may be assessed for quality control. The next image may then be processed to determine if this same item has a higher confidence score so that it can be used. As a guideline, for bounding box classification, the confidence threshold for the Face ID model may be set at about 90%, while for Key Points a threshold can be set typically lower such as 70% as the determination for key points tend to be a noisier process.

Figure 37:
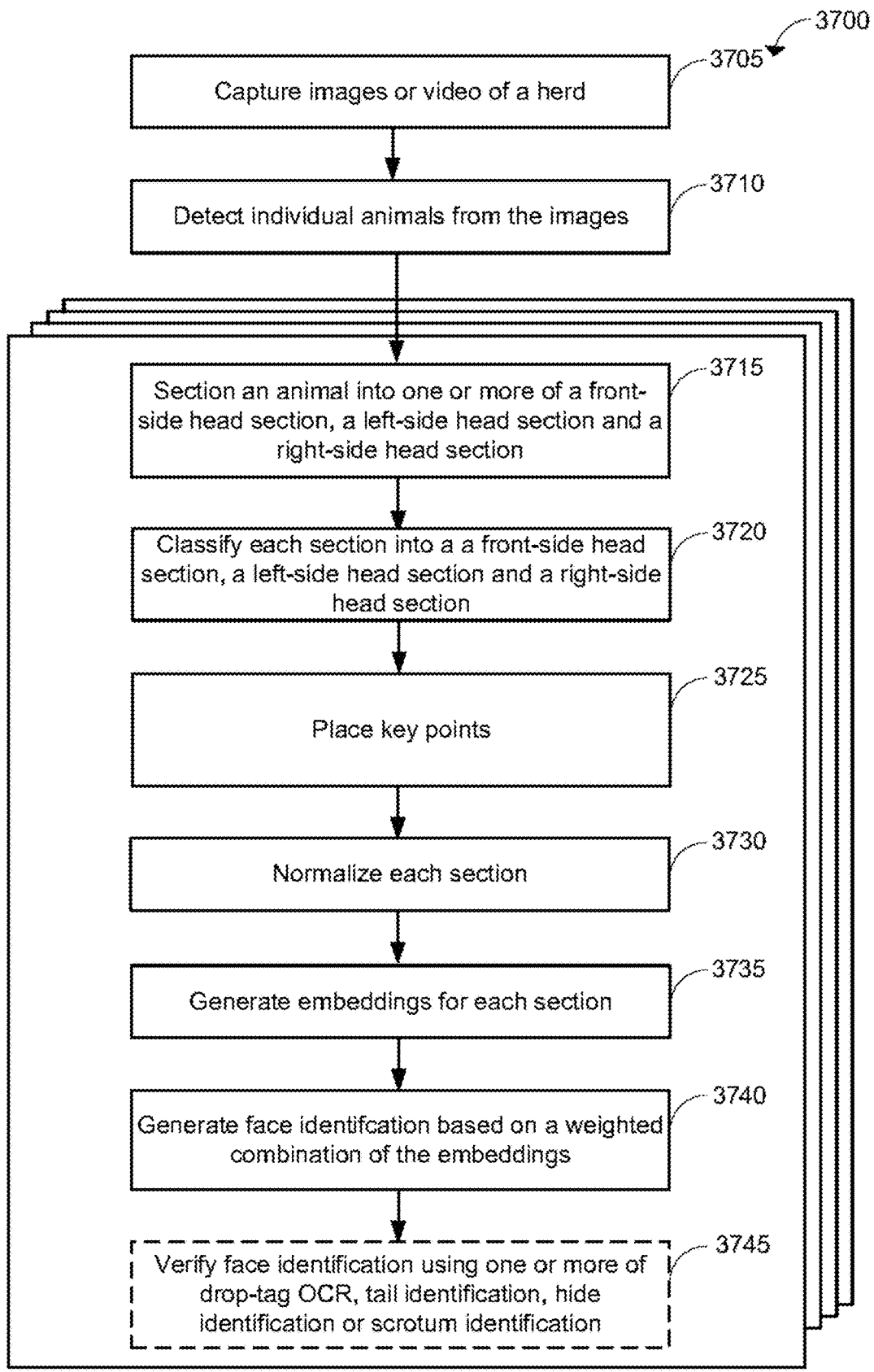
FIG. 37 shows a flowchart of another example embodiment of an animal identification process executed by at least one embodiment of the animal identification and assessment system described herein using some of the AI models of the AI pipeline of FIG. 34A.

Referring now to FIG. 37, shown therein is a flowchart showing an example embodiment of an animal identification process 3700 executed by one or more server programs (e.g., server program 164) executing on one or more processors of an animal identification and assessment system that uses some of the AI models of the AI pipeline 3400 for performing identification of one or more animals.

The process 3700 may start automatically (e.g., periodically), manually under a user's command, or when one or more imaging devices 108 send a request to the server program 164 for transmitting captured (and encoded) images. After the process 3700 starts, the server program 164 commands the imaging devices 108 to capture images or video clips of a herd at the site 102 from various viewing angles such as front, side, top, rear, and the like, and starts to receive the captured images or video clips from the imaging devices 108 (step 3705). The images may be captured from any angle relative to one or more animals and over various distances.

At step 3710, the server program 164 uses an AI model (e.g., the Detection model at the Level 0 layer 3410) to detect and define a bounding box for one or more animals in images or videos captured by imaging devices 108. The detected animals may include one or more of a cow, a horse, a sheep, a bison, an elk, a goat, a swine, a llama and a camel, for example. The bounding box indicates a location of the detected animal in the captured image or video. Each detected animal is then identified through steps 3715 to 3745 (i.e., steps 3715 to 3745 are repeatedly executed for all detected animals).

At step 3715, the server program 164 processes a portion of the image containing an animal, by using an AI model (e.g., a Bounding Box AI model for the animal type) into a plurality of sections defined by a plurality of bounding boxes. Depending on the angle at which the image was taken and the animal occlusion situation, the animal image is partitioned into one or more sections such as is listed in level 1 of the AI pipeline 3400. Such sections include, but are not limited to, a front-side head section, a left-side head section, a right-side head section, a tail section, a spine section, a legs front section and a legs back section. In defining the bounding box, the Bounding Box AI model may crop and scale the sections as described previously. Further, the Bounding Box AI model may add a margin to make the bounding boxes square in shape. In at least one embodiment, the sectioned animal images may be completely separated from the background and the background may be removed by using a mask algorithm.

For simplicity of illustration, the rest of the process 3700 will be described with respect to performing the ID using the head sections.

At step 3720, the server program 164 classifies each of the head section into one of a front-side head section, a left-side head section, a right-side head section.

At step 3725, the server program 164 assigns key points to each of the determined head sections by using an AI model (e.g., the Level 2 Key Point AI models). The key points may correspond to important features of the animal face such as visibly distinct features including one or more of eyes, ears, nose, mouth, top of head, bottom of head, jaw, or lip.

At step 3730, the server program 164 may normalize and align each of the head sections for correcting distortions introduced by different viewing angles and/or distances between the animal and the imaging device 108 that captures the image. For example, the animal identification and assessment system 100 may define a plurality of standard viewing angles for each of the front-side head view, left-side head view and right-side head view. When an image is captured by an imaging device that is at a viewing angle offset from the standard viewing angle of the particular view, the server program 164 may apply a calculated distortion to the animal image to normalize it to the standard viewing angle. Moreover, the server program 164 may also scale the animal image to normalize it to a size corresponding to a standard distance between the imaging device and the animal.

At step 3735, the server program 164 generates embeddings for each section using an AI model (e.g., the Level 3 Identification AI models). Each normalized head section is given an embedding in a higher-dimensional space. The Level 3 Identification AI models may include a Siamese Network trained using a triplet loss method to generate the embeddings, as was described previously in relation to FIG. 34E.

At step 3740, the server program 164 may generate a face identification of the animal using a neural network to perform a weighted combination of the embeddings and obtain a single prediction of the animal identification (ID) with a confidence score.

In at least one embodiment, the process 3700 may further include step 3745. At step 3745, server program 164 may verify the generated face identification with other identifications that may have been generated for the animal. For example, the server program 164 may have also generated one or more of a drop-tag OCR, a tail identification, a hide identification and/or a scrotum identification with their own corresponding confidence scores. The server program 164 may generate an aggregate confidence score for the predicted animal identification based on a weighting of the corresponding confidence scores of one or more of the face identification, drop-tag OCR, a tail identification, a hide identification and/or a scrotum identification. Alternatively, the final animal identification may be the ID with the highest confidence score.

The generated animal identification results, including the predicted animal ID, the confidence score thereof, and the verification results may be stored in the computer cloud 110 and may be used for further processing, e.g., in performing animal assessments. The stored confidence scores and verification results may also be used in determining when one or more of the AI models needs to be retrained. In at least one embodiment, the AI models may be retrained when the confidence score of a predicted animal identification decreases to a level below a predefined cut-off threshold. In at least one embodiment, the AI models may be retrained based on a frequency of mismatch between the generated animal identification and ground truth (e.g., drop-tag OCR) results.

Figure 38:
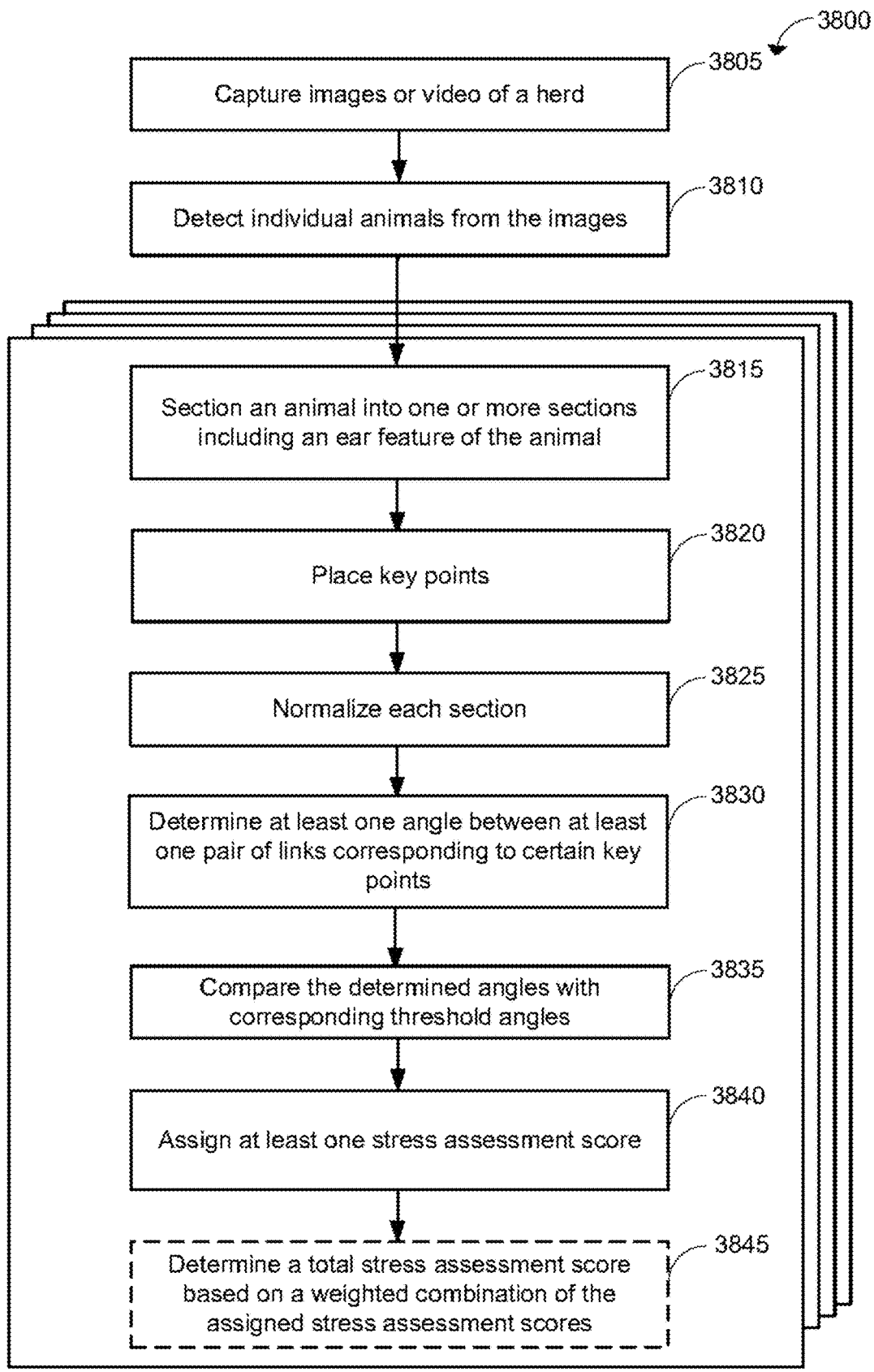
FIG. 38 shows a flowchart of an example embodiment of an animal stress assessment process executed by at least one embodiment of the animal identification and assessment systems described herein using some of the AI models of the AI pipeline of FIG. 34A for determining stress for at least one animal of the site.

Referring now to FIG. 38, shown therein is a flowchart showing an example embodiment of an animal stress assessment process 3800 executed one or more processors of an animal identification and assessment system using some of the AI models of the AI pipeline 3400, for performing stress assessment of at least one animal at the site.

In various embodiments, the steps 3805 and 3810 may function in the same manner as was described for steps 3705 and 3710 of process 3700. Stress assessments for each detected animal is then conducted through steps 3815 to 3845 (i.e., steps 3815 to 3845 are repeatedly executed for all detected animals).

At step 3815, the server program 164 segments or partitions the animal image, by using an AI model (e.g., Level 1 Bounding Box AI models 3420) into a plurality of sections that include sections used for identification as described herein as well as one or more sections that include a physical aspect of the detected animal that is being used in the stress assessment such as an ear or tail feature of the detected animal. For example, the plurality of sections may include a front-side head section and a tail section.

At step 3820, the server program 164 assigns key points to each of the sections by using an AI model (e.g., the Level 2 Key Point AI models). For head sections, the key points may include key points corresponding to the ear features of the detected animal. For tail sections, the key points may include key points corresponding to the tail feature of the detected animal. The ear and tail features are selected since an animal may exhibit certain movements in their ears and/or tail when they are stressed. Other key points may be generated for identifying the animal as explained previously.

At step 3825, the server program 164 may normalize and align each of the sections for correcting distortions introduced by different viewing angles and/or distances between the animal and the imaging device 108 that captures the image in a similar fashion as was described for step 3730 where different animal sections may use different templates for normalization.

At step 3830, the server program 164 may determine one or more angles between one or more pairs of links corresponding to certain key points that are associated with the physical features of the animal that are being used in performing the stress assessment on the animal. In at least one embodiment, the server program 164 may determine the angles 3610 and 3612 shown in FIG. 36 for a normalized front-side head section. In at least one embodiment, the server program 164 may determine the angles 3620, 3622, 3624 and 3626 shown in FIG. 36 for a normalized tail section.

At step 3835, the server program 164 may compare the determined angles with one or more corresponding threshold angles. For example, the server program 164 may compare the determined angles 3610 and 3612 with a threshold angle that indicates the ears are drooping.

At step 3840, the server program 164 may assign one or more stress assessment scores based on the comparison results from step 3835. For example, the server program 164 may assign a first stress assessment score based on a comparison of the determined angles 3610 and 3612 with a first threshold angle. The server program 164 may also assign a second stress assessment score based on a comparison of the determined angles 3620, 3622, 3624 and 3626 with a second threshold angle.

At step 3845, the server program 164 may determine a total stress assessment score for the detected animal based on a weighted combination of the assigned stress assessment scores from step 3840. The total stress assessment score may be stored in the computer cloud 110 and may be used for further processing. As described above, a user 114A may use a client computing device 116 such as a smartphone to query the server computer 120 and obtain the stored information of one or more identified animals, for example, via example GUIs shown in FIGS. 29-31.

Alternatively, steps 3835, 3840 and 3845 may be performed using an AI model that was trained to assess the stress level of the animal. Accordingly, one or more key point locations of the ear and/or tail as well as one or more lengths of any links, and one or more key angles associated with those physical features as well as ratios of numerical aspects of the key points, link lengths and/or key angles may be provided to the AI model such as the Stress AI model shown in layer 4 of FIG. 34A. By training the Stress AI model using similar input data for a variety of animals experiencing various levels of stress the key points, link lengths, key angles and/or any ratios thereof of the animal being assessed are processed by the Stress AI model to classify the stress level of the animal, which may for example be identified on a scale of 1 to 5 with 1 being low stress and 5 being high stress.

Figure 39:
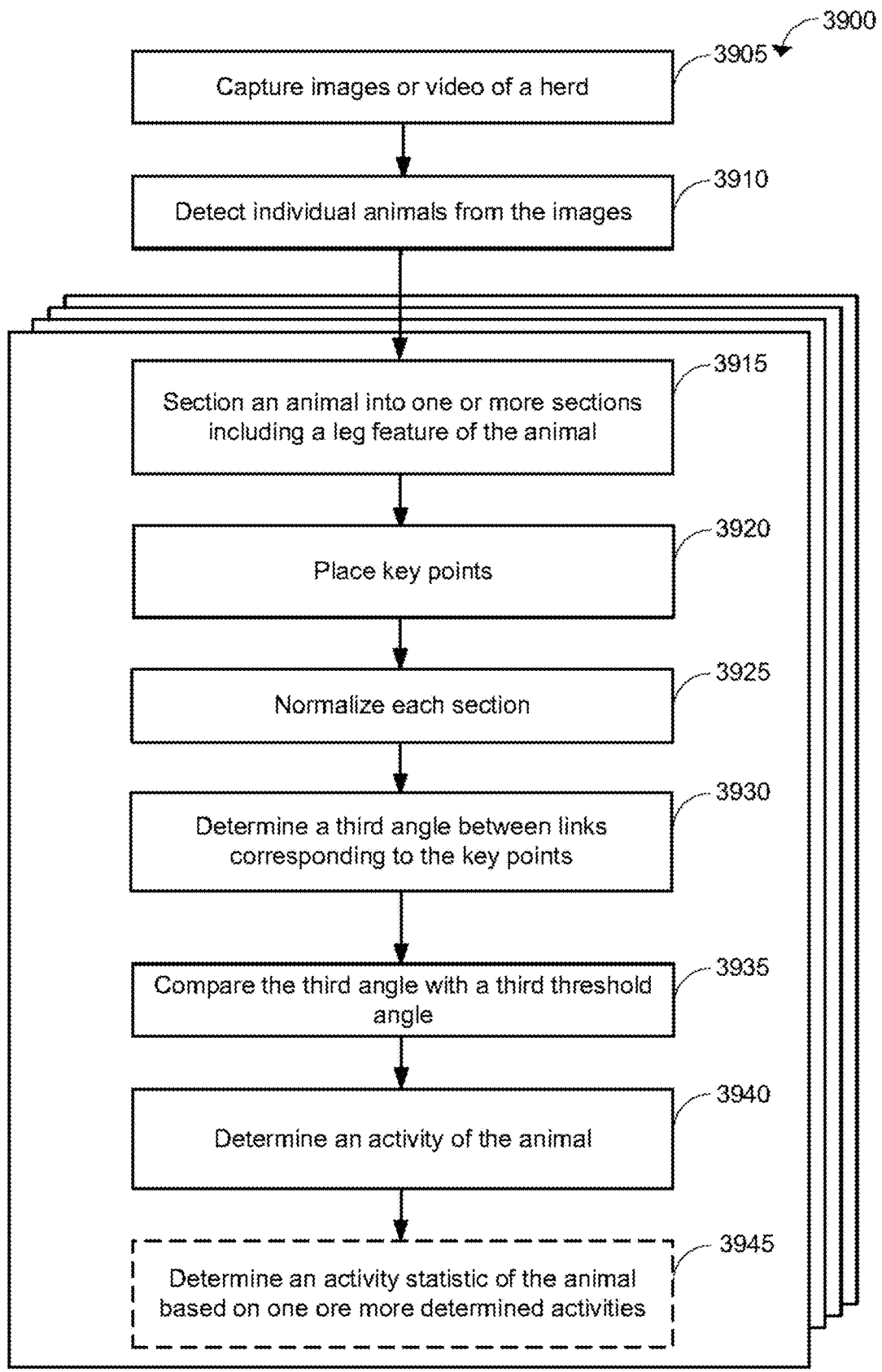
FIG. 39 shows a flowchart of an example embodiment of an animal activity assessment process executed by at least one embodiment of the animal identification and assessment systems described herein using some of the AI models of AI pipeline of FIG. 34A for determining data about an activity for at least one animal of the site.

Referring now to FIG. 39, shown therein is a flowchart showing an example embodiment of an animal activity assessment process 3900 that may be performed using one or more processors of an animal identification and assessment system described herein using some of the AI models of the AI pipeline 3400 for determining an activity or activity statistic of at least one animal at the site.

In various embodiments, the steps 3905 and 3910 may function in the same manner as was described for steps 3705 and 3710 of process 3700. Activity determination for each detected animal is then conducted through steps 3915 to 3945 (i.e., steps 3915 to 3945 are repeatedly executed for all detected animals).

At step 3915, the server program 164 segments or partitions the animal image, by using an AI model (e.g., Level 1 Bounding Box AI models 3420) into a plurality of sections that include sections used for identification as described herein as well as one or more sections that include one or more physical aspects of the detected animal that is being used in the activity assessment such as one or more leg features of the detected animal if the animal is being assessed how often and for how long the animal is standing (or lying down or walking). For example, the plurality of sections may include a left-side body section and a right-side body section as well as a front legs section and/or a back legs section (depending if the animal is two-legged or four-legged) and if the sections are seen in the image.

At step 3920, the server program 164 assigns key points to each of the sections by using one or more Level 2 Key Point AI models. For the body and leg sections, the key points include key points corresponding to the leg features of the detected animal.

At step 3925, the server program 164 may normalize and align each of the sections in the same manner as was described for step 3825 of process 3800.

At step 3930, the server program 164 may determine one or more angles between one or more pairs of links corresponding to certain key points that are associated with the physical features of the animal that are being used in performing the activity assessment on the animal. For example, in at least one embodiment, the server program 164 may determine the angles 3630 to 3656 as shown in FIG. 36.

At step 3935, the server program 164 may compare the determined angles with one or more corresponding threshold angles. For example, the server program 164 may compare the determined angles with a threshold angle that indicates the legs are erect and that the animal is standing up. The determined activity of the animal may be stored in the computer cloud 110 and may be used for further processing.

In at least one embodiment, at step 3940, the server program 164 may determine an activity statistic for a specific animal based on how often the activity is being performed across multiple images of the specific animal and the time span associated with the multiple images. For example, the server program 164 may determine activity statistics over a 24-hour period by analyzing images obtained for the specific animal in that time period to generate statistic data 774 shown in FIGS. 29-31.

Alternatively, steps 3930, 3935, 3940 and 3845 may be performed using an AI model that was trained to assess a particular activity level of an animal, such as AI model labeled Activity in the level 4 layer of the AI pipeline 3400. Accordingly, one or more key point locations of one or more leg sections of the animal as well as one or more lengths of any links, and one or more key angles associated with those physical features associated with the activity level as well as ratios of numerical aspects of the key points, link lengths and/or key angles may be provided to the Activity AI model. By training the Activity AI model using similar input data for a variety of animals performing the activities that the animal is being assessed for, the key points, link lengths, key angles and/or any ratios thereof of the animal being assessed are processed by the Activity AI model to classify the activity that the animal is performing. If the animal is being assessed in multiple images over a certain time period, then statistics about the animal performing the activity can be generated based on the output of the Activity AI model.

When performing training, the inputs use a standard format to move data for training certain AI models may be COCO or Common Objects in Context, for example. When training is done, an Nvidia toolset called TAO (Train, Adapt and Optimize) may be used in which a pre-trained AI model is retrained or adapted using a different dataset for optimizing (pruning) the AI model using Docker Containers. AI models may be trained using software provided by NVIDIA such as DetectNet or DarkNet53. Training may be performed for a certain number of epochs, such as at least 100 epochs (passed through the training dataset). Once an AI model is trained, it may then be pruned or optimized. For the other AI models like MMPose, training commands can be used with standard software packages. The output of the AI models may be in a standard JSON or CSV format. JSON is a data format used everywhere, from web browsers to databases. A similar process may be used for training a bounding box, a key point predictor, an OCR AI model and any level four classification AI model.

When performing training, some pre-processing may be needed. For example, when training the MMPose AI model, pre-processing may involve: (a) Collect videos as input data. The size of the video should be 1920×1080, into layer 0 of 34A; (b) Use a machine learning model to detect the bounding boxes of different of cattle in each frame, layer 1 of 34A; (c) Crop and scale the bounding box without distortion, using black background color, and to make each image size to 256×256; (d) Feed cropped 256×256 images to the corresponding MMPose key point detection models; and (e) Save the result of each MMPose key point detection model as JSON into the cloud.

In general, when training, inconsistencies in training data may cause problems with predictions since inconsistencies in training data may lead to conflicting loss signals during training. The final trained model may be at best noisy in its predictions or may fail. For example, if training data has images in which an animal's head has a bounding box in one image and not in another image then the training data is inconsistent. This problem continues to persist in training data where the animals are partially obscured and do not have any bounding boxes around them. Also, if the bounding boxes are not consistently drawn in the training images this may lead to noise in the training data. The above problems may also be encountered for training data used in predicting key points. Therefore, these issues may be addressed when creating the training data so that the training data is more consistent.

With the foregoing in mind, training datasets may generally be created by: (a) generating images to annotate, which may be from video sources and scaling them to the same size; (b) draw bounding boxes consistently around animals; (c) draw bounding boxes around all animal sections in the images (e.g., head, body, knees, tail, hoof, knee, udder, keypoints, etc.); (d) draw key points for all sections in the images (e.g., head front, head left, head right, legs front, legs back, spine, tail, etc.) and (e) label any boxes with attributes based on what the animal is doing in the image (e.g. standing, lying down, etc.).

Once data is run through the AI pipelines described herein, the data may be stored as text and images in an efficient manner since a larger amount of data is processed. Typically, a single camera may generate around 200 million points of data per month between all of the layers of the AI pipeline 3400. For example, AI models in the AI pipeline predict text outputs and confidences scores for (a) Bounding box locations, (b) Key point locations, (c) IDs—e.g., Face, Tag, Hide or Tail and (d) Classifications—e.g., Activity, Stress, etc. which can result in a large amount of data. This massive data volume may be addressed in several ways.

For example, in at least one embodiment, the AI pipeline may be implemented using software that is effective with edge computing such as NVidia's DeepStream which allows for the use of several types of hardware acceleration, such as video resizing or passing data between vision models. Information data input, preprocessing, config file, evaluation, inference, pruning, retraining pruned model, exporting and deploying to Deepstream may be found at the NVidia website.

In such embodiments or in at least one alternative embodiment, with text data that is generated either with an edge device or a cloud computing device, the text is stored in two databases on Amazon Web Services (AWS). The text data on AWS may be accessed via a web browser, a mobile phone and in some cases even synced to a local copy on a mobile device using a GraphQL interface for optimal security.

The text data itself may be stored and accessed using AWS Amplify with DynamoDB or Lamdba/TimeStream. DynamoDB provides the ability to see particular data sets amongst many data sets, while TimeStream enables overall data trends versus particular datasets.

DynamboDB is a document database that may be used to store captured text data that is indexed by video frame, date/time and animal ID for fast retrieval with individual animals. This allows for the historical details of any individual animal to be easily accessed by using Global Secondary Indexes (GSI). A typical use case here is how often an animal is seen or what is its water intake history.

For data science and analytics, TimeStream provides an efficient method for summarizing results at the herd level or individual animal level. This may include collapsing all the data for a time range into a statistical distribution or interpolating missing values. A typical use case here is how many animals are seen a day and what is the average water drinking time.

Another aspect to efficient data processing is storing images determined by bounding boxes into separate files for each frame of video, such as bounding boxes for animals' face or tail, for example. It is more effective to store an intermediate graphical output in the AI pipeline 3400 rather than to open a large video file in the cloud, especially where content may be processed by separate processes or machines.

With respect to efficiently indexing video frames and images for certain animals, in at least one embodiment, each animal ID occurrence for a video frame may be saved as a text entry in DynamoDB. For example, at least one video may be stored as a data entry in a database. For every frame in that video, the ID of each identified animal in the frame is recorded. To quickly access any specific animal, GSIs in DynamoDB may be created using the animal's ID as a partition key and the date #video name #frame (or just video name #frame) as the sort key. Generating all the videos for a particular animal may then be performed more easily by querying the sort key and optionally specifying a date range.

In another aspect, efficiency can also be improved based on how each occurrence of an identified animal in every frame of footage can be scanned for and tracked based on how the AI pipeline 3400 is implemented. For example, the input video image frame may initially be a 2K image (which is 3,686,400 pixels) and reduced down to a 720p image (which is 1280×720 pixels or roughly 921,600 pixels, a savings of 75% in size) going into the layer 0. The portion of the image that is analyzed in future layers may be made smaller from bounding boxes so that the data that is being processed in the level 3 identification layer may be about 256×256 pixels (or roughly 65,536 pixels), resulting in only 1.78% of the original pixels (65,536/3,686,400) being processed by the level 3 when applied to a single ID classification.

In another aspect, the efficiency may be improved since recorded occurrences of an animal's ID and frame # are stored in both a time-series database and a document database for quick retrieval on the website.

Figure 40A:
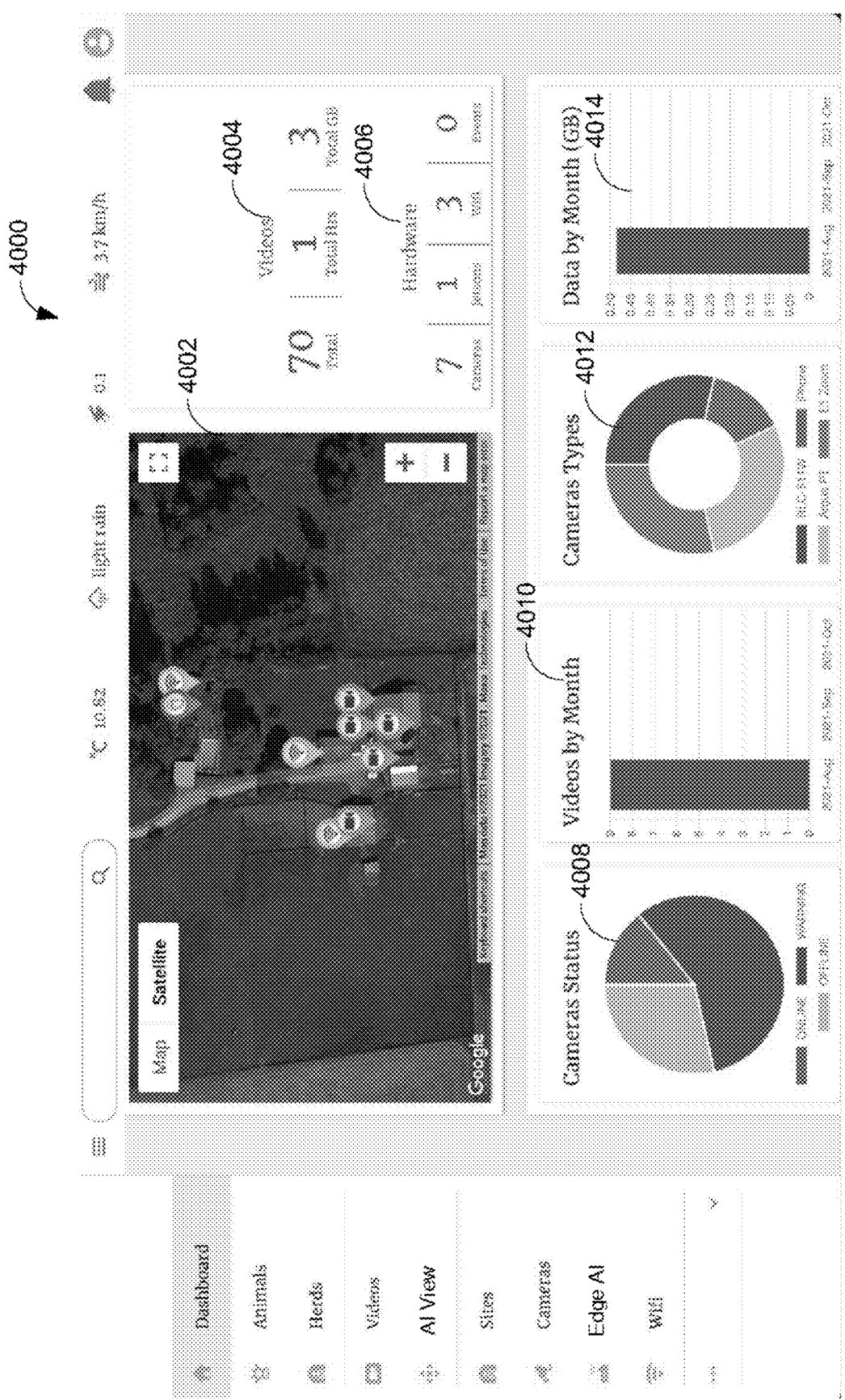
FIG. 40A shows an image of example embodiment of a Graphical User Interface (GUI) that may be used to by at least one embodiment of an animal identification and assessment system described herein to provide operational status and data summary for a site installation.

Referring now to FIG. 40A, shown therein is an image of example embodiment of a Graphical User Interface (GUI) 4000 that may be used by at least one embodiment of an animal identification and assessment system described herein to provide operational status and data summary for a site installation. Similar to the GUI 790, the GUI 4000 has some similar menu options along the left-hand side and various display portions including a satellite map 4002 showing a satellite view of the site, video statistics 4004 on the number of videos that are recorded, overall hardware statistics 4006 on the types of hardware used and the number of each type and more detailed information on the cameras and videos. For example, the GUI 4000 has a camera status window 4008, a videos temporal window 4010, a camera type window 4012 and a data temporal window 4014. The camera status window 4008 may show the operational status of the cameras at the site and if there are any potential problems (via displaying warnings). The videos temporal window 4010 may show the number of videos recorded over time. The camera type window 4012 may show the types of cameras and/or proportion of the different camera types that are used at the site. The data temporal window 4014 shows the amount of data that is recorded over time.

Figure 40B:
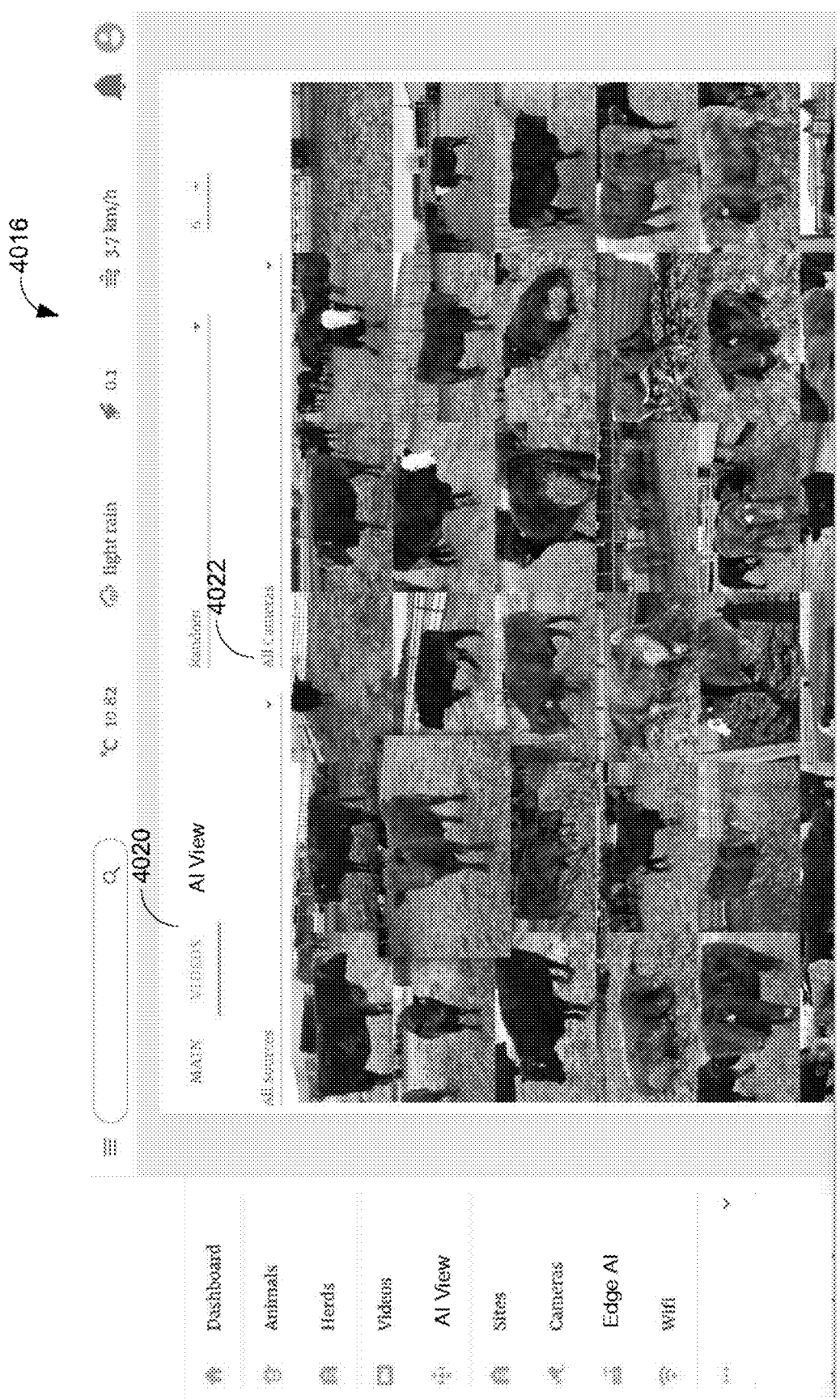
FIGS. 40B and 40C show images of example embodiments of a GUI that may be used by at least one embodiment of an animal identification and assessment system described herein to provide a visual summary of the animals at a site including a video gallery of the animals and an image gallery showing sections of the animals, respectively.
Figure 40C:
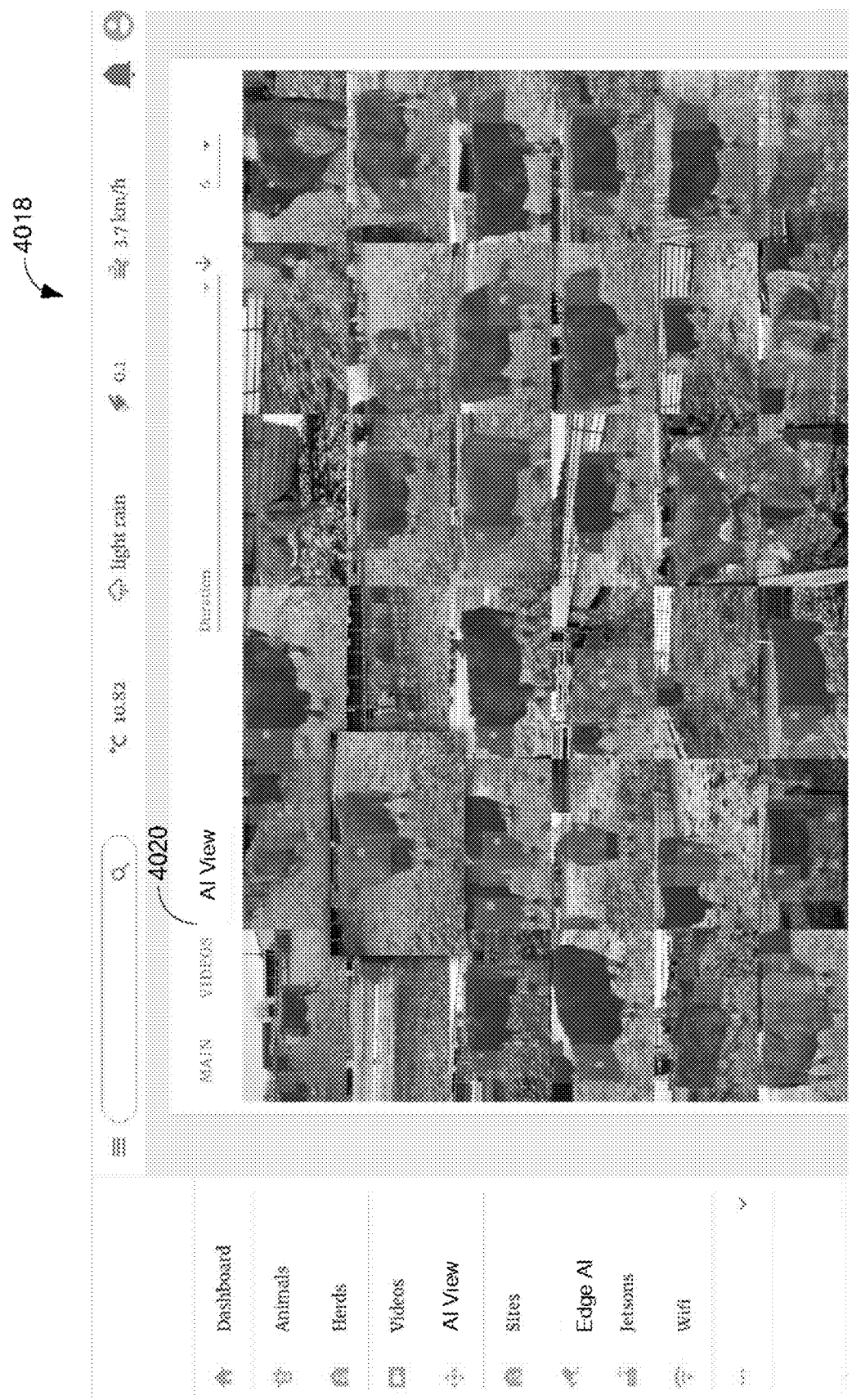

Referring now to FIGS. 40B and 40C, shown therein are images of example embodiments of GUIs 4016 and 4018, respectively, that may be used by at least one embodiment of an animal identification and assessment system described herein to provide a visual summary of the animals at a site including a video gallery of the animals and an image gallery showing sections of the animals, respectively. The GUI 4016 and the GUI 4018 may include input option 4020 to select a video gallery option (shown in FIG. 40B) or an AI model view gallery (shown in FIG. 40C). The GUI 4016 may also include an input option 4022 to select source imaging devices for the videos displayed in the GUI 4016. The GUI 4018 may also display an AI model view that includes bounding boxes corresponding to different sections of the animals. Examples of head sections, hoof sections, knee sections and tail sections are shown.

Both GUIs 4016 and 4018 provide a quick view of the animals at a site to allow a user to monitor all of the animals remotely and get a quick glance of the animals to see what they are doing and what condition they are in. By selecting one of the animal pictures on GUI 4022, a video of the animal in the selected picture can be displayed in another GUI such as that shown in FIG. 40E for example. Also, by selecting one of the animal images in GUI 4016 or GUI 4018, the animal image is enlarged so the user can take a closer look at the animal in the selected image.

Figure 40D:
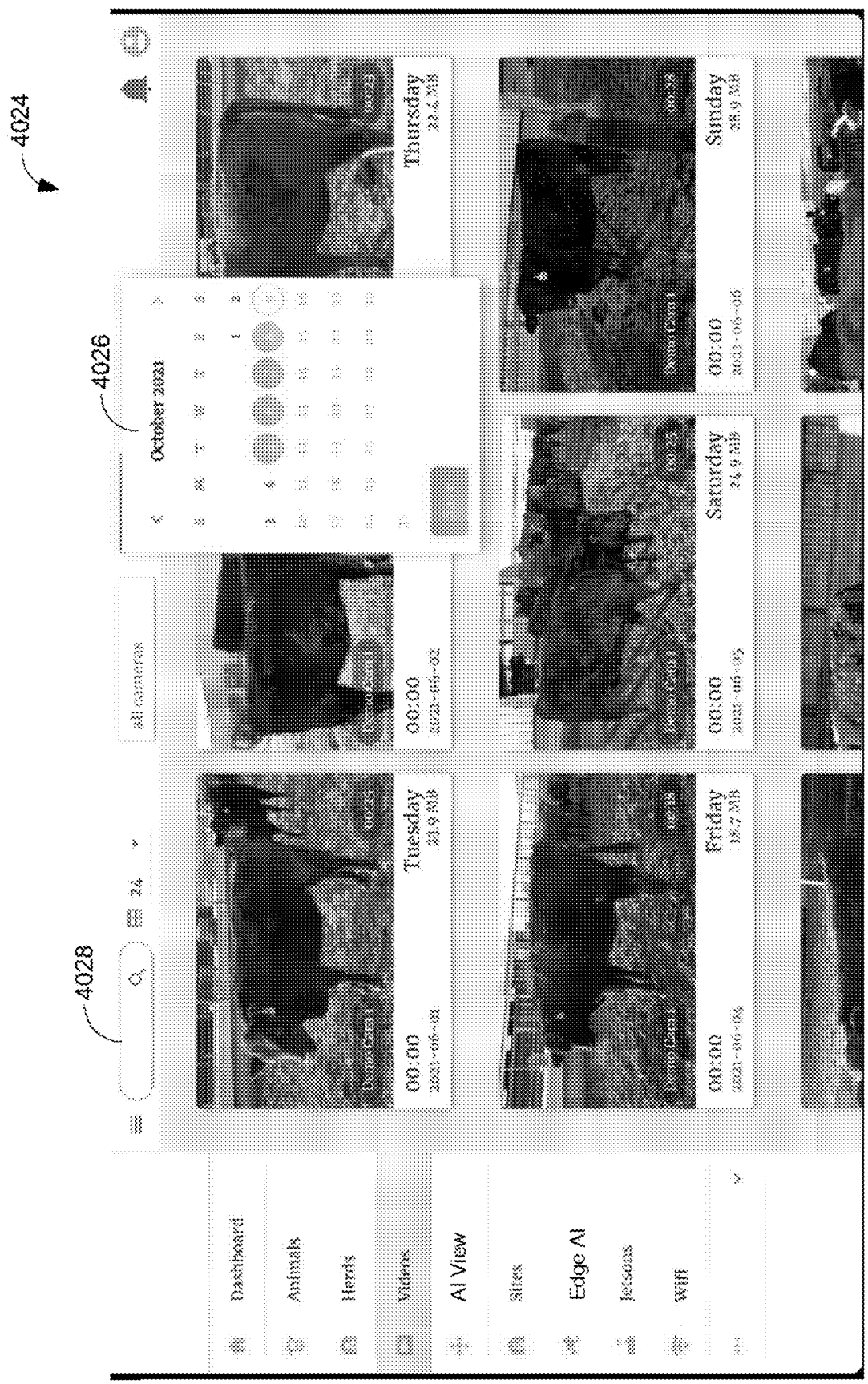
FIG. 40D shows an example embodiment of a GUI that may be used by at least one embodiment of an animal identification and assessment system described herein to allow a user to view a video for each animal at a site where the video was obtained during a selected time period.

Referring now to FIG. 40D, shown therein is an example embodiment of a GUI 4024 that may be used by at least one embodiment of an animal identification and assessment system described herein to allow a user to view a video for each animal at a site where the video was obtained during a selected time period. The GUI 4024 may include a date input option 4026 to allow a user to view videos obtained during a selected time period. For example, the date input option 4026 provides a calendar interface allowing a user to specify the date range during which videos were obtained to allow the user to review the videos. The GUI 4024 may also include a search box 4028 to allow a user to view videos obtained for a specific animal. For example, the search criteria may include the drop-tag identification of the specific animal or another animal identification number that the user can input.

Figure 40E:
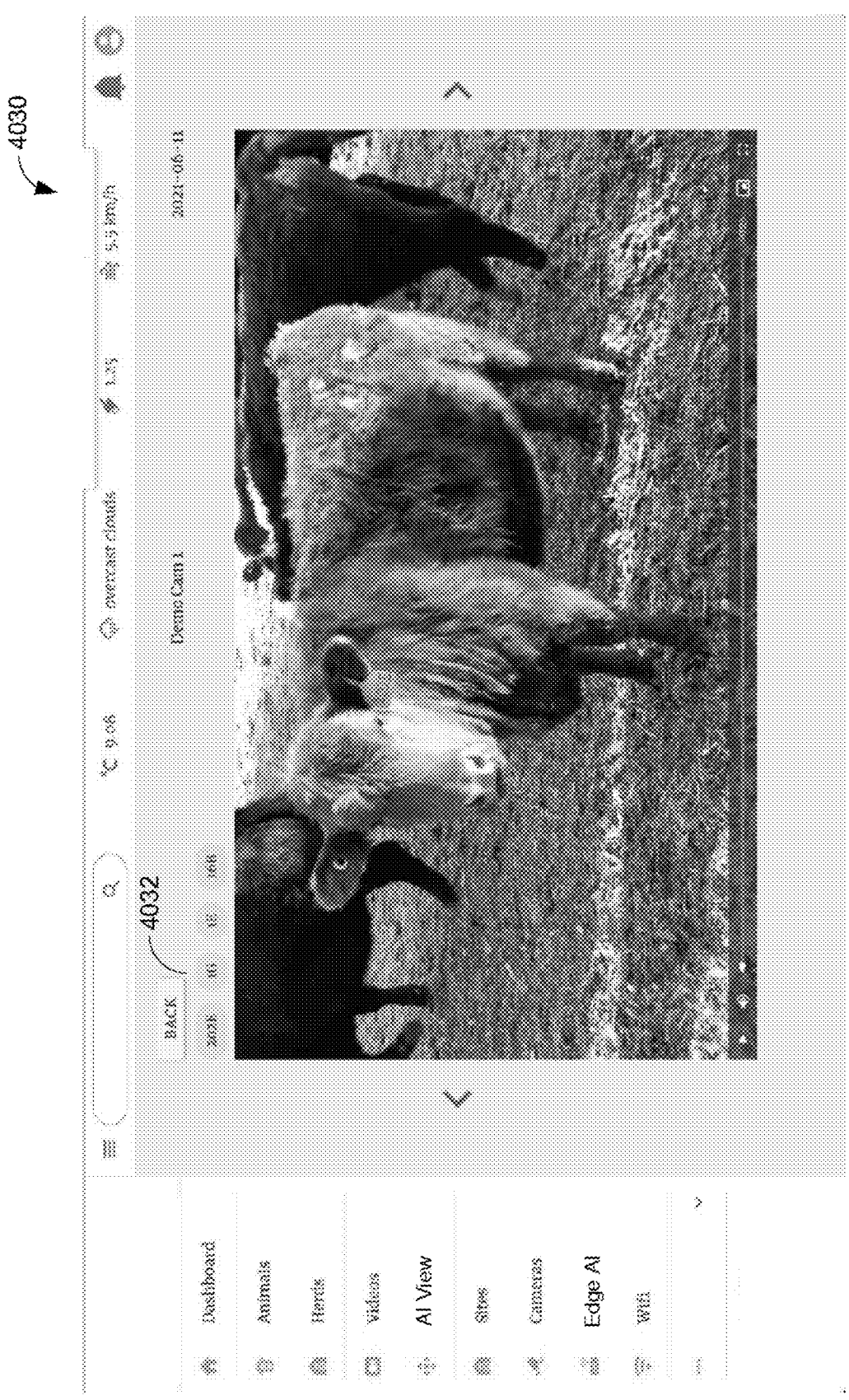
FIG. 40E shows an example embodiment of a GUI that may be used by at least one embodiment of an animal identification and assessment system described herein to allow a user to view a selected video from the GUI of FIG. 40D and shows indexing of animal by ID.

Referring now to FIG. 40E, shown therein is an example embodiment of a GUI 4030 that may be used by at least one embodiment of an animal identification and assessment system described herein to allow a user to view a selected video from the GUI of FIG. 40D. The GUI 4030 may include an ID list 4032 that shows the IDs of all the animals detected in the selected video. The ID list 4032 may enable quick and simple indexing into videos for a particular animal by allowing a user to click on (i.e., select) the ID of a specific animal in the ID list 4032 to retrieve videos that include the selected animal. In at least one embodiment, a retrieved video of a specific animal may jump to the time instance of when the specific animal is visible in the video.

Figure 40F:
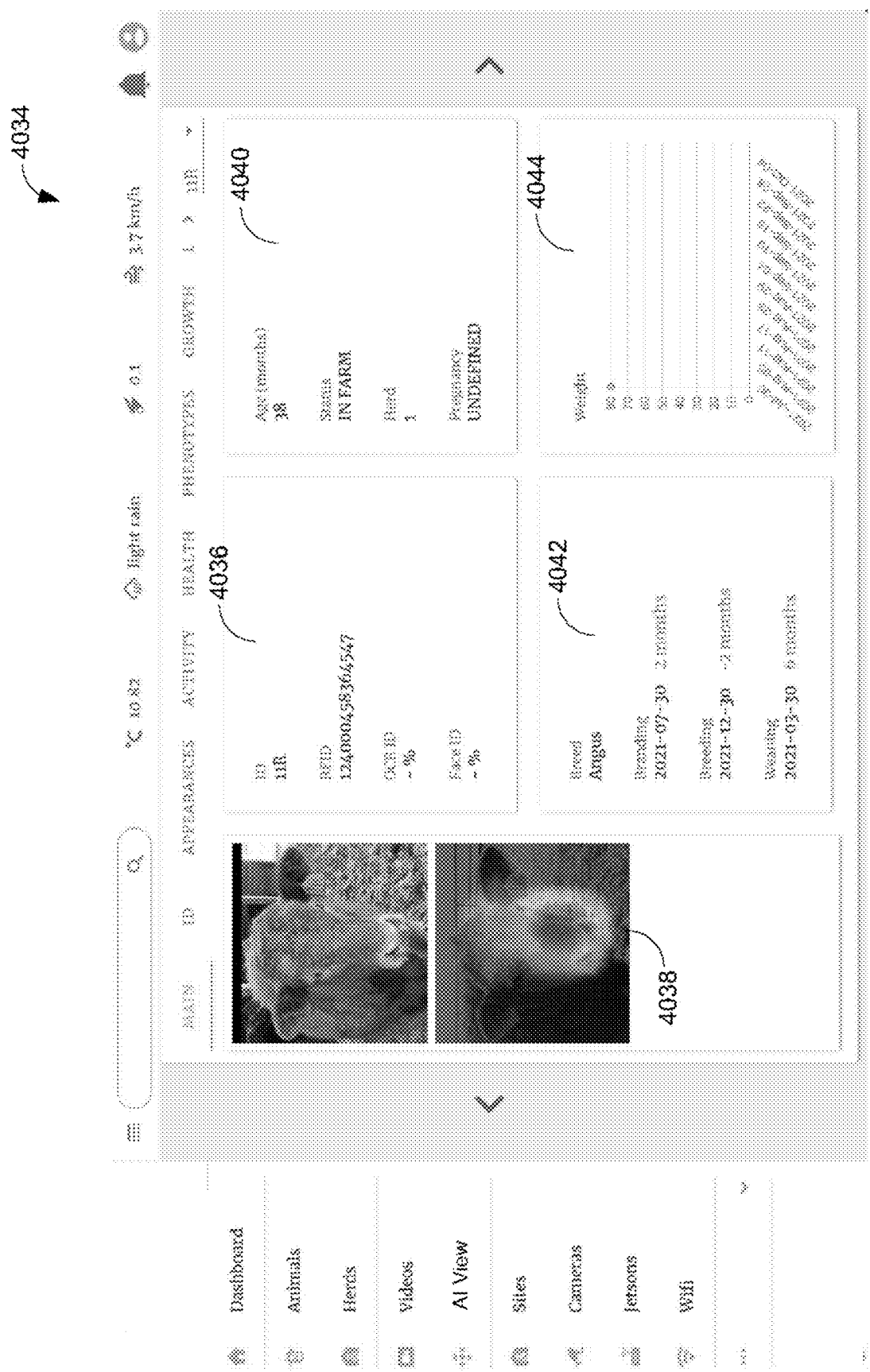
FIG. 40F shows an example embodiment of a GUI that may be used by at least one embodiment of an animal identification and assessment system described herein to allow a user to view more in-depth data for an animal at a site.

Referring now to FIG. 40F, shown therein is an example embodiment of a GUI 4034 that may be used by at least one embodiment of an animal identification and assessment system described herein to allow a user to view more in-depth data for an animal at a site. The GUI 4034 may include an identification window 4036 showing identification data for a selected animal. The GUI 4034 may include a heat map window 4038 showing a heat map corresponding to the generated facial identification of the animal. In other words, the visual features that define uniqueness in the facial identification. The GUI 4034 may also include an age and status data window 4040, breeding data window 4042 and a weight temporal data window 4044, which show the respective data. The GUI 4034 allows a user to view a quick summary of various characteristics of an animal and review events that occurred to the animal over time and monitor characteristics of the animal over time (e.g., weight changes).

Figure 40G:
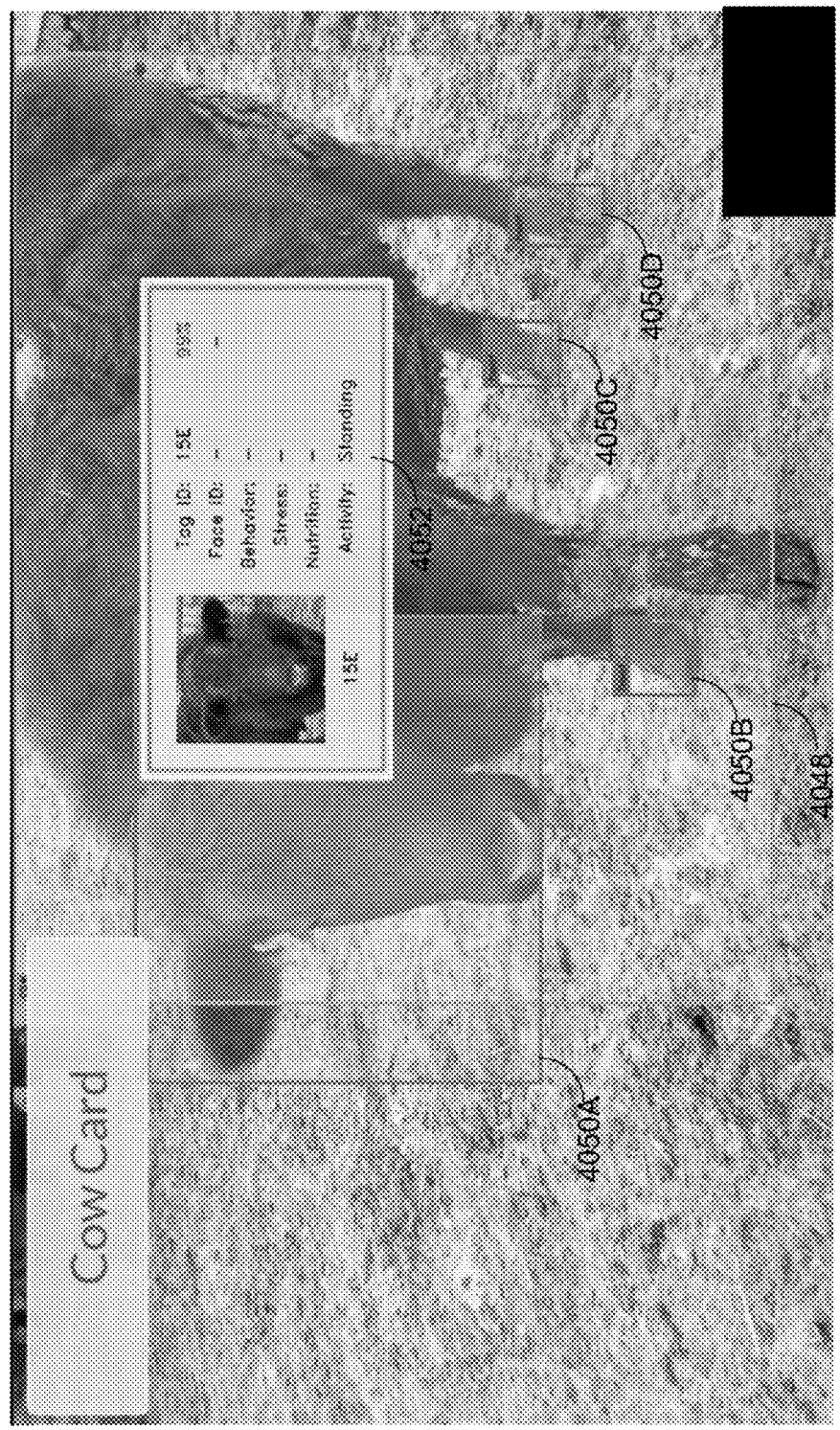
FIG. 40G shows an example image of a cow with corresponding bounding boxes, sections and labels showing identification and activity.

Referring now to FIG. 40G, shown therein is an example image 4046 of a selected animal with corresponding bounding boxes, sections and a label showing identification and activity. The example image 4046 may include a bounding box 4048 for the detected animal, and bounding boxes 4050A-4050D corresponding to different sections of the detected animal. The image 4046 may also include a label 4052 that can be referred to as a cow card. The cow card 4052 may provide information regarding the identification, status and assessments for the selected cow. The various items shown in the GUI 4046 may also be annotated onto a video of the selected animal that a user can view by selecting the animal bounding box 4048.

Figure 40H:
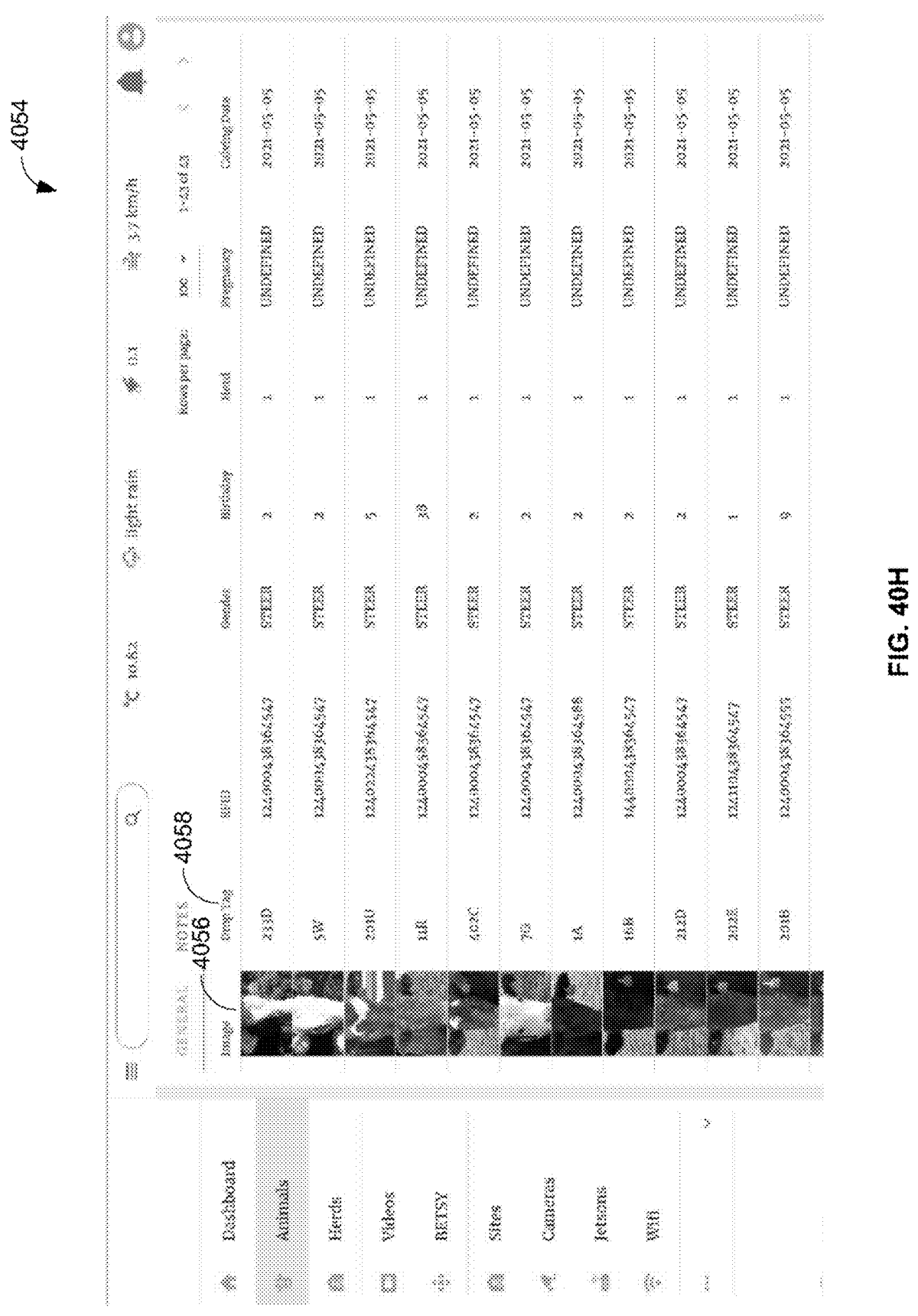

Referring now to FIG. 40H, shown therein is an example of a GUI 4054 that shows a listing of the animals by ID at a site including various data for the animal. The GUI 4054 may include image windows/thumbnails 4056 that display images corresponding to the animals listed. The GUI 4054 may also include an ID column 4058 that displays the IDs (for example, drop tag IDs) corresponding to the animals listed. In at least one embodiment, the image windows 4056 and the ID list 4058 may enable indexing into videos by allowing a user to click on the image or ID of a listed animal to retrieve videos or images that include the listed animal. In at least one embodiment, a retrieved video of a listed animal may jump to the time instance of when that animal is visible in the video. Other data that may be listed include the gender, age, breed, herd affiliation, fertility status and/or calving date.

Figure 40I:
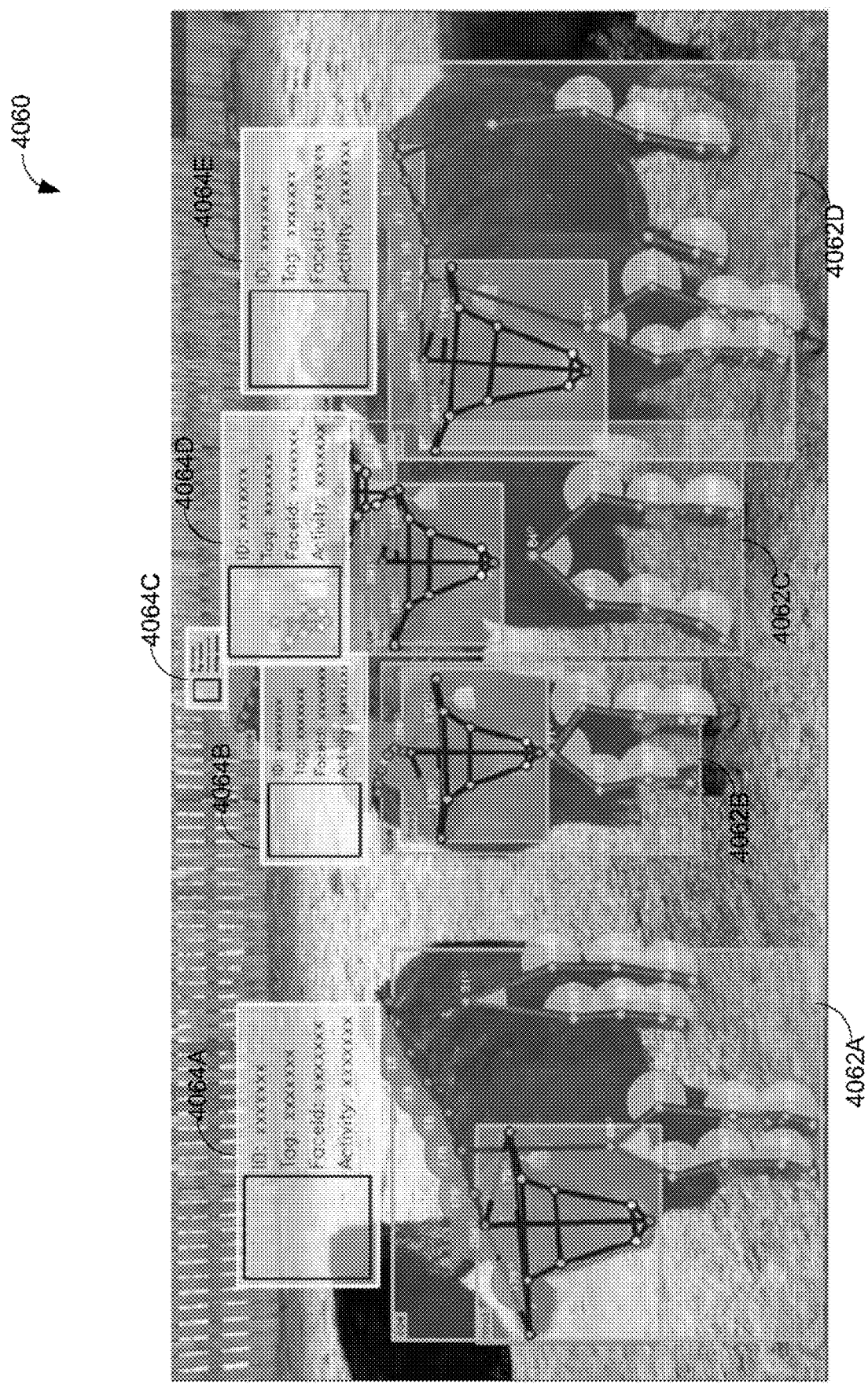
FIG. 40I shows an example image of several cows and corresponding bounding boxes, sections, key points and angles as well as a label showing various data including ID and activity.

Referring now to FIG. 40I, shown therein is an example image 4060 of several cows and corresponding bounding boxes, animal sections, key points and angles as well as a label showing various data about each animal including its ID and activity. For example, the image 4060 includes bounding box windows 4062A-4062D corresponding to the different animals in the image. The example image 4060 may also include labels in the form of cow cards 4064A-4064E corresponding to the different in the image. In at least one embodiment, the bounding box windows 4062A-4062D may enable indexing into videos by allowing a user to click on the bounding box window for a specific animal to retrieve videos or images that include the specific animal. In at least one embodiment, a retrieved video of a specific animal may jump to the time instance of when that animal is visible in the video.

Figure 40J:
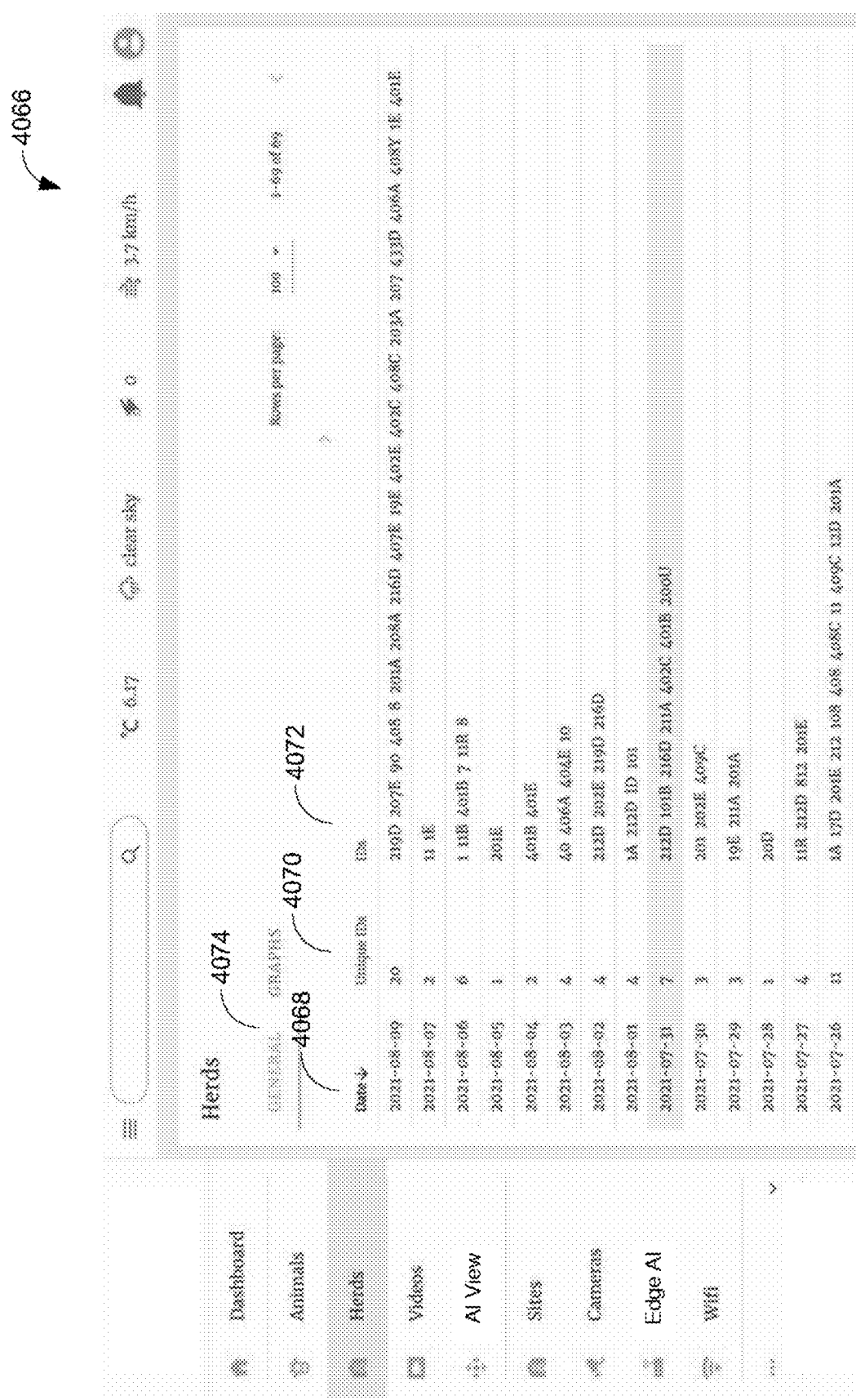
FIG. 40J shows an example embodiment of a GUI that shows a listing of the animals by ID shown on particular days and the number of unique animal IDs that were viewed on that day.

Referring now to FIG. 40J, shown therein is an example embodiment of a GUI 4066 that shows a listing of the animals by date, the number of unique animal IDs that were viewed on that day and a list of the IDs that were viewed on that date. The GUI 4066 may include a date column 4068 showing particular days and a unique ID column/list 4070 showing the number of unique animal IDs that were viewed on those particular days. The GUI 4066 may also include an ID column 4072 listing all the different unique IDs. Further, the GUI 4066 may include an input option 4074 to allow a user to select a list view or a graphical view of the displayed information.

Figure 40K:
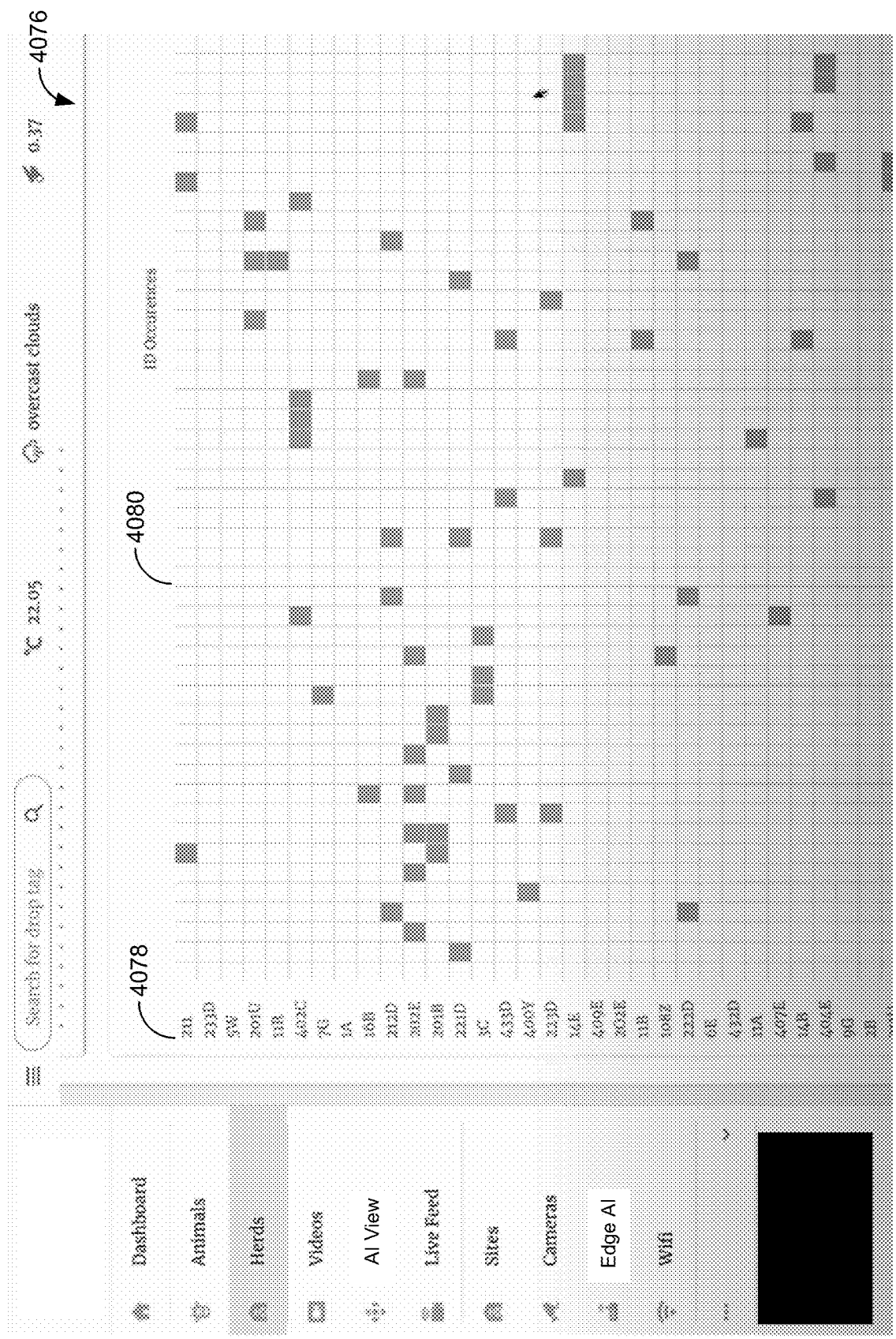
FIG. 40K shows an example embodiment of a GUI that shows another listing of the occurrences when certain animals were viewed by day where each column is a different day and different individual animals, represented by animal IDs, are shown along the rows.

Referring now to FIG. 40K, shown therein is an example of a GUI 4076 that shows another listing of the occurrences when certain animals were viewed by day in a tabular format where each column 4080 is a different day and different individual animals represented by unique animal IDs are shown along the rows 4078. The GUI 4076 provides a quick visual summary of how often different animals were seen over time as well as their relative appearance to other animals, which may be in the same herd for example.

Although embodiments have been described above with reference to the accompanying drawings, those of skill in the art will appreciate that variations and modifications may be made.

For example, while the animal identification, tracking, monitoring and assessment techniques described primarily in terms of cows, it should be understood that these techniques can be applied to other animals by training the various AI models in a somewhat similar fashion using images and other data from the other species. For example, the animal identification, tracking, monitoring and assessment techniques described herein may be applied to other animals like cats or dogs.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. An animal management system comprising:
one or more imaging devices;
a computing device coupled to the one or more imaging devices, wherein the computing device is configured to:
receive one or more images captured by the one or more imaging devices;
process the one or more images using an artificial intelligence (AI) pipeline having a plurality of AI models to:
detect and locate in the one or more images at least one animal; and
for one of the detected animals in an image of the one or more images:
process the image of the detected animal to generate one or more bounding boxes corresponding to one or more sections of the detected animal;
determine, in a bounding box of each section using one of the AI models, a plurality of key points corresponding to anatomical features of the detected animal used to identify the detected animal, wherein the plurality of key points is determined in response to a type of the detected animal and a part of the detected animal that the section corresponds to;
normalize each of the one or more sections, based on the determined key points for the one or more sections, by projecting the determined key points of each of the one or more sections to a common plane based on a reference template indicating where key points are expected to be located based on the section and species of the detected animal;
generate embeddings for each normalized section of the image; and
combine the embeddings for generating an identification or classification of the detected animal with a confidence score.

2. The system of claim 1, wherein a given animal is detected and located in the image by processing the image using a single-pass bounding box algorithm or a two stage network to detect the given animal and define a bounding box that indicates a location of the detected given animal in the image.

3. The system of claim 1, wherein the one or more sections comprise a front-side head section, a left-side head section, a right-side head section, a top body section, a left-side body section, a right-side body section, a rear-side section, a drop tag section, a tail section, an udder section, a teat section, one or more knee sections, one or more hoof sections, a scrotum section, and/or one or more leg sections.

4. The system of claim 1, wherein each section is defined by a bounding box having a confidence score indicating an accuracy of the bounding box.

5. The system of claim 1, wherein the plurality of key points corresponds to features of one or more sections of the detected animal including one or more eyes, one or more ears, a nose, a mouth, a top of head, a bottom of head, a jaw, a hip, a lip, a neck, one or more joints or any combination thereof.

6. The system of claim 1, wherein the generated identification of the detected animal is a face identification, and the one or more sections are one or more of a front-side head section, a left-side head section and a right-side head section.

7. The system of claim 6, wherein defining the bounding box for each of the front-side head section, the left-side head section and the right-side head section includes one or more of cropping the head section, scaling the head section, and adding a margin to the head section if the bounding box for the head section is not square.

8. The system of claim 6, wherein the AI models comprise a Face ID model to process the front-side head section, the left-side head section and/or the right-side head section to determine the identification for the detected animal.

9. The system of claim 1, wherein the AI models comprise a Triplet Loss Siamese Network for generating the embeddings for each section.

10. The system of claim 9, wherein the Triplet Loss Siamese Network is trained using a triplet loss method for each section that it is provided with.

11. The system of claim 10, wherein the triplet loss method includes training the Siamese Network using tuples of anchor, positive and negative pre-processed images.

12. The system of claim 11, wherein the pre-processed images are generated by normalizing and aligning the one or more sections by matching the determined plurality of key points for the one or more sections to one or more corresponding key point templates.

13. The system of claim 12, wherein the pre-processed images are generated by additionally blocking portions of the section corresponding to a drop tag of the detected animal when the one or more sections include a front head section, a right side head section and/or a left side head section where the drop tag is visible.

14. The system of claim 1, wherein the one or more sections comprise a drop tag section that is processed by a drop tag ID model to produce a ground truth identification; and wherein the computing device is further configured for comparing the generated identification with the ground trust identification for verification.

15. The system of claim 14, wherein at least one of the AI models are re-trained when the confidence level from the generated identifications trend lower than a threshold accuracy rate.

16. The system of claim 1, wherein the computing device is further configured to generate one or more animal assessments for a characteristic of the detected animal and the determined key points in the one or more sections of the detected animal, where the determined key points have locations that are physically related to the characteristic being assessed.

17. The system of claim 1, wherein the generated identification of the detected animal is: (a) based on a tail identification, and the one or more sections includes a tail section of the detected animal, (b) based a scrotum identification, and the one or more sections includes a scrotum section of the detected animal, and/or (c) based on a hide identification, and the one or more sections are one or more of a top body section, a left-side body section and a right-side body section of the detected animal.

18. The system of claim 1, wherein: (a) the plurality of key points is generated with a corresponding confidence score, links between successive adjacent key points that are approximately linear are formed and angles between adjacent links are determined to form key angles with a confidence score; and/or (b) the computing device is configured to generate a given bounding box for a given detected animal in the image and a confidence score for the given bounding box.

19. The system of claim 1, wherein the computing device is further configured to annotate the image with the bounding box for the detected animal, the sections for the detected animal and/or the plurality of key points for the detected animal.

20. The system of claim 19, wherein the computing device is further configured to annotate the image with confidence levels obtained for the bounding box, the sections and/or the plurality of key points for the detected animal.

21. The system of claim 1, wherein the detected animal is a cow and the AI pipeline comprises a classification layer having a BRD AI model that is trained to detect cows that have a likelihood of developing BRD, wherein the BRD AI model is adapted to receive at least one head section and the key points thereof for the detected animal as inputs and generates a binary classification result to indicate whether the cow has BRD or not.

22. The system of claim 1, wherein the AI pipeline comprises a classification layer having a stress AI model that is trained to determine a level of stress that the detected animal is incurring, wherein the stress AI model is adapted to receive at least one head section and/or a tail section of the detected animal and the key points of these sections and generate an ordinal output result for the level of stress being incurred by the detected animal.

23. The system of claim 1, wherein the AI pipeline comprises a classification layer having a lameness AI model that is trained to determine a level of lameness that the detected animal is incurring, wherein the lameness AI model is adapted to receive at least one leg section and key points thereof of the detected animal and generates an ordinal output result for the level of lameness being incurred by the detected animal.

24. The system of claim 1, wherein the AI pipeline comprises a classification layer having an activity AI model that is trained to determine when the detected animal is engaging in an activity, wherein the activity AI model is adapted to receive at least one leg section and key points thereof of the detected animal and generates an output result indicating whether the detected animal is engaging in the activity.

25. An animal management system comprising:
one or more imaging devices;
a computing device coupled to the one or more imaging devices, wherein the computing device is configured to:
receive one or more images captured by the one or more imaging devices;
process at least one image from the one or more images using an artificial intelligence (AI) pipeline having several layers that each have a unique purpose and include one or more AI models, the AI pipeline including:
a detection level having an object detector configured to detect, and locate in the at least one image one or more animals and a classifier to classify the one or more detected animals to indicate the species thereof;
a bounding box level having one or more one or more Bounding Box AI models that are configured to generate one or more bounding boxes corresponding to one or more sections for the one or more detected animals based on the classification of the one or more detected animals;
a key point level having one or more key point AI models that are configured to determine a plurality of key points in the corresponding bounding box in each section, where the plurality of key points corresponds to anatomical features of the one or more detected animals; and
an identification layer having one or more identification AI models that are configured to: (a) normalize each of the one or more sections by projecting the determined key points, of each of the one or more sections using a reference template indicating where key points are expected to be located, (b) generate embeddings for each normalized section of the image; and (c) combine the embeddings for generating an identification of the one or more detected animals with a confidence score.

26. The system of claim 25, wherein the AI pipeline further includes a classification level having one or more Classification AI models to generate one or more animal assessments for the detected one or more animals based on input from pixel values from the one or more images and/or the key points.

27. An animal identification system for identifying an animal in an image, wherein the system comprises:
a memory configured to store one or more AI models; and
a computing device coupled to the memory and configured to:
receive at least one section of an animal, the at least one section being defined by a bounding box determined from an image including the animal;
receive key points assigned to the bounding box of the at least one section, the key points corresponding to one or more anatomical features in a bounding box of the at least one section of the animal;
normalize the at least one section, by projecting the received key points of the at least one section using homography mapping and a reference template indicating where key points are expected to be located;
generate embeddings for the at least one normalized section of the image using the one or more AI models; and
combine the embeddings to generate an identification of the animal with a confidence score using the one or more AI models.

28. The system of claim 27, wherein the computing device is configured to normalize the at least one section by matching the key points for a given section to a key point template for the given section to normalize and align the key points to the key point template prior to generating the embeddings.

29. The system of claim 27, wherein the computing device is further configured to mask portions of a section of the image corresponding to a drop-tag of the animal when the image section is a front head, left head or right head section that includes the drop-tag.

30. A non-transitory computer readable medium storing thereon program instructions, which when executed by at least one processor, configure the at least one processor for performing a method for animal management comprising:

identifying a visually observable animal behavioral trait of interest receiving, at a computing device, one or more images captured by one or more imaging devices;

processing the one or more images using an artificial intelligence (AI) pipeline having a plurality of AI models for:

detecting, locating and classifying one or more animals in the one or more images; and for at least one detected animal:

processing an image of the at least one detected animal from the one or more images to generate one or more bounding boxes corresponding to one or more sections based on classification of a species of the detected animal;

determining a plurality of key points in at least one bounding box corresponding to at least one of the one or more sections, where the plurality of key points corresponds to anatomical features of the at least one detected animal;

normalizing at least one of the one or more sections by projecting the determined plurality of key points for the at least one of the one or more sections to a common plane using a reference template indicating where key points are expected to be located;

generating embeddings for at least one of the normalized sections of the image;

combining the embeddings for generating an identification of the detected animal with a confidence score; and determining if the detected animal displays the visually observable trait.

* * * * *